United States Patent
Jeong et al.

(10) Patent No.: US 11,943,471 B2
(45) Date of Patent: *Mar. 26, 2024

(54) ENCODING METHOD AND DEVICE THEREFOR, AND DECODING METHOD AND DEVICE THEREFOR

(71) Applicant: SAMSUNG ELECTRONICS CO., LTD., Suwon-si (KR)

(72) Inventors: Seungsoo Jeong, Suwon-si (KR); Chanyul Kim, Suwon-si (KR); Minsoo Park, Suwon-si (KR); Minwoo Park, Suwon-si (KR); Kiho Choi, Suwon-si (KR); Narae Choi, Suwon-si (KR); Woongil Choi, Suwon-si (KR); Anish Tamse, Suwon-si (KR); Yinji Piao, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/962,197

(22) Filed: Oct. 7, 2022

(65) Prior Publication Data
US 2023/0037705 A1 Feb. 9, 2023

Related U.S. Application Data

(63) Continuation of application No. 17/054,347, filed as application No. PCT/KR2019/005671 on May 10, 2019, now Pat. No. 11,470,347.
(Continued)

(51) Int. Cl.
*H04N 19/105* (2014.01)
*H04N 19/119* (2014.01)
(Continued)

(52) U.S. Cl.
CPC ......... *H04N 19/577* (2014.11); *H04N 19/105* (2014.11); *H04N 19/119* (2014.11); *H04N 19/44* (2014.11)

(58) Field of Classification Search
CPC .................................................. H04N 19/577
See application file for complete search history.

(56) References Cited

U.S. PATENT DOCUMENTS 7,466,774 B2  12/2008  Boyce
8,085,846 B2  12/2011  Tourapis et al.
(Continued)

FOREIGN PATENT DOCUMENTS

CN    101917621 A    12/2010
JP    2011193363 A    9/2011
(Continued)

OTHER PUBLICATIONS

Communication dated Apr. 26, 2022, issued by the European Patent Office in counterpart European Application No. 19799550.9.
(Continued)

*Primary Examiner* — Irfan Habib
(74) *Attorney, Agent, or Firm* — Sughrue Mion, PLLC

(57) ABSTRACT

A video decoding method includes determining, based on an area of a current block, whether a multi-prediction combination mode for predicting the current block by combining prediction results obtained according to a plurality of prediction modes is applied to the current block, when the multi-prediction combination mode is applied to the current block, determining the plurality of prediction modes to be applied to the current block, generating a plurality of prediction blocks of the current block, according to the plurality of prediction modes, and determining a combined prediction block of the current block, by combining the plurality of prediction blocks according to respective weights.

3 Claims, 31 Drawing Sheets

Related U.S. Application Data

(60) Provisional application No. 62/669,548, filed on May 10, 2018.

(51) Int. Cl.
 *H04N 19/44* (2014.01)
 *H04N 19/577* (2014.01)

(56) References Cited

U.S. PATENT DOCUMENTS

| | | | |
|---|---|---|---|
| 9,374,578 B1* | 6/2016 | Mukherjee | H04N 19/182 |
| 10,602,179 B2 | 3/2020 | Jeong et al. | |
| 11,277,615 B2* | 3/2022 | Choi | H04N 19/59 |
| 11,310,515 B2* | 4/2022 | Zhao | H04N 19/159 |
| 11,317,111 B2* | 4/2022 | Rusanovskyy | H04N 19/51 |
| 2007/0009044 A1* | 1/2007 | Tourapis | H04N 19/176 375/E7.211 |
| 2009/0257492 A1 | 10/2009 | Andersson et al. | |
| 2012/0320968 A1* | 12/2012 | Zheng | H04N 19/52 375/E7.125 |
| 2012/0328023 A1* | 12/2012 | Sprljan | H04N 19/159 375/E7.125 |
| 2013/0272412 A1* | 10/2013 | Seregin | H04N 19/593 375/240.16 |
| 2014/0218473 A1* | 8/2014 | Hannuksela | H04N 19/30 348/43 |
| 2017/0251213 A1 | 8/2017 | Ye et al. | |
| 2019/0246133 A1* | 8/2019 | Lee | H04N 19/70 |
| 2020/0029073 A1* | 1/2020 | Chiang | H04N 19/52 |
| 2021/0144388 A1* | 5/2021 | Zhang | H04N 19/105 |
| 2021/0211708 A1* | 7/2021 | Lee | H04N 19/122 |
| 2021/0289209 A1* | 9/2021 | Lee | H04N 19/139 |
| 2021/0344931 A1 | 11/2021 | Filippov et al. | |
| 2022/0150472 A1* | 5/2022 | Park | H04N 19/159 |

FOREIGN PATENT DOCUMENTS

| | | |
|---|---|---|
| KR | 10-1050828 B1 | 7/2011 |
| KR | 10-2015-0093633 A | 8/2015 |

OTHER PUBLICATIONS

Communication dated Dec. 7, 2021 issued by the Korean Intellectual Property Office in counterpart Korean Application No. 10-2020-7020282.

Communication dated Jan. 21, 2022 issued by the European Patent Office in counterpart European Application No. 19799550.9.

International Search Report (PCT/ISA/210) dated Oct. 15, 2019, issued by the International Searching Authority in counterpart International Application No. PCT/KR2019/005671.

Kazuo Sugimoto et al., "LUT-based adaptive filtering on intra prediction samples", Joint Collaborative Team on Video Coding (JCT-VC) of ITU-T SG16 WP3 and ISO/IEC JTC1/SC29/WG11, Document: JCTVC-D109, Jan. 14, 2011, 4 pages total, XP030008149.

Written Opinion (PCT/ISA/237) dated Oct. 15, 2019, issued by the International Searching Authority in counterpart International Application No. PCT/KR2019/005671.

Office Action dated Sep. 1, 2023 by the Chinese Patent Office in corresponding CN Patent Application No. 201980046492.9.

* cited by examiner

FIG. 3
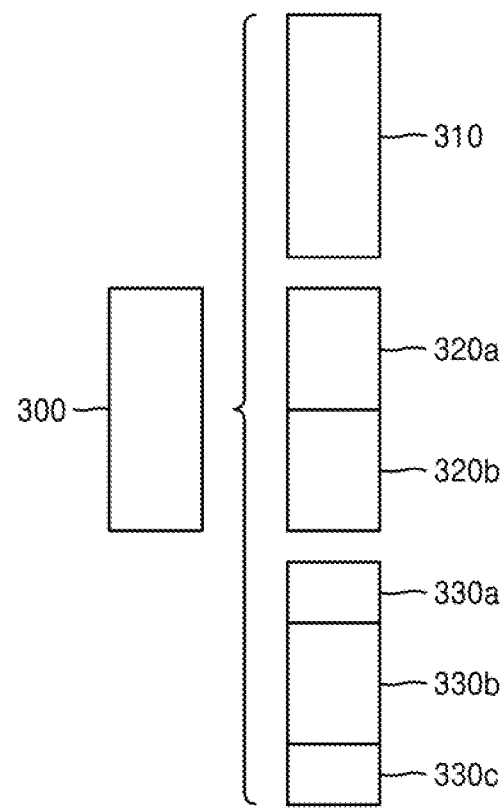
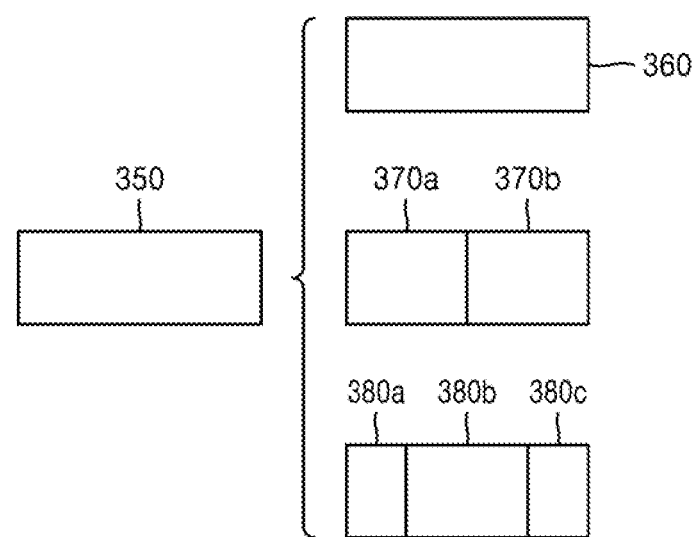

FIG. 12

| BLOCK SHAPE / DEPTH | 0: SQUARE | 1: NS_VER | 2: NS_HOR |
|---|---|---|---|
| DEPTH D | 1200 | 1210 | 1220 |
| DEPTH D+1 | 1202 | 1212 | 1222 |
| DEPTH D+2 | 1204 | 1214 | 1224 |
| ... | ... | ... | ... |

ENCODING METHOD AND DEVICE THEREFOR, AND DECODING METHOD AND DEVICE THEREFOR

CROSS-REFERENCE TO RELATED APPLICATIONS

This is a continuation application of U.S. application Ser. No. 17/054,347 filed on Nov. 10, 2020, which is a National Stage of International Application of PCT/KR2019/005671 filed May 10, 2019, claiming priority based on U.S. Provisional Application No. 62/669,548 filed on May 10, 2018, the contents of all of which are incorporated herein by reference in their entirety.

TECHNICAL FIELD

The present disclosure relates to a video encoding method and a video decoding method, and more particularly, to a method of efficiently encoding and decoding information about a motion vector.

BACKGROUND ART

A large amount of data is required when a high-quality video is encoded. However, because a bandwidth allowed to transmit video data is limited, a data rate applied to transmit the video data may be limited. Hence, in order to efficiently transmit video data, there is demand for video data encoding and decoding methods with minimal degradation of image quality and increased compression rates.

Video data may be compressed by removing spatial redundancy and temporal redundancy between pixels. Because adjacent pixels generally have common characteristics, encoding information is transmitted in a data unit consisting of pixels in order to remove redundancy between the adjacent pixels.

Pixel values of the pixels included in the data unit are not directly transmitted, but information about a method of obtaining the pixel values is transmitted. A prediction method of predicting a pixel value that is similar to an original value is determined for each data unit, and encoding information about the prediction method is transmitted from an encoder to a decoder. Because a predicted value is not completely the same as the original value, residual data of a difference between the original value and the predicted value is transmitted from the encoder to the decoder.

As the accuracy of prediction increases, encoding information required to specify a prediction method increases but a size of residual data decreases. Accordingly, a prediction method is determined in consideration of a size of residual data and encoding information. In particular, data units split from a picture have various sizes, and as a size of a data unit increases, the likelihood of the accuracy of prediction decreasing increases whereas encoding information decreases. Accordingly, a size of a block is determined in accordance with characteristics of the picture.

Also, prediction methods include intra prediction and inter prediction. Intra prediction is a method of predicting pixels of a block from neighboring pixels around the block. Inter prediction is a method of predicting pixels by referring to pixels of another picture referenced by a picture including the block. Accordingly, spatial redundancy is removed in intra prediction, and temporal redundancy is removed in inter prediction.

As the number of prediction methods increases, the amount of encoding information for indicating the prediction methods increases. Accordingly, when encoding information applied to a block is predicted from another block, a size of the encoding information may be reduced.

Because loss of video data is allowed to the extent that the human eye may not recognize the loss, the amount of residual data may be reduced by performing lossy compression on the residual data according to transformation and quantization processes.

DESCRIPTION OF EMBODIMENTS

Technical Problem

Provided are a video encoding method and a video encoding device which encode a picture according to an inter mode. Also provided are a video decoding method and a video decoding device which decode a picture according to an inter mode. Also provided is a computer-readable recording medium having recorded thereon a program for executing a video encoding method and a video decoding method, according to an embodiment of the present disclosure, on a computer.

Solution to Problem

The present disclosure provides a video decoding method including determining, based on an area of a current block, whether a multi-prediction combination mode for predicting the current block by combining prediction results obtained according to a plurality of prediction modes is applied to the current block, when the multi-prediction combination mode is applied to the current block, determining the plurality of prediction modes to be applied to the current block, generating a plurality of prediction blocks of the current block, according to the plurality of prediction modes, and determining a combined prediction block of the current block, by combining the plurality of prediction blocks according to respective weights.

The present disclosure provides a video decoding method including obtaining, from a bitstream, differential motion vector derivation information indicating whether a differential motion vector of a first prediction direction is derived from a differential motion vector of a second prediction direction, obtaining, from the bitstream, first prediction motion vector information about a prediction motion vector of the first prediction direction, second prediction motion vector information about a prediction motion vector of the second prediction direction, and differential motion vector information about the differential motion vector of the second prediction direction, determining the prediction motion vector of the first prediction direction and the prediction motion vector and the differential motion vector of the second prediction direction, according to the first prediction motion vector information, the second prediction motion vector information, and the differential motion vector information, when the differential motion vector derivation information indicates that the differential motion vector of the first prediction direction is derived from the differential motion vector of the second prediction direction, determining the differential motion vector of the first prediction direction according to the differential motion vector of the second prediction direction, determining a motion vector of the first prediction direction according to the prediction motion vector and the differential motion vector of the first prediction direction, and determining a motion vector of the second prediction direction according to the prediction motion vector and the differential motion vector of the second prediction direction, and predicting the current block according to the motion vector of the first prediction direction and the motion vector of the second prediction direction.

The present disclosure provides a video decoding method including extracting a plurality of inter prediction candidates from neighboring blocks of a current block, by scanning the neighboring blocks of the current block, according to a scan order, generating an inter prediction candidate list including the plurality of inter prediction candidates, according to an inter prediction candidate order determined based on the scan order, changing the inter prediction candidate order of the inter prediction candidate list, adaptively according to the current block or the plurality of inter prediction candidates, and predicting the current block, based on the inter prediction candidate list in which the inter prediction candidate order is changed.

The present disclosure provides a video decoding method including obtaining a reference motion vector and a reference picture of a neighboring block adjacent to a current block, determining a reference picture of the current block, adjusting the reference motion vector of the neighboring block, according to a temporal difference between the reference picture of the neighboring block and a current picture and a temporal difference between the reference picture of the current block and the current picture, determining a motion vector of a sub-block included in the current block, according to the adjusted reference motion vector and a position of the sub-block of the current block, and predicting the sub-block according to the motion vector of the sub-block.

The present disclosure provides a video decoding method including determining a split mode of a current block, from among a rectangular split mode and a triangular split mode, splitting the current block into a plurality of sub-blocks, according to the split mode of the current block, determining a prediction block of the plurality of sub-blocks, and smoothing prediction pixels located on a boundary line of the prediction block of the plurality of sub-blocks by using a smoothing filter, wherein a number of filter coefficients and values of the filter coefficients of the smoothing filter are determined according to the split mode of the current block.

The present disclosure provides a video encoding method corresponding to the video decoding method.

The present disclosure provides a computer-recordable recording medium having embodied thereon a program for executing the video encoding method and the video decoding method.

The technical problems of the present embodiment are not limited to the aforementioned technical problems, and other unstated technical problems may be inferred from embodiments below.

Advantageous Effects of Disclosure

Because an inter prediction candidate order is adaptively changed according to a current block and a plurality of inter prediction modes, coding efficiency may be improved. Because a reference motion vector is adjusted according to a reference picture of a current block in a motion vector (MV) planar mode, inter prediction accuracy may be improved. Because some of inter prediction elements are implicitly determined, coding efficiency may be improved. Because a combined prediction block is smoothed in a multi-prediction combination mode, inter prediction accuracy may be improved. Because pixels on a boundary surface are smoothed in a triangular split mode, inter prediction accuracy may be improved.

BRIEF DESCRIPTION OF DRAWINGS

In order to more fully understand the accompanying drawings, a brief explanation of each drawing is provided.

FIG. 3 illustrates a process of determining at least one coding unit by splitting a non-square coding unit, according to an embodiment.

FIG. 12 illustrates a process of determining a depth of a coding unit as a shape and a size of the coding unit change, when the coding unit is recursively split such that a plurality of coding units are determined, according to an embodiment.

BEST MODE

Figure 1A:
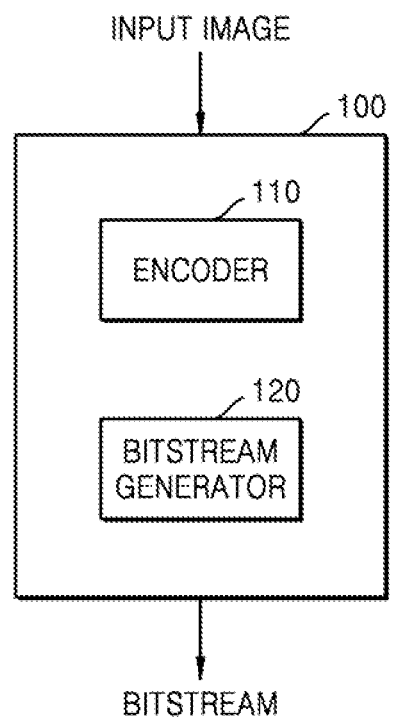
FIG. 1A is a block diagram of an image encoding device based on coding units having a tree structure, according to an embodiment of the present disclosure.

Provided is a video decoding method including determining, based on an area of a current block, whether a multi-prediction combination mode for predicting the current block by combining prediction results obtained according to a plurality of prediction modes is applied to the current block, when the multi-prediction combination mode is applied to the current block, determining the plurality of prediction modes to be applied to the current block, generating a plurality of prediction blocks of the current block, according to the plurality of prediction modes, and determining a combined prediction block of the current block, by combining the plurality of prediction blocks according to respective weights.

MODE OF DISCLOSURE

The advantages and features of the present disclosure and methods of achieving the advantages and features will be described more fully with reference to the accompanying drawings, in which embodiments of the disclosure are shown. The present disclosure may, however, be embodied in many different forms and should not be construed as being limited to the embodiments set forth herein; rather these embodiments are provided so that this disclosure will be thorough and complete, and will fully convey the concept of the present disclosure to one of ordinary skill in the art.

The terms used herein will be briefly described, and disclosed embodiments will be described in detail.

The terms used herein are those general terms currently widely used in the art in consideration of functions in the present disclosure but the terms may vary according to the intention of one of ordinary skill in the art, precedents, or new technology in the art. Also, some of the terms used herein may be arbitrarily chosen by the present applicant, and in this case, these terms are defined in detail below. Accordingly, the specific terms used herein should be defined based on the unique meanings thereof and the whole context of the present disclosure.

It is to be understood that the singular forms "a," "an," and "the" include plural referents unless the context clearly dictates otherwise.

It will be understood that when a certain part "includes" a certain component, the part does not exclude another component but may further include another component, unless the context clearly dictates otherwise. The term "~unit" used herein refers to a software component or a hardware component such as a field-programmable gate array (FPGA) or an application-specific integrated circuit (ASIC), which performs certain tasks. However, the term "~unit" is not limited to software or hardware. A "~unit" may be configured to be in an addressable storage medium or configured to operate one or more processors. Thus, a "~unit" may include, by way of example, components such as software components, object-oriented software components, class components, and task components, processes, functions, attributes, procedures, subroutines, segments of program code, drivers, firmware, microcode, circuitry, data, databases, data structures, tables, arrays, and variables. The functionality provided by the components and "~units" may be combined into fewer components and "~units" or further separated into additional components and "~units".

The term "current block" refers to one of a coding unit, a prediction unit, and a transform unit which are currently encoded or decoded. For convenience of explanation, a "current coding unit", a "current prediction unit", and a "current transform unit" may be used when other types of blocks such as a prediction unit and a transform unit need to be distinguished from one another. In addition, the term "lower block" refers to a data unit split from the "current block". The term "upper block" refers to a data unit including the "current block".

Also, the term 'sample' used herein refers to data that is assigned to a sampling location of an image and is to be processed. For example, pixel values in an image of a spatial domain or transform coefficients in a transform domain may be samples. A unit including at least one sample may be defined as a block.

The present disclosure will now be described more fully with reference to the accompanying drawings for one of ordinary skill in the art to be able to perform the present disclosure without any difficulty. In addition, portions irrelevant to the descriptions of the present disclosure will be omitted in the drawings for clear descriptions of the present disclosure.

FIG. 1A is a block diagram of an image encoding device 100 based on coding units having a tree structure according to an embodiment of the present disclosure.

The image encoding device 100 includes an encoder 110 and a bitstream generator 120.

The encoder 110 may first split one picture into one or more slices or one or more tiles. The encoder 110 splits a picture or a slice or a tile included in the picture into a plurality of largest coding units according to a size of a largest coding unit. The largest coding unit may be a data unit having a size of 32×32, 64×64, 128×128, 256×256, or the like, wherein a shape of the data unit is a square shape having a width and length in powers of 2. The encoder 110 may provide largest coding unit size information indicating the size of the largest coding unit to the bitstream generator 120. The bitstream generator 120 may cause the largest coding unit size information to be included in a bitstream.

The encoder 110 determines coding units by splitting the largest coding unit. Whether to split a coding unit is determined according to whether splitting the coding unit is efficient according to rate-distortion optimization. Then, split information indicating whether the coding unit is split may be generated. The split information may be expressed by using a flag.

A coding unit may be split by using various methods. For example, a square coding unit may be split into four square coding units whose width and height are half those of the square coding unit. A square coding unit may be split into two rectangular coding units whose width is half that of the square coding unit. A square coding unit may be split into two rectangular coding units whose height is half that of the square coding unit. A square coding unit may be split into three coding units by splitting a width or height at 1:2:1.

A rectangular coding unit whose width is twice a height may be split into two square coding units. A rectangular coding unit whose width is twice a height may be split into two rectangular coding units whose width is four times a height. A rectangular coding unit whose width is twice a height may be split into two rectangular coding units and one square coding unit by splitting a width at 1:2:1.

Likewise, a rectangular coding unit whose height is twice a width may be split into two square coding units. Also, a rectangular coding unit whose height is twice a width may be split into two rectangular coding units whose height is four times a width. Likewise, a rectangular coding unit whose height is twice a width may be split into two rectangular coding units and one square coding unit by splitting a height at 1:2:1.

When the image encoding device 100 may use two or more splitting methods, information about splitting methods that may be used for coding units among the splitting methods that may be used by the image encoding device 100 may be determined for each picture. Therefore, only specific splitting methods may be determined to be used for each picture. When the image encoding device 100 uses only one splitting method, information about a splitting method that may be used for coding units is not separately determined.

A coding unit having a preset size may be split by using a specific splitting method. For example, when a size of a coding unit is 256×265, the coding unit may be set to be split into only four square units whose width and height are half those of the coding unit.

When split information of a coding unit indicates that the coding unit is split, split shape information indicating a splitting method of the coding unit may be generated. When there is only one splitting method that may be used in a picture to which a coding unit belongs, split shape information may not be generated. When a splitting method is adaptively determined to encoding information around a coding unit, split shape information may not be generated.

As described above, image data of a current picture is split into largest coding units according to a maximum size of a coding unit. Each of the largest coding units may include coding units hierarchically split from the largest coding unit. A shape and a position of a lower coding unit may be determined according to a split shape of an upper coding unit. A minimum size of a coding unit that limits splitting of the coding unit may be preset.

The encoder 110 compares coding efficiency when a coding unit is hierarchically split with coding efficiency when the coding unit is not split. Then, the encoder 110 determines whether to split the coding unit according to a comparison result. When it is determined that it is more efficient to split the coding unit, the encoder 110 splits the coding unit hierarchically. When it is determined that it is efficient not to split the coding unit according to the comparison result, the encoder 110 does not split the coding unit. Whether to split a coding unit may be determined regardless of whether adjacent coding units are split.

A finally split coding unit may be predicted by using intra prediction or inter prediction. Intra prediction is a method of predicting samples of a prediction unit by using reference samples around the prediction unit. Inter prediction is a method of predicting samples of a prediction unit by obtaining reference samples from a reference picture referenced by a current picture.

For intra prediction, the encoder 110 may select a most efficient intra prediction method by applying a plurality of intra prediction methods to a prediction unit. The intra prediction method includes a DC mode, a planar mode, and a directional mode such as a vertical mode or a horizontal mode.

When a reconstructed sample around a coding unit is used as a reference sample, intra prediction may be performed for each prediction unit. However, when a reconstructed sample in a coding unit is used as a reference sample, reconstruction of the reference sample in the coding unit has to precede prediction, and thus a prediction order of a prediction unit may depend on a transformation order of a transform unit. Therefore, when the reconstructed sample in the coding unit is used as the reference sample, only an intra prediction method for transform units corresponding to the prediction unit may be determined, and actual intra prediction may be performed for each transform unit.

The encoder 110 may select a most efficient inter prediction method by determining an optimal motion vector and an optimal reference picture. For inter prediction, a coding unit determiner 120 (the encoder 110?) may determine a plurality of motion vector candidates from a coding unit that is spatially and temporally adjacent to a current coding unit, and may determine, from among the motion vector candidates, a most efficient motion vector as a motion vector. Likewise, the encoder 110 may determine a plurality of reference picture candidates from the coding unit that is spatially and temporally adjacent to the current coding unit, and may determine a most efficient reference picture from among the reference picture candidates. According to an embodiment, the reference picture may be determined from reference picture lists that are pre-determined for a current picture. According to the embodiment, for accuracy of prediction, the most efficient motion vector from among the plurality of motion vector candidates may be determined as a prediction motion vector, and a motion vector may be determined by correcting the prediction motion vector. Inter prediction may be performed in parallel for each prediction unit in the coding unit.

The encoder 110 may reconstruct a coding unit by obtaining only information indicating a motion vector and a reference picture according to a skip mode. According to the skip mode, all encoding information including a residual signal is skipped, except for the information indicating the motion vector and the reference picture. Because the residual signal is skipped, the skip mode may be used when accuracy of prediction is very high.

A partition mode to be used may be limited according to a prediction method for a prediction unit. For example, only partition modes for a prediction unit having a size of 2N×2N or N×N may be applied to intra prediction, whereas partition modes for a prediction unit having a size of 2N×2N, 2N×N, N×2N, or N×N may be applied to inter prediction. In addition, only a partition mode for a prediction unit having a size of 2N×2N may be applied to a skip mode of the inter prediction. A partition mode for each prediction method in the image encoding device 100 may vary according to coding efficiency.

The image encoding device 100 may perform transformation based on a coding unit. The image encoding device 100 may transform residual data that is a difference value between an original value and a prediction value with respect to pixels included in a coding unit, through a certain process. For example, the image encoding device 100 may perform lossy-compression on the residual data through quantization and discrete cosine transform (DCT)/discrete sine transform (DST). Alternatively, the image encoding device 100 may perform lossless-compression on the residual data without quantization.

In conclusion, the encoder 110 determines a most efficient prediction method for a current coding unit from among a plurality of intra prediction methods and inter prediction methods. Then, the encoder 110 determines a prediction method for the current coding unit according to coding efficiency according to a prediction result. Likewise, the encoder 110 determines a transformation method according to coding efficiency according to a transformation result. Coding efficiency of a coding unit is finally determined according to a most efficient coding unit prediction method and transformation method determination scheme. The encoder 110 finalizes a hierarchical structure of a largest coding unit according to coding efficiency of a coding unit that is finally split.

The encoder 110 may measure coding efficiency of coding units, prediction efficiency of prediction methods, or the like by using rate-distortion optimization based on Lagrangian multipliers.

The encoder 110 may generate split information indicating whether to split a coding unit according to the determined hierarchical structure of the largest coding unit. Then, the encoder 110 may generate, for split coding units, partition mode information for determining a prediction unit and transform unit split information for determining a transform unit. In addition, when the coding unit may be split by using at least two splitting methods, the encoder 110 may generate both split information and split shape information that indicates a splitting method. The encoder 110 may generate information about a prediction method and a transformation method that are used for the prediction unit and the transform unit.

The bitstream generator 120 may output, in a bitstream, a plurality of pieces of information generated by the encoder 110 according to the hierarchical structure of the largest coding unit.

A method of determining a coding unit, a prediction unit, and a transform unit according to a tree structure of a largest coding unit according to an embodiment will be described below in detail with reference to FIGS. 3 through 12.

Figure 1B:
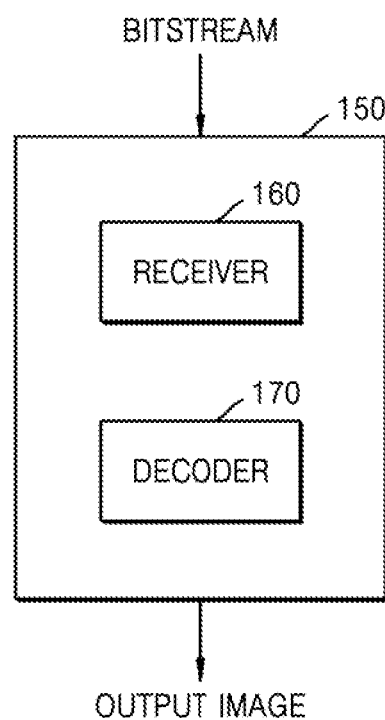
FIG. 1B is a block diagram of an image decoding device based on coding units having a tree structure, according to an embodiment.

FIG. 1B is a block diagram of an image decoding device 150 based on coding units having a tree structure according to an embodiment.

The image decoding device 150 includes a receiver 160 and a decoder 170.

Definitions of the terms including a coding unit, a prediction unit, a transform unit, various split information, etc. for a decoding operation performed by the image decoding device 150 are the same as those described above with reference to FIG. 1A and the image encoding device 100. Also, because the image decoding device 150 is designed to reconstruct image data, various encoding methods used by the image encoding device 100 may be applied to the image decoding device 150.

The receiver 160 receives and parses a bitstream regarding an encoded video. The decoder 170 extracts, from the parsed bitstream, a plurality of pieces of information for decoding largest coding units, and provides the information to the decoder 170. The decoder 170 may extract information about a maximum size of a coding unit of a current picture from a header, a sequence parameter set, or a picture parameter set of the current picture.

The decoder 170 extracts, from the parsed bitstream, split information of coding units having a tree structure according to each largest coding unit. The extracted split information is output to the decoder 170. The decoder 170 may split a largest coding unit according to the extracted split information, to determine a tree structure of the largest coding unit.

The split information extracted by the decoder 170 is split information of a tree structure determined by the image encoding device 100 to generate a minimum coding error. Therefore, the image decoding device 150 may reconstruct an image by decoding data according to a decoding method that generates the minimum coding error.

The decoder 170 may extract split information of a data unit, such as a prediction unit and a transform unit included in a coding unit. For example, the decoder 170 may extract information about a most efficient partition mode for a prediction unit. The decoder 170 may extract transformation split information of a most efficient tree structure for a transform unit.

Also, the decoder 170 may obtain information about a most efficient prediction method for prediction units split from a coding unit. Then, the decoder 170 may obtain information about a most efficient transformation method for transform units split from a coding unit.

The decoder 170 extracts information from a bitstream according to a method in which the bitstream generator 120 of the image encoding device 100 constructs the bitstream.

The decoder 170 may split a largest coding unit into coding units having a most efficient tree structure based on split information. Then, the decoder 170 may split a coding unit into prediction units according to information about a partition mode. The decoder 170 may split a coding unit into transform units according to transformation split information.

The decoder 170 may predict a prediction unit according to information about a prediction method. The decoder 170 may perform inverse quantization and inverse transformation on residual data that is a difference between an original value and a prediction value of a pixel according to information about a method of transforming a transform unit. The decoder 170 may reconstruct pixels of a coding unit according to a prediction result of the prediction unit and a transformation result of the transform unit.

Figure 2:
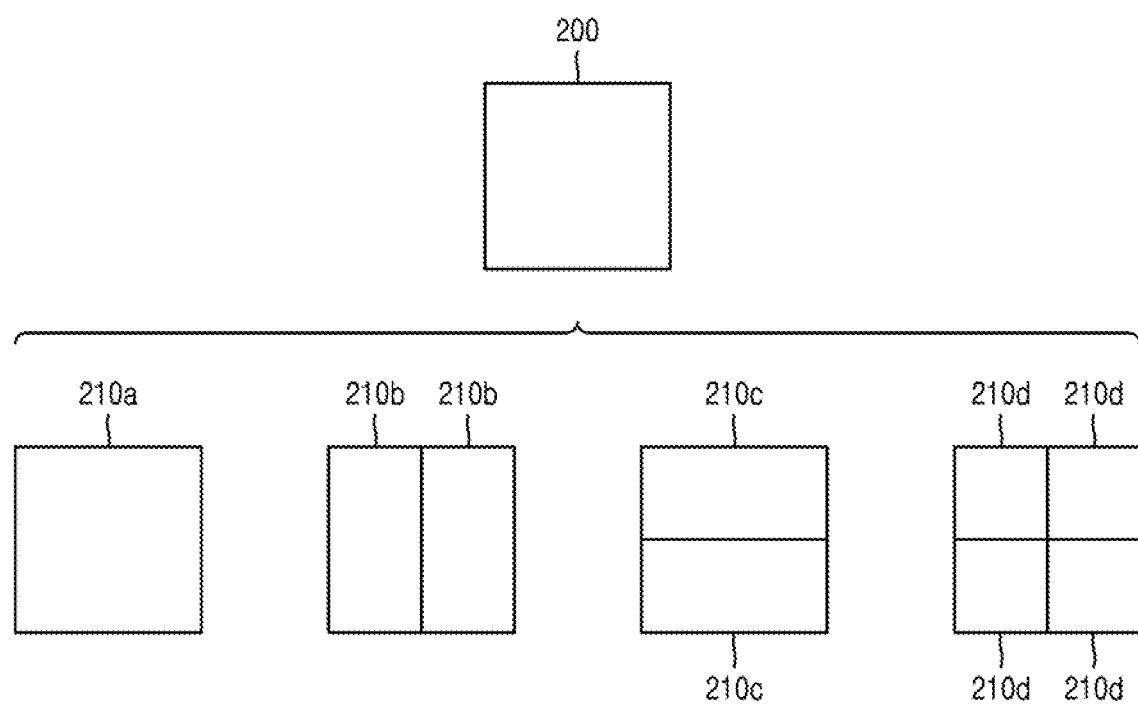
FIG. 2 illustrates a process of determining at least one coding unit by splitting a current coding unit, according to an embodiment.

FIG. 2 illustrates a process, performed by the image decoding device 150, of determining at least one coding unit by splitting a current coding unit according to an embodiment.

According to an embodiment, the image decoding device 150 may determine a shape of a coding unit by using block shape information, and may determine a shape according to which the coding unit is to be split by using split shape information. That is, a coding unit splitting method, which is indicated by the split shape information, may be determined according to which block shape is indicated by the block shape information used by the image decoding device 150.

According to an embodiment, the image decoding device 150 may use the block shape information indicating that the current coding unit has a square shape. For example, the image decoding device 150 may determine whether not to split a square coding unit, whether to vertically split the square coding unit, whether to horizontally split the square coding unit, or whether to split the square coding unit into four coding units according to the split shape information. Referring to FIG. 2, when block shape information of a current coding unit 200 indicates a square shape, a decoder 180 may not split a coding unit 210a having the same size as the current coding unit 200 according to split shape information indicating not to perform splitting, or may determine coding units 210b, 210c, and 210d split based on split shape information indicating a certain splitting method.

Referring to FIG. 2, the image decoding device 150 may determine two coding units 210b obtained by vertically splitting the current coding unit 200 based on split shape information indicating to vertically perform splitting according to an embodiment. The image decoding device 150 may determine two coding units 210c obtained by horizontally splitting the current coding unit 200 based on split shape information indicating to horizontally perform splitting. The image decoding device 150 may determine four coding units 210d obtained by vertically and horizontally splitting the current coding unit 200 based on split shape information indicating to vertically and horizontally perform splitting. However, a split shape for splitting a square coding unit may not be limited to the above shapes, and may include various shapes that may be indicated by split shape information. Split shapes for splitting a square coding unit will be described in detail below through various embodiments.

FIG. 3 illustrates a process, performed by the image decoding device 150, of determining at least one coding unit by splitting a non-square coding unit according to an embodiment.

According to an embodiment, the image decoding device 150 may use block shape information indicating that a current coding unit has a non-square shape. The image decoding device 150 may determine, according to split shape information, whether not to split the current non-square coding unit or whether to split the non-square current coding unit by using a certain method. Referring to FIG. 3, when block shape information of a current coding unit 300 or 350 indicates a non-square shape, the image decoding device 150 may not split a coding unit 310 or 360 having the same size as the current coding unit 300 or 350 according to split shape information indicating not to perform splitting, or may determine coding units 320a, 320b, 330a, 330b, 330c, 370a, 370b, 380a, 380b, and 380c split according to split shape information indicating a certain splitting method. A certain splitting method of splitting a non-square coding unit will be described in detail below through various embodiments.

According to an embodiment, the image decoding device 150 may determine a shape according to which a coding unit is split by using the split shape information, and in this case, the split shape information may indicate the number of at least one coding unit generated when the coding unit is split. Referring to FIG. 3, when the split shape information indicates that the current coding unit 300 or 350 is split into two coding units, the image decoding device 150 may determine two coding units 320a and 320b or 370a and 370b, which are respectively included in the current coding unit 300 or 350 by splitting the current coding unit 300 or 350 based on the split shape information.

According to an embodiment, when the image decoding device 150 splits the current coding unit 300 or 350 having the non-square shape based on the split shape information, the image decoding device 150 may split the current coding unit 300 or 350 having the non-square shape in consideration of a location of a long side of the current coding unit 300 or 350. For example, the image decoding device 150 may determine a plurality of coding units by splitting the current coding unit 300 or 350 in a direction of splitting the long side of the current coding unit 300 or 350 in consideration of the shape of the current coding unit 300 or 350.

According to an embodiment, when the split shape information indicates that a coding unit is split into an odd number of blocks, the image decoding device 150 may determine an odd number of coding units included in the current coding unit 300 or 350. For example, when the split shape information indicates that the current coding unit 300 or 350 is split into three coding units, the image decoding device 150 may split the current coding unit 300 or 350 into three coding units 330a, 330b, and 330c or 380a, 380b, and 380c. According to an embodiment, the image decoding device 150 may determine the odd number of coding units included in the current coding unit 300 or 350, and sizes of the determined coding units may not be the same. For example, a size of the coding unit 330b or 380b from among the odd number of coding units 330a, 330b, and 330c or 380a, 380b, and 380c may be different from sizes of the coding units 330a and 330c or 380a and 380c. That is, coding units that may be determined when the current coding unit 300 or 350 is split may have multiple sizes.

According to an embodiment, when the split shape information indicates that a coding unit is split into an odd number of blocks, the image decoding device 150 may determine an odd number of coding units included in the current coding unit 300 or 350 and may put a restriction on at least one coding unit from among the odd number of coding units generated by splitting the current coding unit 300 or 350. Referring to FIG. 3, the image decoding device 150 may decode the coding unit 330b or 380b at the center of the three coding units 330a, 330b, and 330c or 380a, 380b, and 380c generated when the current coding unit 300 or 350 is split, in a different manner from the coding units 330a and 330c or 380a and 380c. For example, the image decoding device 150 may restrict the coding unit 330b or 380b at the center not to be further split or to be split only a certain number of times, unlike the coding units 330a and 330c or 380a and 380c.

Figure 4:
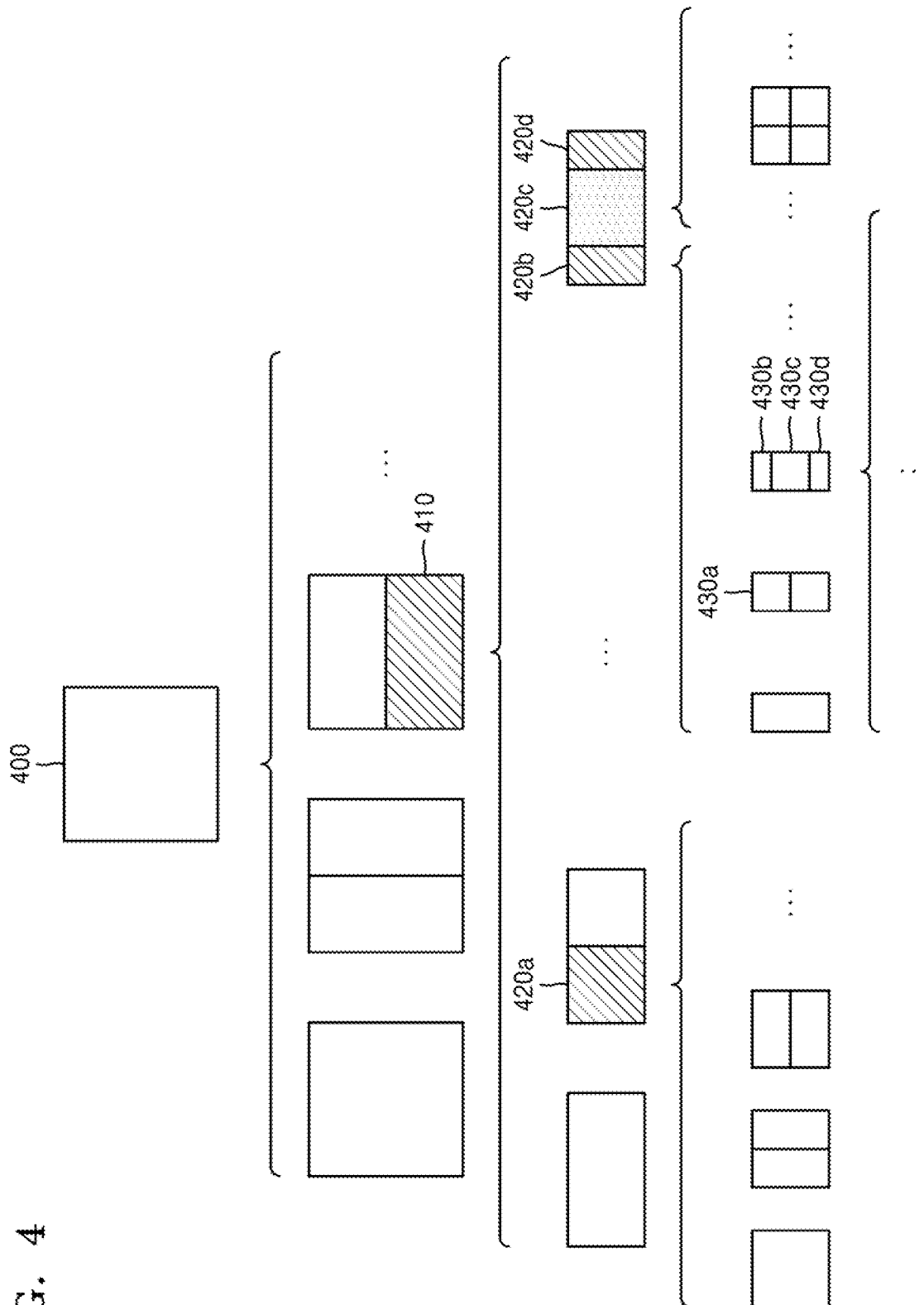
FIG. 4 illustrates a process of splitting a coding unit based on at least one of block shape information and split shape information, according to an embodiment.

FIG. 4 illustrates a process, performed by the image decoding device 150, of splitting a coding unit based on at least one of block shape information and split shape information according to an embodiment.

According to an embodiment, the image decoding device 150 may determine to split or not to split a square first coding unit 400 into coding units based on at least one of the block shape information and the split shape information. According to an embodiment, when the split shape information indicates to split the first coding unit 400 in a horizontal direction, the image decoding device 150 may determine a second coding unit 410 by splitting the first coding unit 400 in a horizontal direction. A first coding unit, a second coding unit, and a third coding unit used according to an embodiment are terms used to understand a relation before and after splitting a coding unit. For example, the second coding unit may be determined by splitting the first coding unit, and the third coding unit may be determined by splitting the second coding unit. It will be understood that a relationship among the first coding unit, the second coding unit, and the third coding unit applies to the following descriptions.

According to an embodiment, the image decoding device 150 may determine to split or not to split the determined second coding unit 410 into coding units, based on at least one of the block shape information and the split shape information. Referring to FIG. 4, the image decoding device 150 may split the non-square second coding unit 410, which is determined by splitting the first coding unit 400, into one or more third coding units 420a, or 420b, 420c, and 420d based on at least one of the block shape information and the split shape information, or may not split the non-square second coding unit 410. The image decoding device 150 may obtain at least one of the block shape information and the split shape information, and may split a plurality of various-shaped second coding units (e.g., 410) by splitting the first coding unit 400, based on at least one of the obtained block shape information and split shape information, and the second coding unit 410 may be split by using a splitting method of the first coding unit 400 based on at least one of the block shape information and the split shape information. According to an embodiment, when the first coding unit 400 is split into the second coding units 410 based on at least one of the block shape information and the split shape information of the first coding unit 400, the second coding unit 410 may also be split into the third coding units 420a, or 420b, 420c, and 420d based on at least one of the block shape information and the split shape information of the second coding unit 410. That is, a coding unit may be recursively split based on at least one of the block shape information and the split shape information of each coding unit. A method that may be used to recursively split a coding unit will be described below through various embodiments.

According to an embodiment, the image decoding device 150 may split each of the third coding units 420a, or 420b, 420c, and 420d into coding units, based on at least one of the block shape information and the split shape information, or may determine not to split the second coding unit 410 based on at least one of the block shape information and the split shape information. According to an embodiment, the image decoding device 150 may split the non-square second coding unit 410 into the odd number of third coding units 420b, 420c, and 420d. The image decoding device 150 may put a certain restriction on a third coding unit from among the odd number of third coding units 420b, 420c, and 420d. For example, the image decoding device 150 may restrict the third coding unit 420c at a center location from among the odd number of third coding units 420b, 420c, and 420d to be no longer split or to be split a settable number of times.

Referring to FIG. 4, the image decoding device 150 may restrict the third coding unit 420c, which is at the center location from among the odd number of third coding units 420b, 420c, and 420d included in the non-square second coding unit 410, to be no longer split, to be split by using a certain splitting method (e.g., split into only four coding units or split into a shape corresponding to that into which the second coding unit 410 is split), or to be split only a certain number of times (e.g., split only n times (where n>0)). However, the restrictions on the third coding unit 420c at the center location are not limited to the above-described examples, and may include various restrictions for decoding the third coding unit 420c at the center location differently from the other third coding units 420b and 420d.

According to an embodiment, the image decoding device 150 may obtain at least one of block shape information and split shape information, which is used to split a current coding unit, from a certain location in the current coding unit.

According to an embodiment, when a current coding unit is split into a certain number of coding units, the image decoding device 150 may select one of the coding units. Various methods that may be used to select one of a plurality of coding units will be described below through various embodiments.

According to an embodiment, the image decoding device 150 may split a current coding unit into a plurality of coding units, and may determine a coding unit at a certain location.

Figure 5:
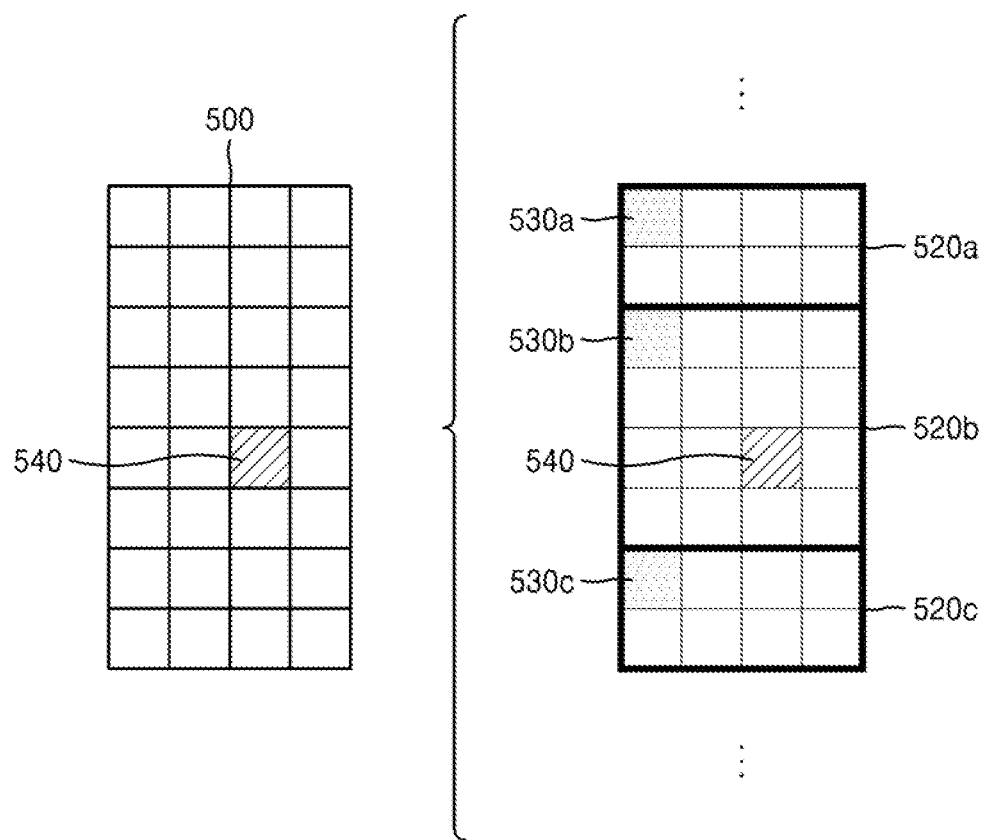
FIG. 5 illustrates a method of determining a coding unit from among an odd number of coding units, according to an embodiment.

FIG. 5 illustrates a method, performed by the image decoding device 150, of determining a coding unit of a certain location from among an odd number of coding units according to an embodiment.

According to an embodiment, the image decoding device 150 may use information indicating locations of an odd number of coding units to determine a coding unit at a center location from among the odd number of coding units. Referring to FIG. 5, the image decoding device 150 may determine an odd number of coding units 520a, 520b, and 520c by splitting a current coding unit 500. The image decoding device 150 may determine the coding unit 520b at a center location by using information about locations of the odd number of coding units 520a, 520b, and 520c. For example, the image decoding device 150 may determine the coding unit 520b of the center location by determining the locations of the coding units 520a, 520b, and 520c based on information indicating locations of certain samples included in the coding units 520a, 520b, and 520c. In detail, the image decoding device 150 may determine the coding unit 520b at the center location by determining the locations of the coding units 520a, 520b, and 520c based on information indicating locations of top left samples 530a, 530b, and 530c of the coding units 520a, 520b, and 520c.

According to an embodiment, the information indicating the locations of the top left samples 530a, 530b, and 530c, which are included in the coding units 520a, 520b, and 520c, respectively, may include information about locations or coordinates of the coding units 520a, 520b, and 520c in a picture. According to an embodiment, the information indicating the locations of the top left samples 530a, 530b, and 530c, which are respectively included in the coding units 520a, 520b, and 520c, may include information indicating widths or heights of the coding units 520a, 520b, and 520c included in the current coding unit 500, and the widths or heights may correspond to information indicating differences between the coordinates of the coding units 520a, 520b, and 520c in the picture. That is, the image decoding device 150 may determine the coding unit 520b at the center location by directly using the information about the locations or coordinates of the coding units 520a, 520b, and 520c in the picture, or by using the information about the widths or heights of the coding units, which correspond to difference values between the coordinates.

According to an embodiment, information indicating the location of the top left sample 530a of the upper coding unit 520a may include coordinates (xa, ya), information indicating the location of the top left sample 530b of the middle coding unit 520b may include coordinates (xb, yb), and information indicating the location of the top left sample 530c of the lower coding unit 520c may include coordinates (xc, yc). The image decoding device 150 may determine the middle coding unit 520b by using the coordinates of the top left samples 530a, 530b, and 530c which are included in the coding units 520a, 520b, and 520c, respectively. For example, when the coordinates of the top left samples 530a, 530b, and 530c are sorted in an ascending or descending order, the coding unit 520b including the coordinates (xb, yb) of the sample 530b at a center location may be determined as a coding unit at a center location from among the coding units 520a, 520b, and 520c determined by splitting the current coding unit 500. However, the coordinates indicating the locations of the top left samples 530a, 530b, and 530c may include coordinates indicating absolute locations in the picture, or may use coordinates (dxb, dyb) indicating a relative location of the top left sample 530b of the middle coding unit 520b and coordinates (dxc, dyc) indicating a relative location of the top left sample 530c of the lower coding unit 520c, with reference to the location of the top left sample 530a of the upper coding unit 520a. Also, a method of determining a coding unit at a certain location by using coordinates of a sample included in the coding unit as information indicating a location of the sample is not limited to the above-described method, and may include various arithmetic methods capable of using the coordinates of the sample.

According to an embodiment, the image decoding device 150 may split the current coding unit 500 into the plurality of coding units 520a, 520b, and 520c, and may select one of the coding units 520a, 520b, and 520c based on a certain criterion. For example, the image decoding device 150 may select the coding unit 520b, which has a size different from that of the others, from among the coding units 520a, 520b, and 520c.

According to an embodiment, the image decoding device 150 may determine the widths or heights of the coding units 520a, 520b, and 520c by using the coordinates (xa, ya) indicating the location of the top left sample 530a of the upper coding unit 520a, the coordinates (xb, yb) indicating the location of the top left sample 530b of the middle coding unit 520b, and the coordinates (xc, yc) indicating the location of the top left sample 530c of the lower coding unit 520c. The image decoding device 150 may determine sizes of the coding units 520a, 520b, and 520c by using the coordinates (xa, ya), (xb, yb), and (xc, yc) indicating the locations of the coding units 520a, 520b, and 520c.

According to an embodiment, the image decoding device 150 may determine the width of the upper coding unit 520a to be xb-xa and the height of the upper coding unit 520a to be yb-ya. According to an embodiment, the image decoding device 150 may determine the width of the middle coding unit 520b to be xc-xb and the height of the middle coding unit 520b to be yc-yb. According to an embodiment, the image decoding device 150 may determine the width or height of the lower coding unit 520c by using the width or height of the current coding unit 500 and the widths and heights of the upper and middle coding units 520a and 520b. The image decoding device 150 may determine a coding unit, which has a size different from that of the others, based on the determined widths and heights of the coding units 520a to 520c. Referring to FIG. 5, the image decoding device 150 may determine the middle coding unit 520b, which has a size different from the size of the upper and lower coding units 520a and 520c, as the coding unit of the certain location. However, the above-described method, performed by the image decoding device 150, of determining a coding unit having a size different from the size of the other coding units merely corresponds to an example of determining a coding unit at a certain location by using sizes of coding units, which are determined based on coordinates of samples, and thus various methods of determining a coding unit at a certain location by comparing sizes of coding units, which are determined based on coordinates of certain samples, may be used.

However, locations of samples considered to determine locations of coding units are not limited to the above-described top left locations, and information about arbitrary locations of samples included in the coding units may be used.

According to an embodiment, the image decoding device 150 may select a coding unit at a certain location from among an odd number of coding units determined by splitting a current coding unit, considering a shape of the current coding unit. For example, when the current coding unit has a non-square shape, a width of which is longer than a height, the image decoding device 150 may determine the coding unit at the certain location in a horizontal direction. That is, the image decoding device 150 may determine one of coding units at different locations in a horizontal direction and may put a restriction on the coding unit. When the current coding unit has a non-square shape, a height of which is longer than a width, the image decoding device 150 may determine the coding unit at the certain location in a vertical direction. That is, the image decoding device 150 may determine one of coding units at different locations in a vertical direction and may put a restriction on the coding unit.

According to an embodiment, the image decoding device 150 may use information indicating respective locations of an even number of coding units, to determine the coding unit at the certain location from among the even number of coding units. The image decoding device 150 may determine an even number of coding units by splitting the current coding unit, and may determine the coding unit at the certain location by using information about locations of the even number of coding units. An operation related thereto may correspond to the operation of determining a coding unit at a certain location (e.g., a center location) from among an odd number of coding units, which has been described in detail above with reference to FIG. 5, and thus detailed descriptions thereof are not provided here.

According to an embodiment, when a non-square current coding unit is split into a plurality of coding units, certain information about a coding unit at a certain location may be used in a splitting operation to determine the coding unit at the certain location from among the plurality of coding units. For example, the image decoding device 150 may use at least one of block shape information and split shape information, which is stored in a sample included in a coding unit at a center location, in a splitting operation to determine the coding unit at the center location from among the plurality of coding units determined by splitting the current coding unit.

Referring to FIG. 5, the image decoding device 150 may split the current coding unit 500 into the plurality of coding units 520a, 520b, and 520c based on at least one of the block shape information and the split shape information, and may determine the coding unit 520b at a center location from among the plurality of the coding units 520a, 520b, and 520c. Furthermore, the image decoding device 150 may determine the coding unit 520b at the center location, in consideration of a location from which at least one of the block shape information and the split shape information is obtained. That is, at least one of the block shape information and the split shape information of the current coding unit 500 may be obtained from a sample 540 at a center location of the current coding unit 500 and, when the current coding unit 500 is split into the plurality of coding units 520a, 520b, and 520c based on at least one of the block shape information and the split shape information, the coding unit 520b including the sample 540 may be determined as the coding unit at the center location. However, information used to determine the coding unit at the center location is not limited to at least one of the block shape information and the split shape information, and various kinds of information may be used to determine the coding unit at the center location.

According to an embodiment, certain information for identifying the coding unit at the certain location may be obtained from a certain sample included in a coding unit to be determined. Referring to FIG. 5, the image decoding device 150 may use at least one of the block shape information and the split shape information, which is obtained from a sample at a certain location in the current coding unit 500 (e.g., a sample at a center location of the current coding unit 500) to determine a coding unit at a certain location from among the plurality of the coding units 520a, 520b, and 520c determined by splitting the current coding unit 500 (e.g., a coding unit at a center location from among a plurality of split coding units). That is, the image decoding device 150 may determine the sample at the certain location by considering a block shape of the current coding unit 500, may determine the coding unit 520b including a sample, from which certain information (e.g., at least one of the block shape information and the split shape information) may be obtained, from among the plurality of coding units 520a, 520b, and 520c determined by splitting the current coding unit 500, and may put a certain restriction on the coding unit 520b. Referring to FIG. 5, according to an embodiment, the image decoding device 150 may determine the sample 540 at the center location of the current coding unit 500 as the sample from which the certain information may be obtained, and may put a certain restriction on the coding unit 520b including the sample 540, in a decoding operation. However, the location of the sample from which the certain information may be obtained is not limited to the above-described location, and may include arbitrary locations of samples included in the coding unit 520b to be determined for a restriction.

According to an embodiment, the location of the sample from which the certain information may be obtained may be determined based on a shape of the current coding unit 500. According to an embodiment, the block shape information may indicate whether the current coding unit has a square or non-square shape, and the location of the sample from which the certain information may be obtained may be determined based on the shape. For example, the image decoding device 150 may determine a sample located on a boundary for splitting at least one of a width and height of the current coding unit in half, as the sample from which the certain information may be obtained, by using at least one of information about the width of the current coding unit and information about the height of the current coding unit. As another example, when the block shape information of the current coding unit indicates a non-square shape, the image decoding device 150 may determine one of samples adjacent to a boundary for splitting a long side of the current coding unit in half, as the sample from which the certain information may be obtained.

According to an embodiment, when the current coding unit is split into a plurality of coding units, the image decoding device 150 may use at least one of the block shape information and the split shape information to determine a coding unit at a certain location from among the plurality of coding units. According to an embodiment, the image decoding device 150 may obtain at least one of the block shape information and the split shape information from a sample at a certain location in a coding unit, and may split the plurality of coding units, which are generated by splitting the current coding unit, by using at least one of the block shape information and the split shape information, which is obtained from the sample of the certain location in each of the plurality of coding units. That is, a coding unit may be recursively split based on at least one of the block shape information and the split shape information, which is obtained from the sample at the certain location in each coding unit. An operation of recursively splitting a coding unit has been described above with reference to FIG. 4, and thus detailed descriptions thereof will not be provided here.

According to an embodiment, the image decoding device 150 may determine one or more coding units by splitting the current coding unit, and may determine an order of decoding the one or more coding units based on a certain block (e.g., the current coding unit).

Figure 6:
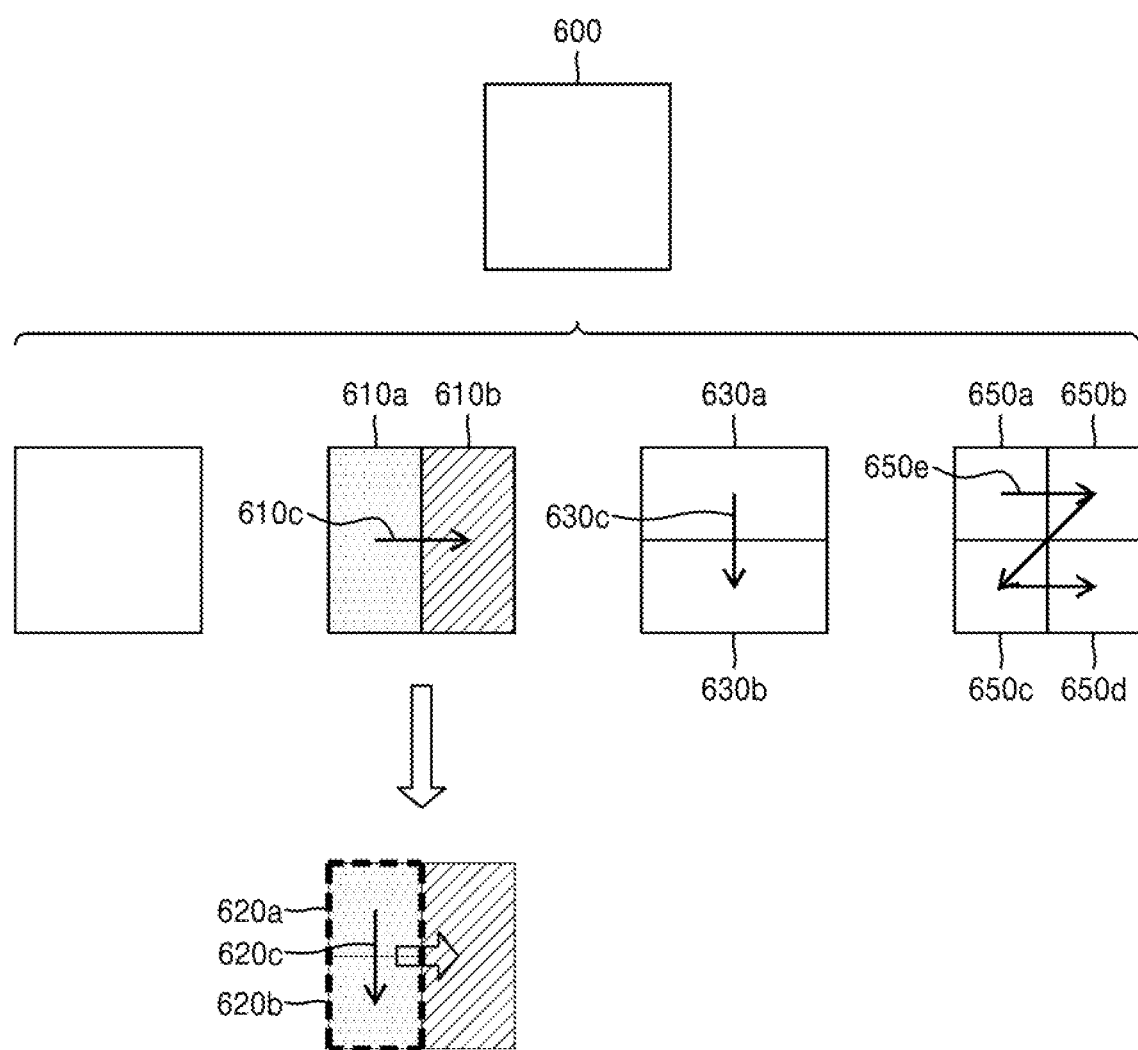
FIG. 6 illustrates an order of processing a plurality of coding units when the plurality of coding units are determined by splitting a current coding unit, according to an embodiment.

FIG. 6 illustrates an order of processing a plurality of coding units when the image decoding device 150 determines the plurality of coding units by splitting a current coding unit according to an embodiment.

According to an embodiment, the image decoding device 150 may determine second coding units 610a and 610b by splitting a first coding unit 600 in a vertical direction, may determine second coding units 630a and 630b by splitting the first coding unit 600 in a horizontal direction, or may determine second coding units 650a to 650d by splitting the first coding unit 600 in vertical and horizontal directions, based on block shape information and split shape information.

Referring to FIG. 6, the image decoding device 150 may determine to process the second coding units 610a and 610b, which are determined by splitting the first coding unit 600 in a vertical direction, in a horizontal direction order 610c. The image decoding device 150 may determine to process the second coding units 630a and 630b, which are determined by splitting the first coding unit 600 in a horizontal direction, in a vertical direction order 630c. The image decoding device 150 may determine to process the second coding units 650a to 650d, which are determined by splitting the first coding unit 600 in vertical and horizontal directions, according to a certain order (e.g., a raster scan order or a Z-scan order 650e) by which coding units in a row are processed and then coding units in a next row are processed.

According to an embodiment, the image decoding device 150 may recursively split coding units. Referring to FIG. 6, the image decoding device 150 may determine the plurality of second coding units 610a, 610b, 630a, 630b, 650a, 650b, 650c, and 650d by splitting the first coding unit 600, and may recursively split each of the determined plurality of second coding units 610a, 610b, 630a, 630b, 650a, 650b, 650c, and 650d. A method of splitting the plurality of second coding units 610a, 610b, 630a, 630b, 650a, 650b, 650c, and 650d may correspond to a method of splitting the first coding unit 600. Accordingly, each of the plurality of second coding units 610a, 610b, 630a, 630b, 650a, 650b, 650c, and 650d may be independently split into a plurality of coding units. Referring to FIG. 6, the image decoding device 150 may determine the second coding units 610a and 610b by splitting the first coding unit 600 in a vertical direction, and may determine to independently split or not to split each of the second coding units 610a and 610b.

According to an embodiment, the image decoding device 150 may determine third coding units 620a and 620b by splitting the left second coding unit 610a in a horizontal direction, and may not split the right second coding unit 610b.

According to an embodiment, a processing order of coding units may be determined based on an operation of splitting a coding unit. In other words, a processing order of split coding units may be determined based on a processing order of coding units immediately before being split. The image decoding device 150 may determine a processing order of the third coding units 620a and 620b determined by splitting the left second coding unit 610a, independently of the right second coding unit 610b. Because the third coding units 620a and 620b are determined by splitting the left second coding unit 610a in a horizontal direction, the third coding units 620a and 620b may be processed in a vertical direction order 620c. Because the left and right second coding units 610a and 610b are processed in the horizontal direction order 610c, the right second coding unit 610b may be processed after the third coding units 620a and 620b included in the left second coding unit 610a are processed in the vertical direction order 620c. An operation of determining a processing order of coding units based on a coding unit before being split is not limited to the above-described example, and various methods may be used to independently process coding units, which are split and determined to various shapes, in a certain order.

Figure 7:
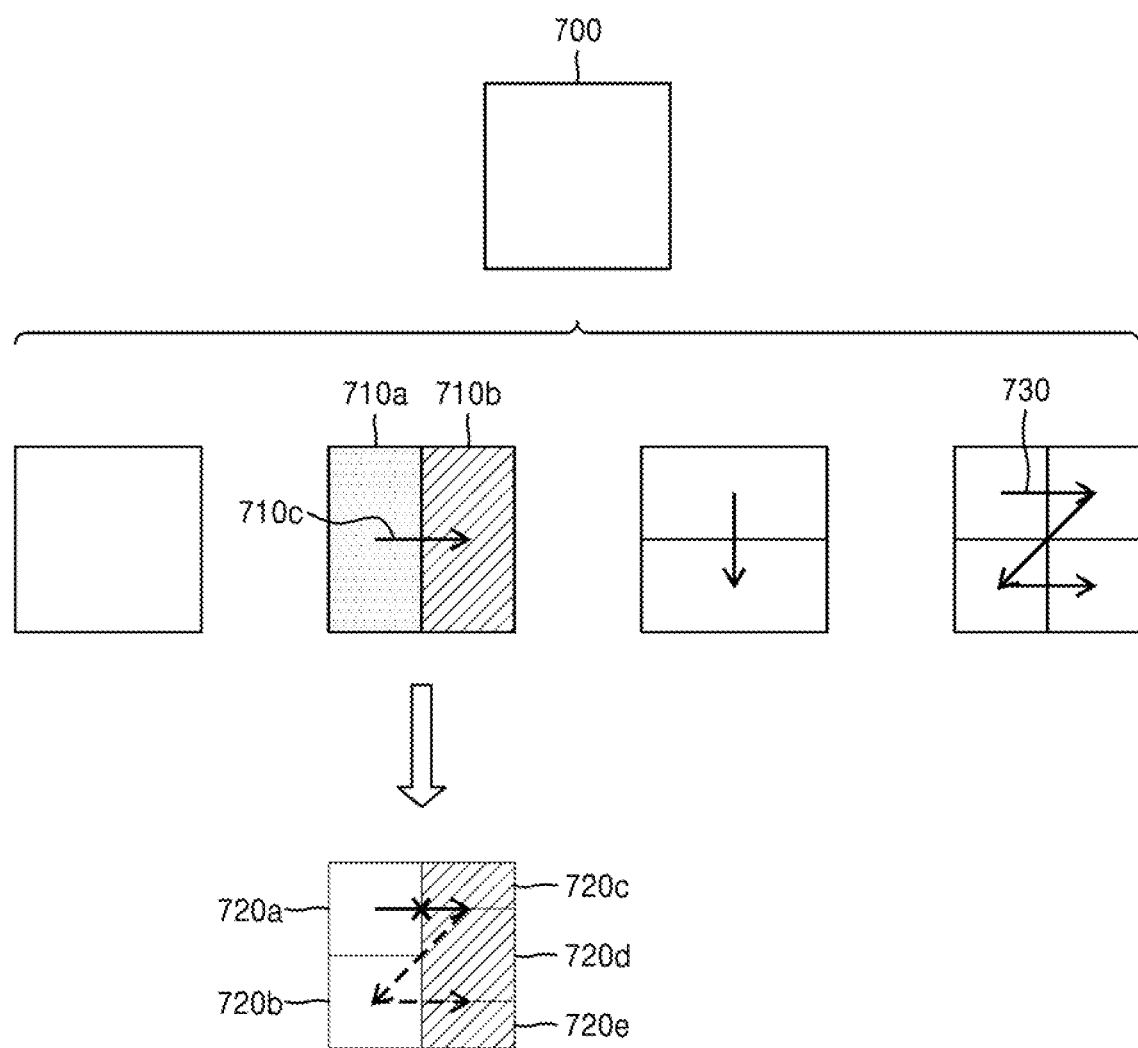
FIG. 7 illustrates a process of determining that a current coding unit is to be split into an odd number of coding units when the coding units are not processable in a coding order, according to an embodiment.

FIG. 7 illustrates a process, performed by the image decoding device 150, of determining that a current coding unit is to be split into an odd number of coding units when the coding units are not processable in a certain order according to an embodiment.

According to an embodiment, the image decoding device 150 may determine that the current coding unit is split into an odd number of coding units based on obtained block shape information and split shape information. Referring to FIG. 7, a square first coding unit 700 may be split into non-square second coding units 710a and 710b, and the second coding units 710a and 710b may be independently split into third coding units 720a and 720b, and 720c to 720e.

According to an embodiment, the image decoding device 150 may determine the plurality of third coding units 720a and 720b by splitting the left second coding unit 710a in a horizontal direction, and may split the right second coding unit 710b into an odd number of third coding units 720c to 720e.

According to an embodiment, the image decoding device 150 may determine whether any coding unit is split into an odd number of coding units, by determining whether the third coding units 720a and 720b, and 720c to 720e are processable in a certain order. Referring to FIG. 7, the image decoding device 150 may determine the third coding units 720a and 720b, and 720c to 720e by recursively splitting the first coding unit 700. The image decoding device 150 may determine whether any of the first coding unit 700, the second coding units 710a and 710b, and the third coding units 720a and 720b, and 720c, 720d, and 720e is split into an odd number of coding units, based on at least one of block shape information and split shape information. For example, a second coding unit located in the right from among the second coding units 710a and 710b may be split into an odd number of third coding units 720c, 720d, and 720e. A processing order of a plurality of coding units included in the first coding unit 700 may be a certain order (e.g., a Z-scan order 730), and the image decoding device 150 may determine whether the third coding units 720c, 720d, and 720e, which are determined by splitting the right second coding unit 710b into an odd number of coding units, satisfy a condition for processing in the certain order.

According to an embodiment, the image decoding device 150 may determine whether the third coding units 720a and 720b, and 720c, 720d, and 720e included in the first coding unit 700 satisfy the condition for processing in the certain order, and the condition relates to whether at least one of a width and height of the second coding units 710a and 710b is to be split in half along a boundary of the third coding units 720a and 720b, and 720c, 720d, and 720e. For example, although the third coding units 720a and 720b determined by splitting the height of the non-square left second coding unit 710a in half may satisfy the condition, because boundaries of the third coding units 720c, 720d, and 720e determined by splitting the right second coding unit 710b into three coding units do not split the width or height of the right second coding unit 710b in half, it may be determined that the third coding units 720c, 720d, and 720e do not satisfy the condition. When the condition is not satisfied as described above, the image decoding device 150 may decide disconnection of a scan order, and determine that the right second coding unit 710b is to be split into an odd number of coding units, based on a result of the decision. According to an embodiment, when a coding unit is split into an odd number of coding units, the image decoding device 150 may put a certain restriction on a coding unit at a certain location from among the split coding units, and the restriction or the certain location has been described above through various embodiments and thus detailed descriptions thereof will not be provided here.

Figure 8:
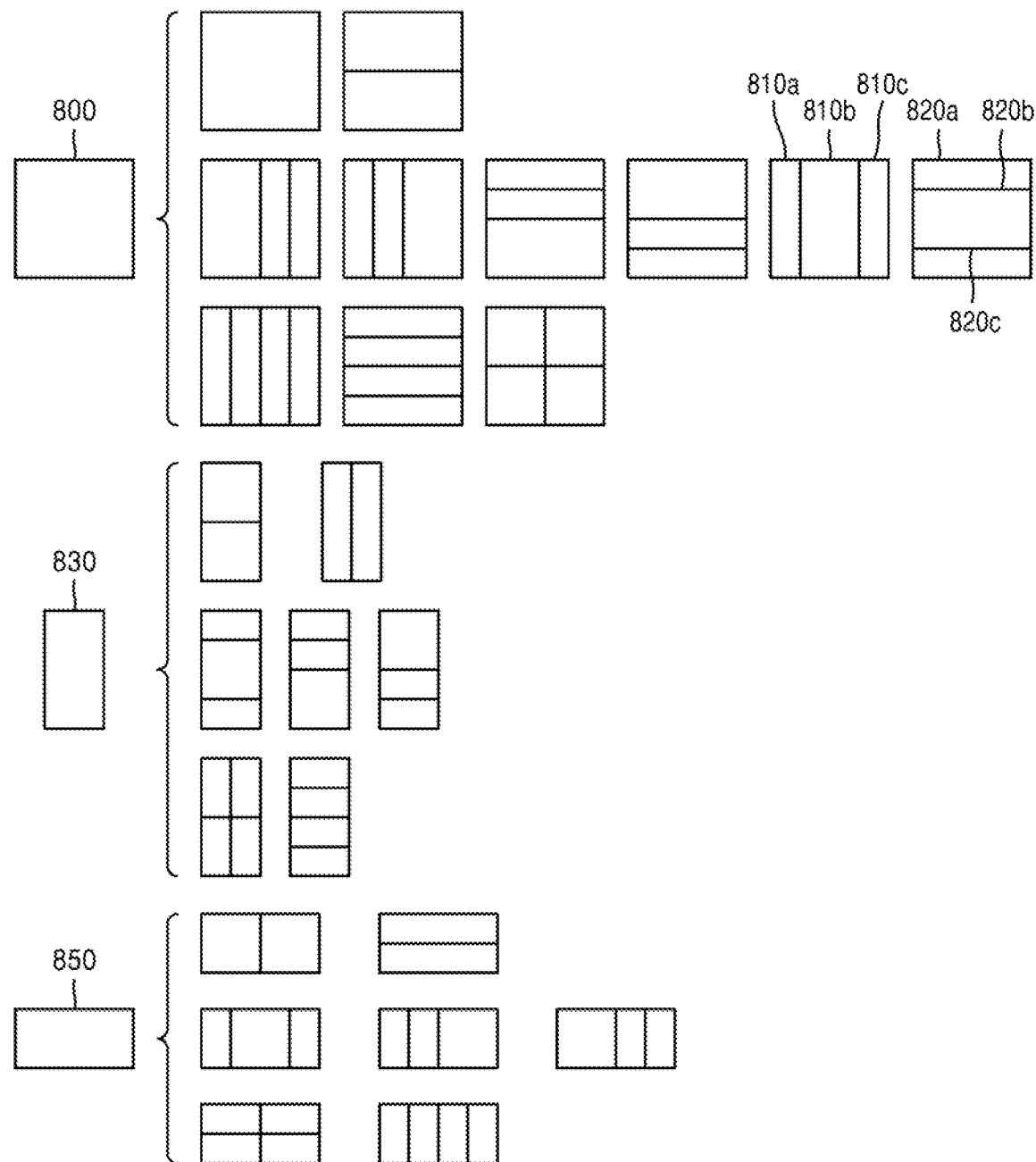
FIG. 8 illustrates a process of determining at least one coding unit by splitting a first coding unit, according to an embodiment.

FIG. 8 illustrates a process, performed by the image decoding device 150, of determining at least one coding unit by splitting a first coding unit 800 according to an embodiment. According to an embodiment, the image decoding device 150 may split the first coding unit 800, based on at least one of block shape information and split shape information, which is obtained by the receiver 160. The square first coding unit 800 may be split into four square coding units, or may be split into a plurality of non-square coding units. For example, referring to FIG. 8, when the block shape information indicates that the first coding unit 800 has a square shape and the split shape information indicates to split the first coding unit 800 into non-square coding units, the image decoding device 150 may split the first coding unit 800 into a plurality of non-square coding units. In detail, when the split shape information indicates to determine an odd number of coding units by splitting the first coding unit 800 in a horizontal direction or a vertical direction, the image decoding device 150 may split the square first coding unit 800 into an odd number of coding units, e.g., second coding units 810a, 810b, and 810c determined by splitting the square first coding unit 800 in a vertical direction or second coding units 820*a*, 820*b*, and 820*c* determined by splitting the square first coding unit 800 in a horizontal direction.

According to an embodiment, the image decoding device 150 may determine whether the second coding units 810*a*, 810*b*, 810*c*, 820*a*, 820*b*, and 820*c* included in the first coding unit 800 satisfy a condition for processing in a certain order, and the condition relates to whether at least one of a width and height of the first coding unit 800 is split in half along a boundary of the second coding units 810*a*, 810*b*, 810*c*, 820*a*, 820*b*, and 820*c*. Referring to FIG. 8, because boundaries of the second coding units 810*a*, 810*b*, and 810*c* determined by splitting the square first coding unit 800 in a vertical direction do not split the width of the first coding unit 800 in half, it may be determined that the first coding unit 800 does not satisfy the condition for processing in the certain order. In addition, because boundaries of the second coding units 820*a*, 820*b*, and 820*c* determined by splitting the square first coding unit 800 in a horizontal direction do not split the width of the first coding unit 800 in half, it may be determined that the first coding unit 800 does not satisfy the condition for processing in the certain order. When the condition is not satisfied as described above, the image decoding device 150 may decide disconnection of a scan order, and may determine that the first coding unit 800 is split into an odd number of coding units based on a result of the decision. According to an embodiment, when a coding unit is split into an odd number of coding units, the image decoding device 150 may put a certain restriction on a coding unit at a certain location from among the split coding units, and the restriction or the certain location has been described above through various embodiments and thus detailed descriptions thereof will not be provided here.

According to an embodiment, the image decoding device 150 may determine various-shaped coding units by splitting a first coding unit.

Referring to FIG. 8, the image decoding device 150 may split the square first coding unit 800 or a non-square first coding unit 830 or 850 into various-shaped coding units.

Figure 9:
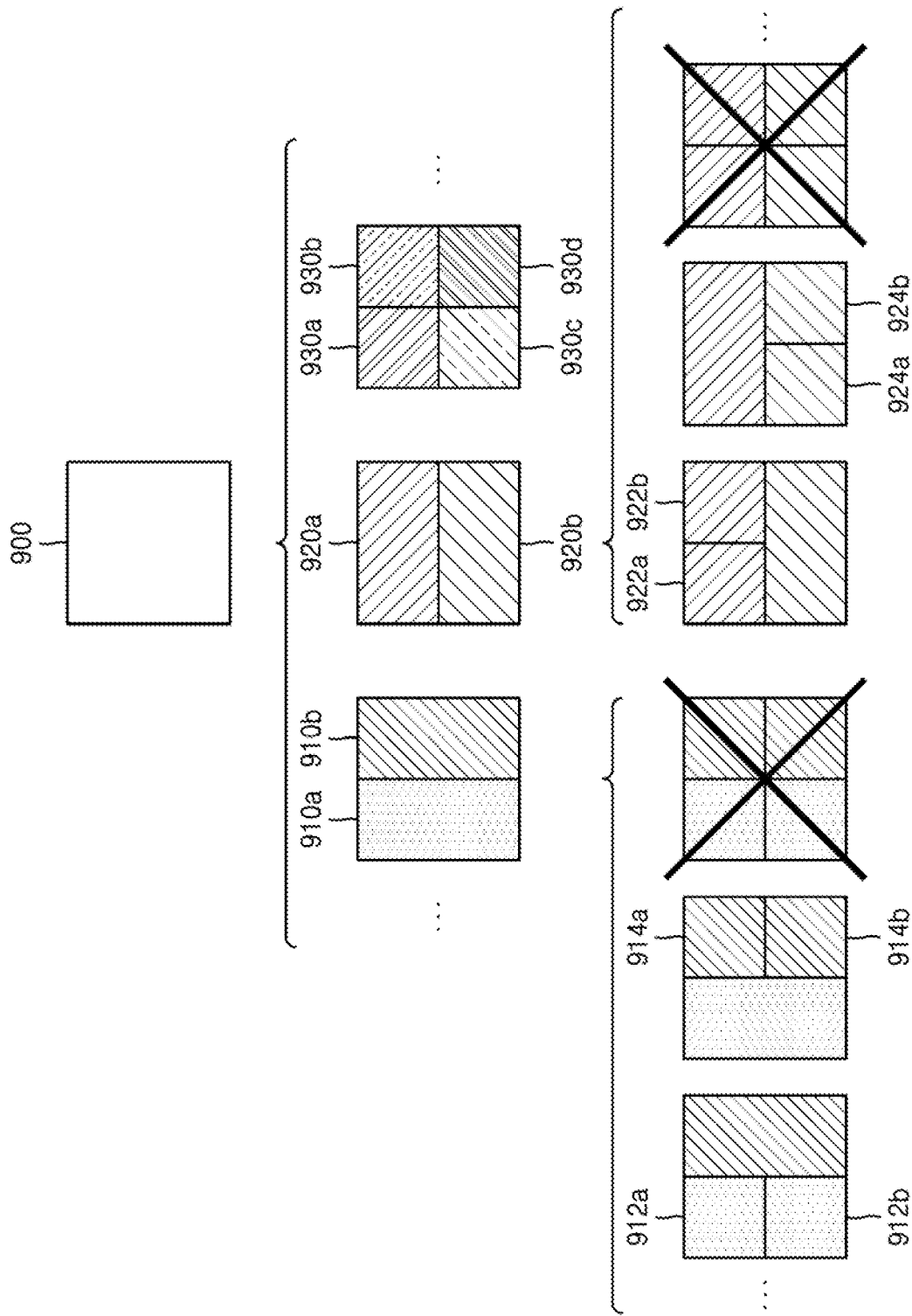
FIG. 9 illustrates that a shape into which a second coding unit is splittable is restricted when a non-square second coding unit determined by splitting a first coding unit satisfies a predetermined condition, according to an embodiment.

FIG. 9 illustrates that a shape into which a second coding unit is splittable by the image decoding device 150 is restricted when a non-square second coding unit determined by splitting a first coding unit 900 satisfies a certain condition according to an embodiment.

According to an embodiment, the image decoding device 150 may determine to split the square first coding unit 900 into non-square second coding units 910*a*, 910*b*, 920*a*, and 920*b*, based on at least one of block shape information and split shape information, which is obtained by the receiver 160. The second coding units 910*a*, 910*b*, 920*a*, and 920*b* may be independently split. As such, the image decoding device 150 may determine to split or not to split the first coding unit 900 into a plurality of coding units, based on at least one of the block shape information and the split shape information of each of the second coding units 910*a*, 910*b*, 920*a*, and 920*b*. According to an embodiment, the image decoding device 150 may determine third coding units 912*a* and 912*b* by splitting the non-square left second coding unit 910*a*, which is determined by splitting the first coding unit 900 in a vertical direction, in a horizontal direction. However, when the left second coding unit 910*a* is split in a horizontal direction, the image decoding device 150 may restrict the right second coding unit 910*b* to not be split in a horizontal direction in which the left second coding unit 910*a* is split. When third coding units 914*a* and 914*b* are determined by splitting the right second coding unit 910*b* in the same direction, because the left and right second coding units 910*a* and 910*b* are independently split in a horizontal direction, the third coding units 912*a*, 912*b*, 914*a*, and 914*b* may be determined. However, this case serves equally as a case in which the image decoding device 150 splits the first coding unit 900 into four square second coding units 930*a*, 930*b*, 930*c*, and 930*d*, based on at least one of the block shape information and the split shape information, and may be inefficient in terms of image decoding.

According to an embodiment, the image decoding device 150 may determine third coding units 922*a*, 922*b*, 924*a*, and 924*b* by splitting the non-square second coding unit 920*a* or 920*b*, which is determined by splitting the first coding unit 900 in a horizontal direction, in a vertical direction. However, when a second coding unit (e.g., the upper second coding unit 920*a*) is split in a vertical direction, for the above-described reason, the image decoding device 150 may restrict the other second coding unit (e.g., the lower second coding unit 920*b*) to not be split in a vertical direction in which the upper second coding unit 920*a* is split.

Figure 10:
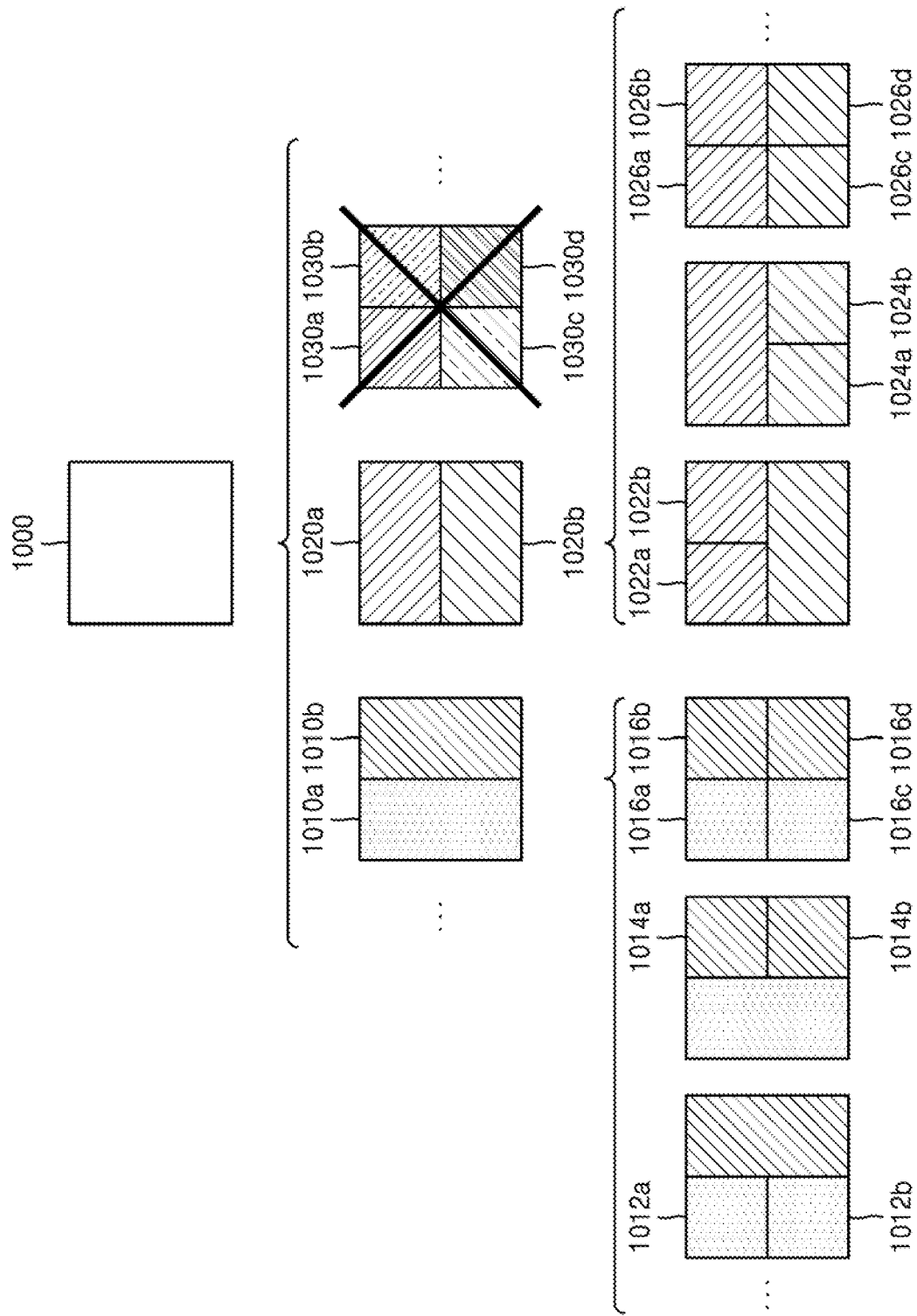
FIG. 10 illustrates a process of splitting a square coding unit when split shape information indicates that the square coding unit is not to be split into four square coding units, according to an embodiment.

FIG. 10 illustrates a process, performed by the image decoding device 150, of splitting a square coding unit when split shape information indicates that the square coding unit is not to be split into four square coding units according to an embodiment.

According to an embodiment, the image decoding device 150 may determine second coding units 1010*a*, 1010*b*, 1020*a*, 1020*b*, etc. by splitting a first coding unit 1000 based on at least one of block shape information and split shape information. The split shape information may include information about various methods of splitting a coding unit but, the information about various splitting methods may not include information for splitting a coding unit into four square coding units. According to such split shape information, the image decoding device 150 may not split the first square coding unit 1000 into four square second coding units 1030*a*, 1030*b*, 1030*c*, and 1030*d*. The image decoding device 150 may determine the non-square second coding units 1010*a*, 1010*b*, 1020*a*, 1020*b*, etc., based on the split shape information.

According to an embodiment, the image decoding device 150 may independently split the non-square second coding units 1010*a*, 1010*b*, 1020*a*, 1020*b*, etc. Each of the second coding units 1010*a*, 1010*b*, 1020*a*, 1020*b*, etc. may be recursively split in a certain order, and this splitting method may correspond to a method of splitting the first coding unit 1000 based on at least one of the block shape information and the split shape information.

For example, the image decoding device 150 may determine square third coding units 1012*a* and 1012*b* by splitting the left second coding unit 1010*a* in a horizontal direction, and may determine square third coding units 1014*a* and 1014*b* by splitting the right second coding unit 1010*b* in a horizontal direction. Furthermore, the image decoding device 150 may determine square third coding units 1016*a*, 1016*b*, 1016*c*, and 1016*d* by splitting both the left and right second coding units 1010*a* and 1010*b* in a horizontal direction. In this case, coding units having the same shape as the four square second coding units 1030*a*, 1030*b*, 1030*c*, and 1030*d* split from the first coding unit 1000 may be determined.

As another example, the image decoding device 150 may determine square third coding units 1022*a* and 1022*b* by splitting the upper second coding unit 1020*a* in a vertical direction, and may determine square third coding units 1024*a* and 1024*b* by splitting the lower second coding unit 1020*b* in a vertical direction. Furthermore, the image decoding device 150 may determine square third coding units 1026a, 1026b, 1026c, and 1026d by splitting both the upper and lower second coding units 1020a and 1020b in a vertical direction. In this case, coding units having the same shape as the four square second coding units 1030a, 1030b, 1030c, and 1030d split from the first coding unit 1000 may be determined.

Figure 11:
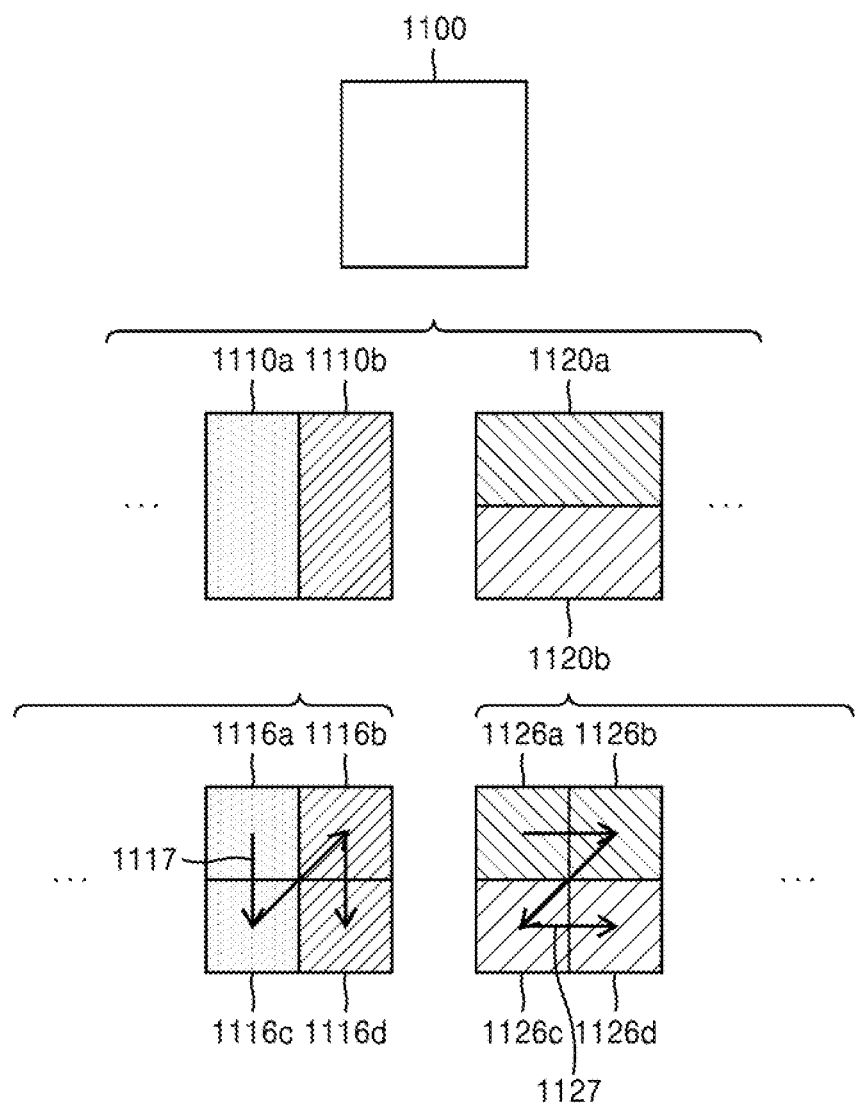
FIG. 11 illustrates that a processing order between a plurality of coding units may be changed depending on a process of splitting a coding unit, according to an embodiment.

FIG. 11 illustrates that a processing order between a plurality of coding units may be changed depending on a process of splitting a coding unit according to an embodiment.

According to an embodiment, the image decoding device 150 may split a first coding unit 1100 based on block shape information and split shape information. When the block shape information indicates a square shape and the split shape information indicates to split the first coding unit 1100 in at least one of horizontal and vertical directions, the image decoding device 150 may determine second coding units 1110a, 1110b, 1120a, 1120b, etc. by splitting the first coding unit 1100. Referring to FIG. 11, the non-square second coding units 1110a, 1110b, 1120a, and 1120b determined by splitting the first coding unit 1100 in only a horizontal direction or vertical direction may be independently split based on the block shape information and the split shape information of each coding unit. For example, the image decoding device 150 may determine third coding units 1116a, 1116b, 1116c, and 1116d by splitting the second coding units 1110a and 1110b, which are generated by splitting the first coding unit 1100 in a vertical direction, in a horizontal direction, and may determine third coding units 1126a, 1126b, 1126c, and 1126d by splitting the second coding units 1120a and 1120b, which are generated by splitting the first coding unit 1100 in a horizontal direction, in a horizontal direction. An operation of splitting the second coding units 1110a, 1110b, 1120a, and 1120b has been described above with reference to FIG. 9, and thus detailed descriptions thereof will not be provided here.

According to an embodiment, the image decoding device 150 may process coding units in a certain order. An operation of processing coding units in a certain order has been described above with reference to FIG. 6, and thus detailed descriptions thereof will not be provided here. Referring to FIG. 11, the image decoding device 150 may determine four square third coding units 1116a, 1116b, 1116c, and 1116d, and 1126a, 1126b, 1126c, and 1126d by splitting the square first coding unit 1100. According to an embodiment, the image decoding device 150 may determine processing orders of the third coding units 1116a, 1116b, 1116c, and 1116d, and 1126a, 1126b, 1126c, and 1126d based on a splitting method of the first coding unit 1100.

According to an embodiment, the image decoding device 150 may determine the third coding units 1116a, 1116b, 1116c, and 1116d by splitting the second coding units 1110a and 1110b generated by splitting the first coding unit 1100 in a vertical direction, in a horizontal direction, and may process the third coding units 1116a, 1116b, 1116c, and 1116d in a processing order 1117 for initially processing the third coding units 1116a and 1116c, which are included in the left second coding unit 1110a, in a vertical direction and then processing the third coding unit 1116b and 1116d, which are included in the right second coding unit 1110b, in a vertical direction.

According to an embodiment, the image decoding device 150 may determine the third coding units 1126a, 1126b, 1126c, and 1126d by splitting the second coding units 1120a and 1120b generated by splitting the first coding unit 1100 in a horizontal direction, in a vertical direction, and may process the third coding units 1126a, 1126b, 1126c, and 1126d in a processing order 1127 for initially processing the third coding units 1126a and 1126b, which are included in the upper second coding unit 1120a, in a horizontal direction and then processing the third coding unit 1126c and 1126d, which are included in the lower second coding unit 1120b, in a horizontal direction.

Referring to FIG. 11, the square third coding units 1116a, 1116b, 1116c, and 1116d, and 1126a, 1126b, 1126c, and 1126d may be determined by splitting the second coding units 1110a, 1110b, 1120a, and 1120b, respectively. Although the second coding units 1110a and 1110b are determined by splitting the first coding unit 1100 in a vertical direction differently from the second coding units 1120a and 1120b which are determined by splitting the first coding unit 1100 in a horizontal direction, the third coding units 1116a, 1116b, 1116c, and 1116d, and 1126a, 1126b, 1126c, and 1126d split therefrom eventually show same-shaped coding units split from the first coding unit 1100. As such, by recursively splitting a coding unit in different manners based on at least one of the block shape information and the split shape information, the image decoding device 150 may process a plurality of coding units in different orders even when the coding units are eventually determined to be the same shape.

FIG. 12 illustrates a process of determining a depth of a coding unit as a shape and a size of the coding unit change, when the coding unit is recursively split such that a plurality of coding units are determined according to an embodiment.

According to an embodiment, the image decoding device 150 may determine the depth of the coding unit based on a certain criterion. For example, the certain criterion may be the length of a long side of the coding unit. When the length of a long side of a coding unit before being split is 2n times (n>0) the length of a long side of a split current coding unit, the image decoding device 150 may determine that a depth of the current coding unit is increased from a depth of the coding unit before being split, by n. In the following descriptions, a coding unit having an increased depth is expressed as a coding unit of a deeper depth.

Referring to FIG. 12, according to an embodiment, the image decoding device 150 may determine a second coding unit 1202, a third coding unit 1204, etc. of deeper depths by splitting a square first coding unit 1200 based on block shape information indicating a square shape (e.g., the block shape information may be expressed as '0: SQUARE'). Assuming that the size of the square first coding unit 1200 is 2N×2N, the second coding unit 1202 determined by splitting a width and height of the first coding unit 1200 in half may have a size of N×N. Furthermore, the third coding unit 1204 determined by splitting a width and height of the second coding unit 1202 in half may have a size of N/2×N/2. In this case, a width and height of the third coding unit 1204 correspond to ½ times those of the first coding unit 1200. When a depth of the first coding unit 1200 is D, a depth of the second coding unit 1202, the width and height of which are ½ times those of the first coding unit 1200, may be D+1, and a depth of the third coding unit 1204, the width and height of which are ½ times those of the first coding unit 1200, may be D+2.

According to an embodiment, the image decoding device 150 may determine a second coding unit 1212 or 1222, a third coding unit 1214 or 1224, etc. of deeper depths by splitting a non-square first coding unit 1210 or 1220 based on block shape information indicating a non-square shape (e.g., the block shape information may be expressed as '1: NS_VER' indicating a non-square shape, a height of which is longer than a width, or as '2: NS_HOR' indicating a non-square shape, a width of which is longer than a height).

The image decoding device 150 may determine the second coding unit 1202, 1212, or 1222 by splitting at least one of a width and height of the first coding unit 1210 having a size of N×2N. That is, the image decoding device 150 may determine the second coding unit 1202 having a size of N×N or the second coding unit 1222 having a size of N×N/2 by splitting the first coding unit 1210 in a horizontal direction, or may determine the second coding unit 1212 having a size of N/2×N by splitting the first coding unit 1210 in horizontal and vertical directions.

According to an embodiment, the image decoding device 150 may determine the second coding unit 1202, 1212, or 1222 by splitting at least one of a width and height of the first coding unit 1220 having a size of 2N×N. That is, the image decoding device 150 may determine the second coding unit 1202 having a size of N×N or the second coding unit 1212 having a size of N/2×N by splitting the first coding unit 1220 in a vertical direction, or may determine the second coding unit 1222 having a size of N×N/2 by splitting the first coding unit 1220 in horizontal and vertical directions.

According to an embodiment, the image decoding device 150 may determine the third coding unit 1204, 1214, or 1224 by splitting at least one of a width and height of the second coding unit 1202 having a size of N×N. That is, the image decoding device 150 may determine the third coding unit 1204 having a size of N/2×N/2, the third coding unit 1214 having a size of N/2×N/2, or the third coding unit 1224 having a size of N/2×N/2 by splitting the second coding unit 1202 in vertical and horizontal directions.

According to an embodiment, the image decoding device 150 may determine the third coding unit 1204, 1214, or 1224 by splitting at least one of a width and height of the second coding unit 1212 having a size of N/2×N. That is, the image decoding device 150 may determine the third coding unit 1204 having a size of N/2×N/2 or the third coding unit 1224 having a size of N/2×N/2 by splitting the second coding unit 1212 in a horizontal direction, or may determine the third coding unit 1214 having a size of N/2×N/2 by splitting the second coding unit 1212 in vertical and horizontal directions.

According to an embodiment, the image decoding device 150 may determine the third coding unit 1204, 1214, or 1224 by splitting at least one of a width and height of the second coding unit 1214 having a size of N×N/2. That is, the image decoding device 150 may determine the third coding unit 1204 having a size of N/2×N/2 or the third coding unit 1214 having a size of N/2×N/2 by splitting the second coding unit 1212 in a vertical direction, or may determine the third coding unit 1224 having a size of N/2×N/2 by splitting the second coding unit 1212 in vertical and horizontal directions.

According to an embodiment, the image decoding device 150 may split a square coding unit (e.g., 1200, 1202, or 1204) in a horizontal or vertical direction. For example, the image decoding device 150 may determine the first coding unit 1210 having a size of N×2N by splitting the first coding unit 1200 having a size of 2N×2N in a vertical direction, or may determine the first coding unit 1220 having a size of 2N×N by splitting the first coding unit 1200 in a horizontal direction. According to an embodiment, when a depth is determined based on the length of a longest side of a coding unit, a depth of a coding unit determined by splitting the first coding unit 1200, 1202, or 1204 having a size of 2N×2N in a horizontal or vertical direction may be the same as a depth of the first coding unit 1200, 1202, or 1204.

According to an embodiment, a width and height of the third coding unit 1214 or 1224 may be ½ times those of the first coding unit 1210 or 1220. When a depth of the first coding unit 1210 or 1220 is D, a depth of the second coding unit 1212 or 1214, the width and height of which are ½ times those of the first coding unit 1210 or 1220, may be D+1, and a depth of the third coding unit 1214 or 1224, the width and height of which are ½ times those of the first coding unit 1210 or 1220, may be D+2.

Figure 13:
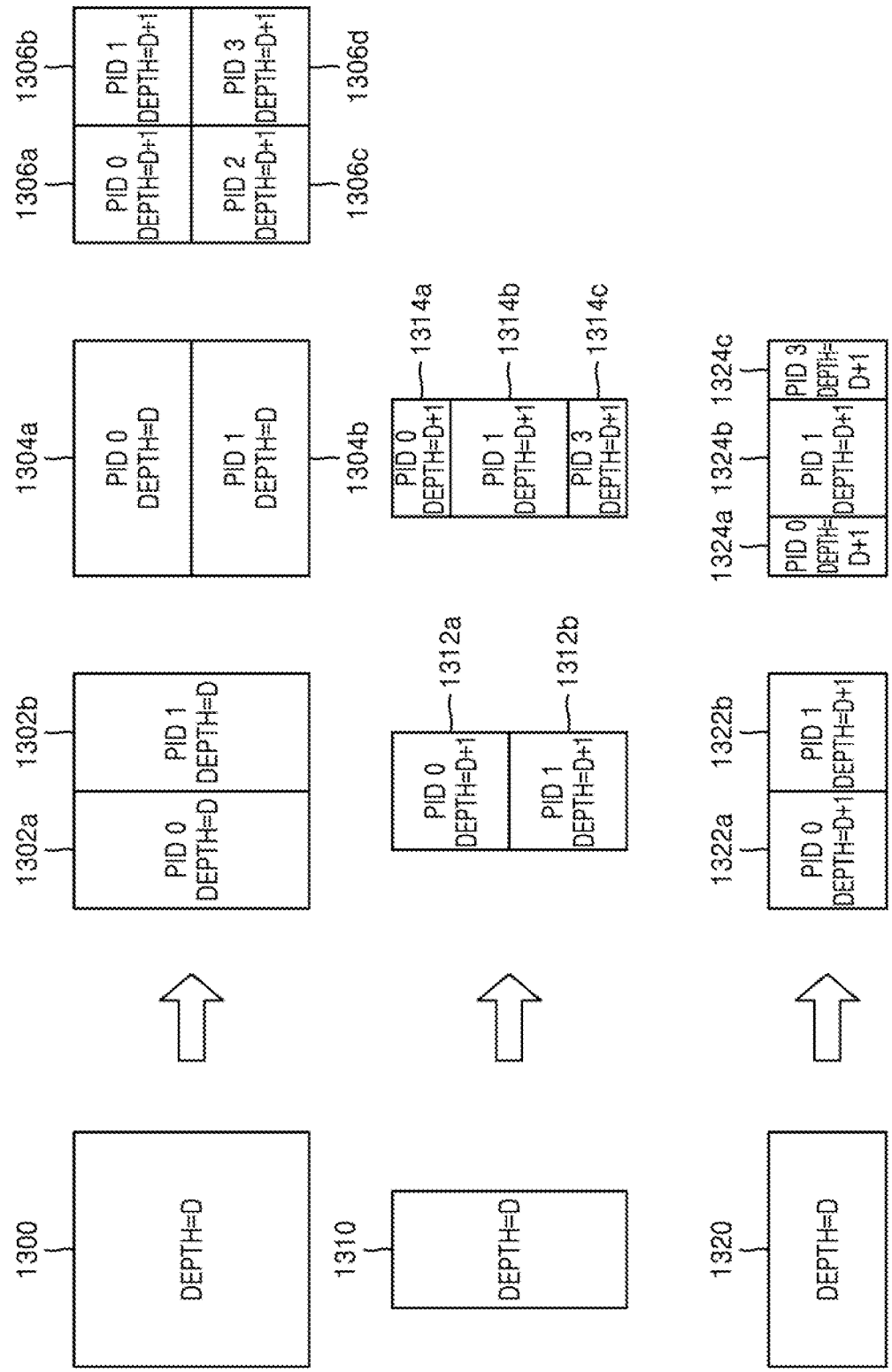
FIG. 13 illustrates depths that are determinable based on shapes and sizes of coding units, and part indexes (PIDs) that are for identifying the coding units, according to an embodiment.

FIG. 13 illustrates depths that are determinable based on shapes and sizes of coding units, and part indexes (PIDs) that are for identifying the coding units according to an embodiment.

According to an embodiment, the image decoding device 150 may determine various-shaped second coding units by splitting a square first coding unit 1300. Referring to FIG. 13, the image decoding device 150 may determine second coding units 1302a and 1302b, 1304a and 1304b, and 1306a, 1306b, 1306c, and 1306d by splitting the first coding unit 1300 in at least one of vertical and horizontal directions based on split shape information. That is, the image decoding device 150 may determine the second coding units 1302a and 1302b, 1304a and 1304b, and 1306a, 1306b, 1306c, and 1306d, based on the split shape information of the first coding unit 1300.

According to an embodiment, a depth of the second coding units 1302a and 1302b, 1304a and 1304b, and 1306a, 1306b, 1306c, and 1306d, which are determined based on the split shape information of the square first coding unit 1300, may be determined based on the length of a long side thereof. For example, because the length of a side of the square first coding unit 1300 equals the length of a long side of the non-square second coding units 1302a and 1302b, and 1304a and 1304b, the first coding unit 1300 and the non-square second coding units 1302a and 1302b, and 1304a and 1304b may have the same depth, e.g., D. However, when the image decoding device 150 splits the first coding unit 1300 into the four square second coding units 1306a, 1306b, 1306c, and 1306d based on the split shape information, because the length of a side of the square second coding units 1306a, 1306b, 1306c, and 1306d is ½ times the length of a side of the first coding unit 1300, a depth of the second coding units 1306a, 1306b, 1306c, and 1306d may be D+1 which is deeper than the depth D of the first coding unit 1300 by 1.

According to an embodiment, the image decoding device 150 may determine a plurality of second coding units 1312a and 1312b, and 1314a, 1314b, and 1314c by splitting a first coding unit 1310, a height of which is longer than a width, in a horizontal direction based on the split shape information. According to an embodiment, the image decoding device 150 may determine a plurality of second coding units 1322a and 1322b, and 1324a, 1324b, and 1324c by splitting a first coding unit 1320, a width of which is longer than a height, in a vertical direction based on the split shape information.

According to an embodiment, a depth of the second coding units 1312a, 1312b, 1314a, 1314b, 1316a, 1316b, 1316c, and 1316d, which are determined based on the split shape information of the non-square first coding unit 1310 or 1320, may be determined based on the length of a long side thereof. For example, because the length of a side of the square second coding units 1312a and 1312b is ½ times the length of a side of the first coding unit 1310 having a non-square shape, a height of which is longer than a width, a depth of the square second coding units 1302a, 1302b, 1304*a*, and 1304*b* is D+1 which is deeper than the depth D of the non-square first coding unit 1310 by 1.

Furthermore, the image decoding device 150 may split the non-square first coding unit 1310 into an odd number of second coding units 1314*a*, 1314*b*, and 1314*c* based on the split shape information. The odd number of second coding units 1314*a*, 1314*b*, and 1314*c* may include the non-square second coding units 1314*a* and 1314*c* and the square second coding unit 1314*b*. In this case, because the length of a long side of the non-square second coding units 1314*a* and 1314*c* and the length of a side of the square second coding unit 1314*b* are ½ times the length of a side of the first coding unit 1310, a depth of the second coding units 1314*a*, 1314*b*, and 1314*c* may be D+1 which is deeper than the depth D of the first coding unit 1310 by 1. The image decoding device 150 may determine depths of coding units split from the non-square first coding unit 1320, a width of which is longer than a height, by using the above-described method of determining depths of coding units split from the first coding unit 1310.

According to an embodiment, the image decoding device 150 may determine PIDs for identifying split coding units, based on a size ratio between the coding units when an odd number of split coding units do not have equal sizes. Referring to FIG. 13, the coding unit 1314*b* of a center location among the odd number of split coding units 1314*a*, 1314*b*, and 1314*c* may have a width which is equal to that of the other coding units 1314*a* and 1314*c* and a height which is two times that of the other coding units 1314*a* and 1314*c*. That is, in this case, the coding unit 1314*b* at the center location may include two of the other coding unit 1314*a* or 1314*c*. Therefore, when a PID of the coding unit 1314*b* at the center location is 1 based on a scan order, a PID of the coding unit 1314*c* located next to the coding unit 1314*b* may be increased by 2 and thus may be 3. That is, discontinuity in PID values may be present. According to an embodiment, the image decoding device 150 may determine whether an odd number of split coding units do not have equal sizes based on whether discontinuity is present in PIDs for identifying the split coding units.

According to an embodiment, the image decoding device 150 may determine whether to use a specific splitting method based on PID values for identifying a plurality of coding units determined by splitting a current coding unit. Referring to FIG. 13, the image decoding device 150 may determine an even number of coding units 1312*a* and 1312*b* or an odd number of coding units 1314*a*, 1314*b*, and 1314*c* by splitting the first coding unit 1310 having a rectangular shape, a height of which is longer than a width. The image decoding device 150 may use PIDs indicating respective coding units so as to identify the respective coding units. According to an embodiment, the PID may be obtained from a sample of a certain location (e.g., a top left sample) of each coding unit.

According to an embodiment, the image decoding device 150 may determine a coding unit at a certain location from among the split coding units, by using the PIDs for identifying the coding units. According to an embodiment, when the split shape information of the first coding unit 1310 having a rectangular shape, a height of which is longer than a width, indicates to split a coding unit into three coding units, the image decoding device 150 may split the first coding unit 1310 into three coding units 1314*a*, 1314*b*, and 1314*c*. The image decoding device 150 may assign a PID to each of the three coding units 1314*a*, 1314*b*, and 1314*c*. The image decoding device 150 may compare PIDs of an odd number of split coding units to determine a coding unit at a center location from among the coding units. The image decoding device 150 may determine the coding unit 1314*b* having a PID corresponding to a middle value among the PIDs of the coding units, as the coding unit at the center location from among the coding units determined by splitting the first coding unit 1310. According to an embodiment, the image decoding device 150 may determine PIDs for identifying split coding units, based on a size ratio between the coding units when the split coding units do not have equal sizes. Referring to FIG. 13, the coding unit 1314*b* generated by splitting the first coding unit 1310 may have a width which is equal to that of the other coding units 1314*a* and 1314*c* and a height which is two times that of the other coding units 1314*a* and 1314*c*. In this case, when the PID of the coding unit 1314*b* at the center location is 1, the PID of the coding unit 1314*c* located next to the coding unit 1314*b* may be increased by 2 and thus may be 3. When the PID is not uniformly increased as described above, the image decoding device 150 may determine that a coding unit is split into a plurality of coding units including a coding unit having a size different from that of the other coding units. According to an embodiment, when the split shape information indicates to split a coding unit into an odd number of coding units, the image decoding device 150 may split a current coding unit in such a manner that a coding unit of a certain location (e.g., a coding unit of a center location) among an odd number of coding units has a size different from that of the other coding units. In this case, the image decoding device 150 may determine the coding unit of the center location, which has a different size, by using PIDs of the coding units. However, the PID and the size or location of the coding unit of the certain location to be determined are not limited to the above-described examples, and various PIDs and various locations and sizes of coding units may be used.

According to an embodiment, the image decoding device 150 may use a certain data unit where a coding unit starts to be recursively split.

Figure 14:
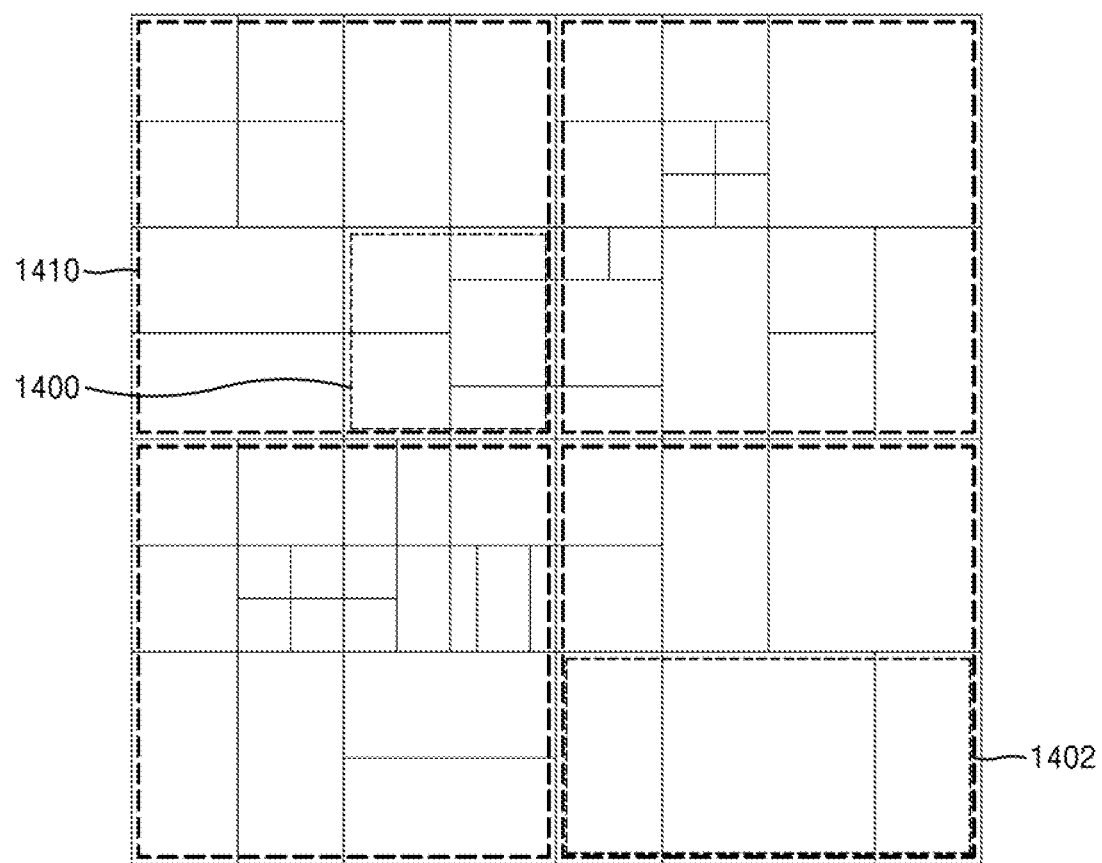
FIG. 14 illustrates that a plurality of coding units are determined based on a plurality of data units included in a picture, according to an embodiment.

FIG. 14 illustrates that a plurality of coding units are determined based on a plurality of certain data units included in a picture according to an embodiment.

According to an embodiment, a certain data unit may be defined as a data unit where a coding unit starts to be recursively split by using at least one of block shape information and split shape information. That is, the certain data unit may correspond to a coding unit of an uppermost depth, which is used to determine a plurality of coding units split from a current picture. In the following descriptions, for convenience of explanation, the certain data unit is referred to as a reference data unit.

According to an embodiment, the reference data unit may have a certain size and a certain shape. According to an embodiment, the reference data unit may include M×N samples. Herein, M and N may be equal to each other, and may be integers expressed as multipliers of 2. That is, the reference data unit may have a square or non-square shape, and may be split into an integer number of coding units.

According to an embodiment, the image decoding device 150 may split a current picture into a plurality of reference data units. According to an embodiment, the image decoding device 150 may split the plurality of reference data units, which are split from the current picture, by using split shape information for each reference data unit. An operation of splitting the reference data unit may correspond to a splitting operation using a quadtree structure.

According to an embodiment, the image decoding device 150 may previously determine a minimum size allowed for the reference data units included in the current picture. Accordingly, the image decoding device 150 may determine various reference data units having sizes equal to or greater than the minimum size, and may determine one or more coding units by using the split shape information and block shape information with reference to the determined reference data units.

Referring to FIG. 14, the image decoding device 150 may use a square reference coding unit 1400 or a non-square reference coding unit 1402. According to an embodiment, the shape and size of reference coding units may be determined based on various data units capable of including one or more reference coding units (e.g., sequences, pictures, slices, slice segments, tiles, tile groups, largest coding units, or the like).

According to an embodiment, the receiver 160 of the image decoding device 150 may obtain, from a bitstream, at least one of reference coding unit shape information and reference coding unit size information for each of the various data units. An operation of determining one or more coding units included in the square reference coding unit 1400 has been described above in relation to the operation of splitting the current coding unit 300 of FIG. 10, and an operation of determining one or more coding units included in the non-square reference coding unit 1402 has been described above in relation to the operation of splitting the current coding unit 1100 or 1150 of FIG. 11, and thus, detailed descriptions thereof will not be provided here.

According to an embodiment, the image decoding device 150 may use a PID for identifying the size and shape of reference coding units, to determine the size and shape of reference coding units according to some data units previously determined based on a certain condition. That is, the receiver 160 may obtain, from the bitstream, only the PID for identifying the size and shape of reference coding units for each slice, slice segment, tile, tile group, or largest coding unit which is a data unit satisfying a certain condition (e.g., a data unit having a size equal to or smaller than a slice) among the various data units (e.g., sequences, pictures, slices, slice segments, tiles, tile groups, largest coding units, or the like). The image decoding device 150 may determine the size and shape of reference data units for each data unit, which satisfies the certain condition, by using the PID. When the reference coding unit shape information and the reference coding unit size information are obtained and used from the bitstream according to each data unit having a relatively small size, efficiency of using the bitstream may not be high, and therefore, only the PID may be obtained and used instead of directly obtaining the reference coding unit shape information and the reference coding unit size information. In this case, at least one of the size and shape of reference coding units corresponding to the PID for identifying the size and shape of reference coding units may be previously determined. That is, the image decoding device 150 may determine at least one of the size and shape of reference coding units included in a data unit serving as a unit for obtaining the PID, by selecting the previously determined at least one of the size and shape of reference coding units based on the PID.

According to an embodiment, the image decoding device 150 may use one or more reference coding units included in one largest coding unit. That is, a largest coding unit split from an image may include one or more reference coding units, and coding units may be determined by recursively splitting each reference coding unit. According to an embodiment, at least one of a width and height of the largest coding unit may be integer times at least one of the width and height of the reference coding units. According to an embodiment, the size of reference coding units may be obtained by splitting the largest coding unit n times based on a quadtree structure. That is, the image decoding device 150 may determine the reference coding units by splitting the largest coding unit n times based on a quadtree structure, and may split the reference coding unit based on at least one of the block shape information and the split shape information according to various embodiments.

Figure 15:
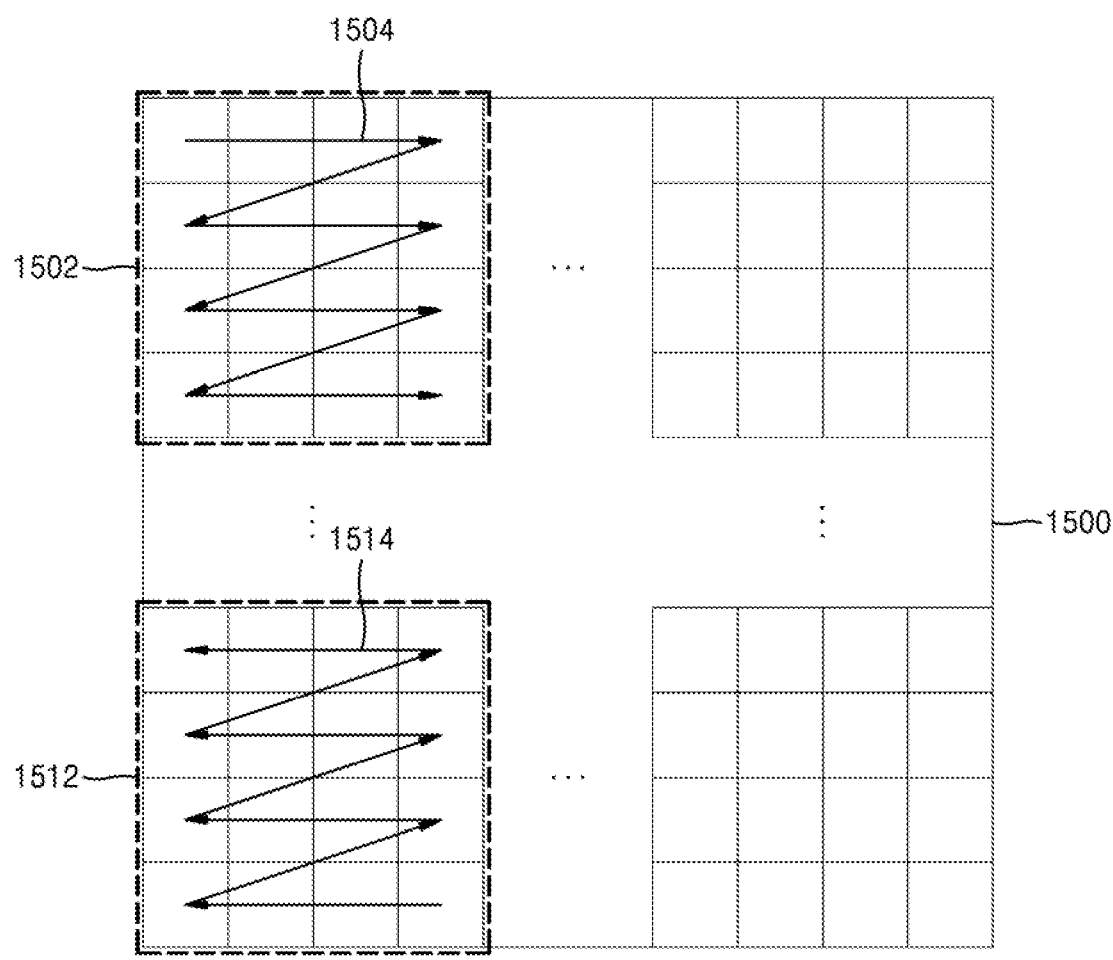
FIG. 15 illustrates a processing block serving as a unit for determining a determination order of reference coding units included in a picture, according to an embodiment.

FIG. 15 illustrates a processing block serving as a unit for determining a determination order of reference coding units included in a picture 1500 according to an embodiment.

According to an embodiment, the image decoding device 150 may determine one or more processing blocks split from a picture. The processing block is a data unit including one or more reference coding units split from an image, and the one or more reference coding units included in the processing block may be determined according to a specific order. That is, a determination order of one or more reference coding units determined in each processing block may correspond to one of various types of orders for determining reference coding units, and may vary depending on the processing block. The determination order of reference coding units, which is determined for each processing block, may be one of various orders, e.g., raster scan, Z-scan, N-scan, up-right diagonal scan, horizontal scan, and vertical scan, but is not limited to the above-mentioned scan orders.

According to an embodiment, the image decoding device 150 may obtain processing block size information and may determine the size of one or more processing blocks included in the image. The image decoding device 150 may obtain the processing block size information from a bitstream and may determine the size of one or more processing blocks included in the image. The size of processing blocks may be a certain size of data units, which is indicated by the processing block size information.

According to an embodiment, the receiver 160 of the image decoding device 150 may obtain the processing block size information from the bitstream according to each specific data unit. For example, the processing block size information may be obtained from the bitstream in a data unit such as an image, sequence, picture, slice, slice segment, tile, or tile group. That is, the receiver 160 may obtain the processing block size information from the bitstream according to each of the various data units, the image decoding device 150 may determine the size of one or more processing blocks, which are split from the picture by using the obtained processing block size information, and the size of the processing blocks may be integer times that of the reference coding units.

According to an embodiment, the image decoding device 150 may determine the size of processing blocks 1502 and 1512 included in the picture 1500. For example, the image decoding device 150 may determine the size of processing blocks based on the processing block size information obtained from the bitstream. Referring to FIG. 15, according to an embodiment, the image decoding device 150 may determine the width of the processing blocks 1502 and 1512 to be four times the width of the reference coding units, and may determine the height of the processing blocks 1502 and 1512 to be four times the height of the reference coding units. The image decoding device 150 may determine a determination order of one or more reference coding units in one or more processing blocks.

According to an embodiment, the image decoding device 150 may determine the processing blocks 1502 and 1512, which are included in the picture 1500, based on the size of processing blocks, and may determine a determination order of one or more reference coding units included in the processing blocks 1502 and 1512. According to an embodiment, determination of reference coding units may include determination of the size of the reference coding units.

According to an embodiment, the image decoding device 150 may obtain, from the bitstream, determination order information of one or more reference coding units included in one or more processing blocks, and may determine a determination order of one or more reference coding units based on the obtained determination order information. The determination order information may be defined as an order or direction for determining the reference coding units in the processing block. That is, the determination order of reference coding units may be independently determined for each processing block.

According to an embodiment, the image decoding device 150 may obtain, from the bitstream, the determination order information of reference coding units according to each specific data unit. For example, the receiver 160 may obtain the determination order information of reference coding units from the bitstream according to each data unit such as an image, sequence, picture, slice, slice segment, tile, tile group, or processing block. Because the determination order information of reference coding units indicates an order for determining reference coding units in a processing block, the determination order information may be obtained for each specific data unit including an integer number of processing blocks.

According to an embodiment, the image decoding device 150 may determine one or more reference coding units based on the determined determination order.

According to an embodiment, the receiver 160 may obtain the determination order information of reference coding units from the bitstream as information related to the processing blocks 1502 and 1512, and the image decoding device 150 may determine a determination order of one or more reference coding units included in the processing blocks 1502 and 1512 and determine one or more reference coding units, which are included in the picture 1500, based on the determination order. Referring to FIG. 15, the image decoding device 150 may determine determination orders 1504 and 1514 of one or more reference coding units in the processing blocks 1502 and 1512, respectively. For example, when the determination order information of reference coding units is obtained for each processing block, different kinds of the determination order information of reference coding units may be obtained for the processing blocks 1502 and 1512. When the determination order 1504 of reference coding units in the processing block 1502 is a raster scan order, reference coding units included in the processing block 1502 may be determined according to the raster scan order. On the contrary, when the determination order 1514 of reference coding units in the other processing block 1512 is a backward raster scan order, reference coding units included in the processing block 1512 may be determined according to the backward raster scan order.

A method of splitting an image into largest coding units and splitting the largest coding units into coding units having a hierarchical tree structure has been described with reference to FIGS. 1A through 15. A method of predicting a current block according to an inter mode will now be described with reference to FIGS. 16 through 34.

Figure 16:
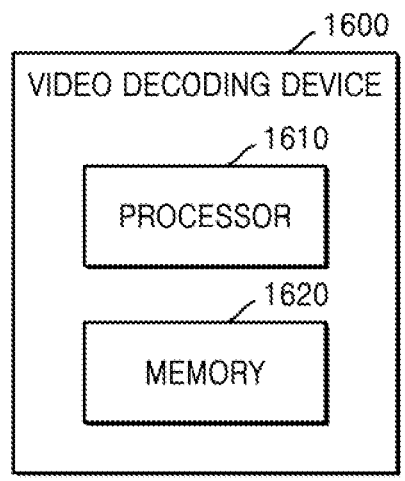
FIG. 16 is a block diagram of a video decoding device 1600 for decoding a current block according to an inter mode.
Figure 17:
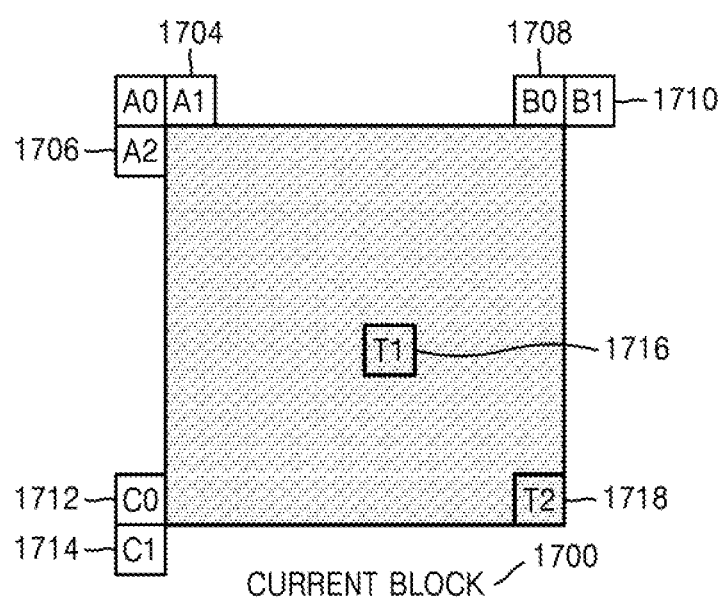
FIG. 17 illustrates positions of neighboring blocks of a current block scanned according to a scan order.

FIG. 16 is a block diagram of a video decoding device 1600 for decoding a current block according to an inter mode.

Referring to FIG. 16, the video decoding device 1600 according to an embodiment may include a processor 1610 and a memory 1620.

The processor 1610 according to an embodiment may generally control the video decoding device 1600. The processor 1610 according to an embodiment may execute one or more programs stored in the memory 1620.

The memory 1620 according to an embodiment may store various data, program, or application for driving and controlling the video decoding device 1600. The program stored in the memory 1620 may include one or more instructions. The program (the one or more instructions) or the application stored in the memory 1620 may be executed by the processor 1610.

The processor 1610 may scan neighboring blocks of a current block, according to a scan order. The processor 1610 may scan, according to the scan order, at least two of neighboring blocks located covering neighboring pixels A0 1702, A1 1704, A2 1706, B0 1708, B1 1710, C0 1712, and C1 1714 around a current block 1700 of FIG. 17. Also, the processor 1610 may scan neighboring blocks other than the neighboring blocks located covering the neighboring pixels A0 1702, A1 1704, A2 1706, B0 1708, B1 1710, C0 1712, and C1 1714. Also, the processor 1610 may scan all blocks around the current block 1700.

Also, the processor 1610 may scan a temporal reference block including a specific position of the current block 1700 from a reference picture of the current block 1700. The specific position may be T1 1716 or T2 1718. For example, the processor 1610 may additionally scan the temporal reference block according to the specific position T0 1716 or T1 1718 as well as the neighboring blocks located at the neighboring pixels A0 1702, A1 1704, A2 1706, B0 1708, B1 1710, C0 1712, and 01 1714.

A scan order of at least two of the neighboring blocks located at the neighboring pixels A0 1702, A1 1704, A2 1706, B0 1708, B1 1710, C0 1712, and 01 1714 may be easily set or changed by one of ordinary skill in the art. Likewise, a scan order of at least two of all neighboring blocks of the current block 1700 may be easily set and changed by one of ordinary skill in the art.

According to an embodiment, the processor 1610 may sequentially scan the neighboring block located at the neighboring pixel C0 1712, the neighboring block located at the neighboring pixel B0 1708, the neighboring block located at the neighboring pixel B1 1710, the neighboring block located at the neighboring pixel C1 1714, and the neighboring block located at the neighboring pixel A0 1702, in order to determine a motion vector candidate of a merge mode. The processor 1610 may additionally scan the neighboring block located at the neighboring pixel A1 1704 and the neighboring block located at the neighboring pixel A2 1706. The scan order for determining the motion vector candidate may be easily changed by one of ordinary skill in the art.

According to an embodiment, the processor 1610 may sequentially scan the neighboring block located at the neighboring pixel B1 1710, the neighboring block located at the neighboring pixel B0 1708, and the neighboring block located at the neighboring pixel A0 1702, in order to determine a first motion vector candidate of a motion vector prediction (MVP) mode. Also, the processor 1610 may sequentially scan the neighboring block located at the neighboring pixel C1 1714 and the neighboring block located at the neighboring pixel C0 1712, in order to determine a second motion vector candidate of the MVP mode. According to an embodiment, the processor 1610 may additionally scan the neighboring block located at the neighboring pixel A1 1704 and the neighboring block located at the neighboring pixel A2 1706, in order to determine the first motion vector candidate or the second motion vector candidate. The scan order for determining the first motion vector candidate or the second motion vector candidate may be easily changed by one of ordinary skill in the art.

The processor 1610 may extract a plurality of inter prediction candidates from neighboring blocks of a current block by scanning the neighboring blocks. The inter prediction candidate may include a motion vector candidate or a prediction motion vector candidate. Also, the inter prediction candidate may include reference list information and reference picture candidate information. The reference list information may indicate list 0 uni-prediction, list 1 uni-prediction, or bi-prediction using both list 0 and list 1. The reference picture candidate information indicates a reference picture of list 0 and/or list 1. When the reference list indicates bi-prediction, the inter prediction candidate may include a motion vector candidate of list 0 and a motion vector candidate of list 1.

According to an embodiment, when a current block is predicted according to a merge mode, the processor 1610 may extract, from neighboring blocks, a motion vector candidate and an inter prediction candidate including reference list information and reference picture candidate information. Alternatively, when a current block is predicted according to an MVP mode, the processor 1610 may extract, from neighboring blocks, an inter prediction candidate including a prediction motion vector candidate.

The processor 1610 may generate an inter prediction candidate list including a plurality of inter prediction candidates, according to an inter prediction candidate order determined based on a scan order. For example, the processor 1610 may extract a first inter prediction candidate from a neighboring block that is firstly scanned according to a scan order. The processor 1610 may extract a second inter prediction candidate from a neighboring block that that is scanned after the first inter prediction candidate is extracted. Until a last inter prediction candidate is extracted, the processor 1610 may scan neighboring blocks.

When a neighboring block that is firstly scanned does not exist, is not decoded, or is intra predicted, the processor 1610 may not extract the first inter prediction candidate from first scanning. In this case, the processor 1610 may attempt to extract the first inter prediction candidate from a neighboring block that is secondly scanned. Accordingly, the processor 1610 may extract a plurality of inter prediction candidates according to a scan order, from neighboring blocks including inter prediction candidates.

When all neighboring blocks are scanned according to a scan order but a preset number of inter prediction candidates may not be determined, the processor 1610 may determine an additional inter prediction candidate by combining inter prediction candidates extracted from the neighboring blocks. For example, when five inter prediction candidates are included in an inter prediction candidate list of a merge mode and four inter prediction candidates are extracted from neighboring blocks, the processor 1610 may generate a fifth inter prediction candidate by combining some of the extracted four inter prediction candidates. Alternatively, when all neighboring blocks are scanned according to a scan order but a preset number of inter prediction candidates may not be determined, the processor 1610 may determine a zero vector as an additional inter prediction candidate.

The processor 1610 may extract a first inter prediction candidate from neighboring blocks located on the left side of the current block 1700 including the neighboring blocks located at the neighboring pixels A2 1702, C0 1710, and C1 1714 in an MVP mode. Also, the processor 1610 may extract a second inter prediction candidate from neighboring blocks located above the current block 1700 including the neighboring blocks located at the neighboring pixels A0 1702, A1 1704, B0 1708, and B1 1710 in the MVP mode. When a reference picture of a current block and a reference picture of a neighboring block are different from each other in an MVP mode, the processor 1610 may scale a prediction motion vector according to a temporal distance between a current picture and the reference picture of the current block and a temporal distance between the current picture and the reference picture of the neighboring block.

The processor 1610 may generate an inter prediction candidate list of a first prediction direction including a plurality of inter prediction candidates, according to an inter prediction candidate order determined based on a scan order in an MVP mode. The processor 1610 may generate an inter prediction candidate list of a second prediction direction, based on a motion vector generated by adjusting a motion vector candidate of the inter prediction candidate list of the first prediction direction, according to a temporal distance between a first reference picture of the first prediction direction and a current picture and a temporal distance between a second reference picture of the second prediction direction and the current picture.

The first prediction direction and the second prediction direction respectively indicate prediction directions of list 0 and list 1. For example, when the first prediction direction indicates a list 0 prediction direction, the second prediction direction indicates a list 1 prediction direction. Accordingly, the processor 1610 may derive an inter prediction candidate list of list 1 from an inter prediction candidate list of list 0.

Figure 18:
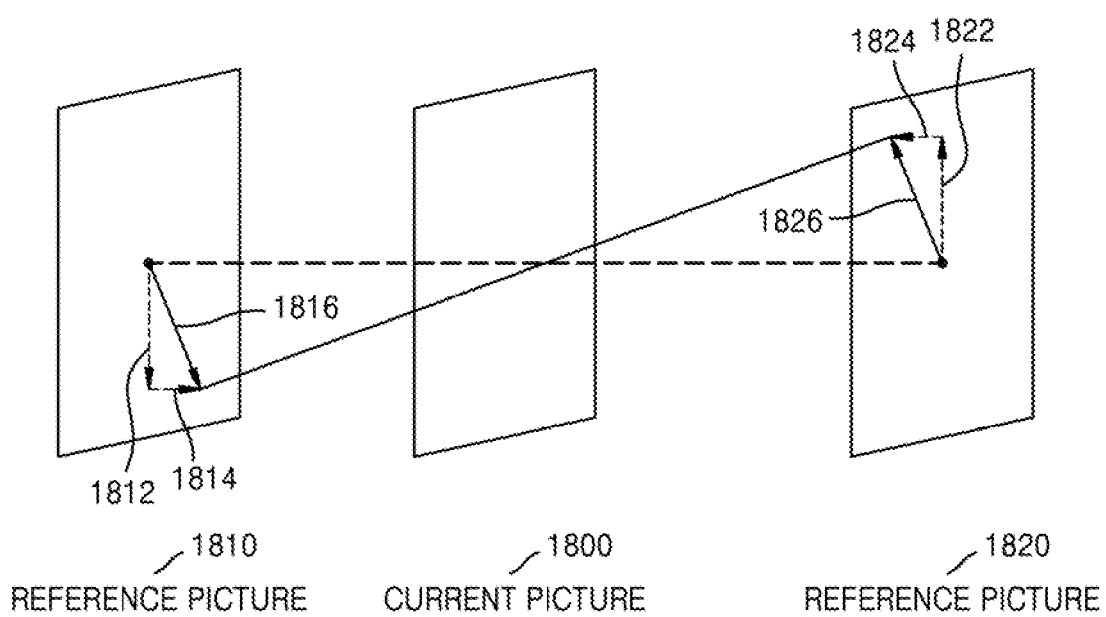
FIG. 18 illustrates a method of generating a motion vector candidate of a second prediction direction, by adjusting a motion vector candidate of a first prediction direction.
Figure 19:
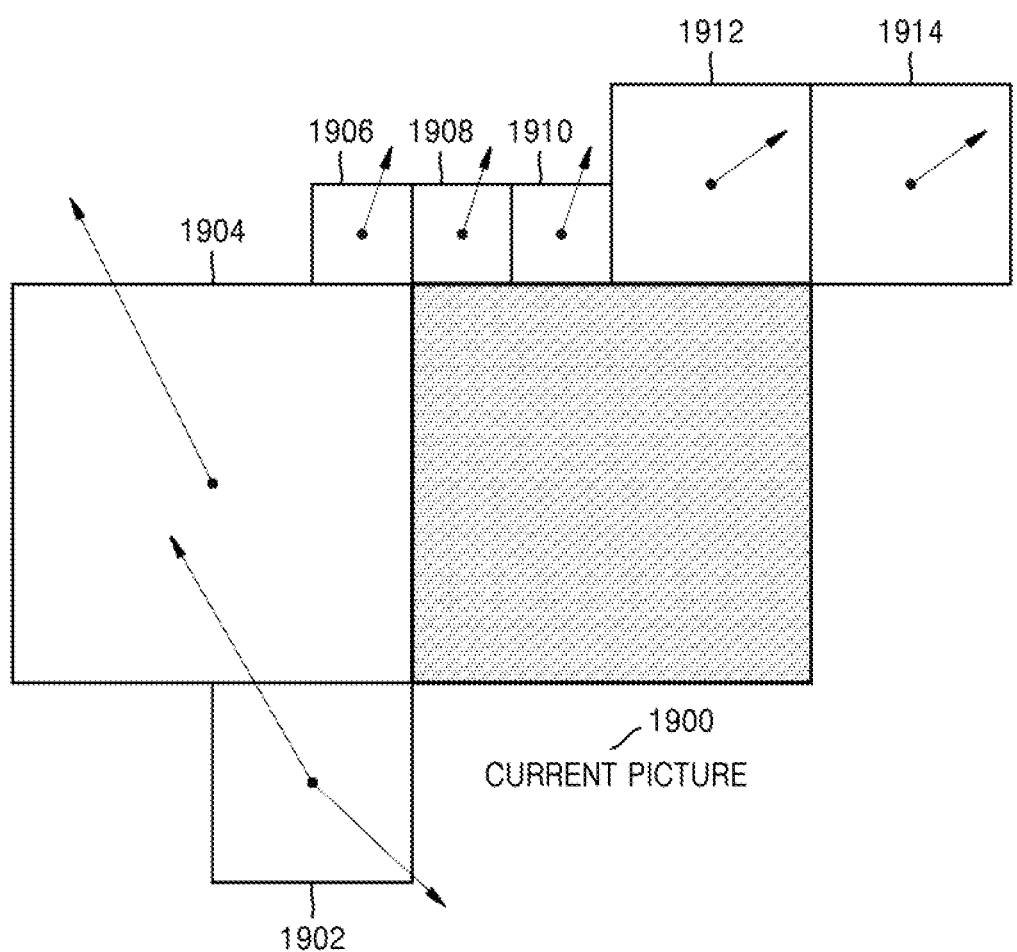
FIG. 19 illustrates a method of changing an inter prediction candidate order of an inter prediction candidate list.

FIG. 18 illustrates a method of generating a motion vector candidate of a second prediction direction, by adjusting a motion vector candidate of a first prediction direction.

In FIG. 18, a first motion vector 1816 applied to a reference picture 1810 of a first prediction direction is illustrated. The first motion vector 1816 is determined according to a first prediction motion vector 1812 and a first differential motion vector 1814.

Also, in FIG. 18, a second motion vector 1826 applied to a reference picture 1820 of a second prediction direction is illustrated. The second motion vector 1826 is determined according to a second prediction motion vector 1822 and a second differential motion vector 1824.

The second prediction motion vector 1822 may be determined by scaling the first prediction motion vector 1812 according to a temporal distance between the first reference picture 1810 and a current picture 1800 and a temporal distance between the second reference picture 1820 and the current picture 1800. Accordingly, the second prediction motion vector 1822 of an inter prediction candidate of the second prediction direction may be determined from the first prediction motion vector 1812 of an inter prediction candidate of the first prediction direction.

The second differential motion vector 1824 may be determined according to differential motion vector information obtained from a bitstream. Alternatively, like the second prediction motion vector 1822, the second differential motion vector 1824 may be determined by scaling the first differential motion vector 1814 according to a temporal distance between the first reference picture 1810 and the current picture 1800 and a temporal distance between the second reference picture 1820 and the current picture 1800.

Accordingly, the inter prediction candidate of the second prediction direction may be determined according to the inter prediction candidate of the first prediction direction, instead of information obtained from the bitstream. Hence, because information about the inter prediction candidate of the second prediction direction is skipped from the bitstream, video coding efficiency may be improved.

According to an embodiment, motion vector derivation information indicating whether the second motion vector 1826 is derived from the first motion vector 1816 may be obtained from the bitstream. The processor 1610 may determine whether the second motion vector 1826 is derived from the first motion vector 1816 according to the motion vector derivation information. Alternatively, whether the second motion vector 1826 is derived from the first motion vector 1816 may be determined according to encoding information obtained for a current block from the bitstream, other than the motion vector derivation information. For example, whether the second motion vector 1826 is derived from the first motion vector 1816 may be determined according to inter mode information and/or motion vector information applied to the current block.

The processor 1610 may adaptively change an inter prediction candidate order of an inter prediction candidate list, according to the current block or a plurality of inter prediction candidates. Accordingly, an inter prediction candidate that is likely to be selected may be set to have a priority. Video coding efficiency may be improved, by allocating a small number of bits to an inter prediction candidate having a high priority. A method of changing an inter prediction candidate order of an inter prediction candidate list will be described with reference to FIG. 19.

The processor 1610 may change an inter prediction candidate order, so that an inter prediction candidate included in a plurality of neighboring blocks of a current block from among a plurality of inter prediction candidates has a priority. For example, in a merge mode, an inter prediction candidate applied in three blocks 1906, 1908, and 1910 may be determined as a first inter prediction candidate. An inter prediction candidate applied in two blocks 1912 and 1914 may be determined as a second inter prediction candidate. Inter prediction candidates applied in remaining blocks 1902 and 1904 may be determined as a third inter prediction candidate and a fourth inter prediction candidate according to a scan order.

The processor 1610 may change the inter prediction candidate order, according to sizes of neighboring blocks of a current block. For example, in a merge mode, an inter prediction candidate extracted from the block 1904 having a largest size may be determined as a first inter prediction candidate. Two inter prediction candidates extracted from the blocks 1902, 1912, and 1914 having a second largest size may be determined as a second inter prediction candidate and a third inter prediction candidate according to a scan order. An inter prediction candidate extracted from the blocks 1906, 1908, and 1910 having a smallest size may be determined as a fourth inter prediction candidate.

The processor 1610 may change an inter prediction candidate order, according to at least one of an inter prediction mode and reference list information of a plurality of inter prediction candidates. For example, the processor 1610 may change the inter prediction candidate order, so that an inter prediction candidate whose reference list information indicates bi-prediction has a priority. Hence, an inter prediction candidate of the block 1902 whose reference list information indicates bi-prediction may be determined as a first motion vector candidate. Inter prediction candidates of remaining blocks 1904, 1906, 1908, 1910, 1912, and 1914 whose reference list information indicates uni-prediction according to list 0 or list 1 may be determined as a second motion vector candidate, a third motion vector candidate, and a fourth motion vector candidate according to a scan order. According to an embodiment, an inter prediction candidate order may be changed so that an inter prediction candidate whose reference list information indicates uni-prediction has a high priority.

The processor 1610 may change an inter prediction candidate order, according to a selection ratio of inter prediction candidates referenced by blocks at the same position as a current block included in pictures reconstructed earlier than a current picture. For example, when the blocks at the same position as the current block included in the pictures reconstructed earlier than the current picture most refer to blocks located at C0 1702, an inter prediction candidate of the block 1904 may be determined as a first motion vector candidate.

The processor 1610 may change an inter prediction candidate order, by applying two or more of the above-described inter prediction candidate order changing criteria. For example, the processor 1610 may first change an inter prediction candidate order according to sizes of blocks, and then may change the inter prediction candidate order according to the number of blocks to which an inter prediction candidate is applied.

The processor 1610 may predict the current block, based on an inter prediction candidate list with the changed inter prediction candidate order. The processor 1610 may select an inter prediction candidate in the inter prediction candidate list, according to an inter prediction candidate index indicating an inter prediction candidate applied to the current block. The processor 1610 may predict the current block based on the inter prediction candidate according to the inter prediction candidate index.

The processor 1610 may change an inter prediction candidate order of an inter prediction candidate list of an affine merge mode. An affine mode is an inter prediction method of obtaining an affine parameter from motion vectors obtained from adjacent samples of a current block, and predicting the current block according to the affine parameter.

The affine mode may include an affine merge mode and an affine MVP mode. An affine merge mode is an inter prediction method of obtaining an affine parameter of a current block from a neighboring block predicted according to an affine mode from among neighboring blocks of the current block, and predicting the current block by using the affine parameter. An affine MVP mode is an inter prediction mode of extracting a prediction affine parameter from a motion vector of neighboring blocks of a current block, and predicting the current block by using an affine parameter determined by adjusting the prediction affine parameter.

In an affine merge mode, when the affine merge mode is applied to a current block, the processor 1610 may extract a plurality of inter prediction candidates including an affine parameter from neighboring blocks predicted according to an affine mode from among neighboring blocks of the current block, by scanning the neighboring blocks of the current block. The processor 1610 may determine an inter prediction candidate list including the plurality of inter prediction candidates. Also, the processor 1610 may change an inter prediction candidate order of the inter prediction candidate list. A method of changing an inter prediction candidate order of an inter prediction candidate list of an affine merge mode will be described with reference to FIG. 20.

Figure 20:
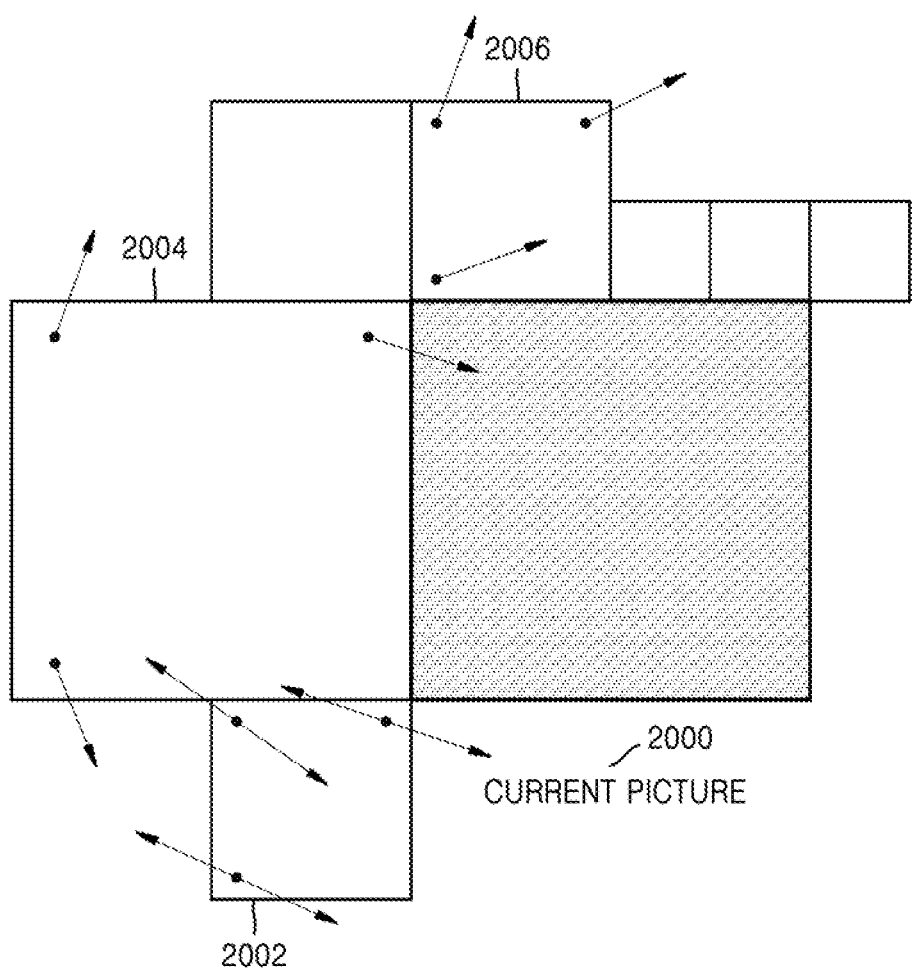
FIG. 20 illustrates a method of changing an inter prediction candidate order of an inter prediction candidate list of an affine merge mode.

Referring to FIG. 20, only blocks 2002, 2004, and 2006 from among neighboring blocks of a current block 2000 are predicted according to an affine mode. Accordingly, the processor 1610 may determine an inter prediction candidate list of an affine merge mode according to an affine parameter extracted from the blocks 2002, 2004, and 2006.

In an embodiment, the processor 1610 may change an inter prediction candidate order, according to whether a neighboring block of the current block is predicted according to the affine merge mode. For example, when the block 2006 is predicted according to the affine merge mode and the blocks 2002 and 2004 are predicted according to an affine MVP mode, an inter prediction candidate extracted from the block 2006 may have a priority in the inter prediction candidate list. In contrast, an inter prediction candidate extracted from a block predicted according to the affine MVP mode may have a priority in the inter prediction candidate list.

In an embodiment, the processor 1610 may change an inter prediction candidate order according to sizes of blocks. For example, an inter prediction candidate of the block 2004 having a largest size may have a priority in the inter prediction candidate list, relative to an inter prediction candidate of the blocks 2002 and 2006.

In an embodiment, the processor 1610 may change an inter prediction candidate order according to reference list information. For example, the processor 1610 may change an inter prediction candidate order, so that an inter prediction candidate whose reference list information indicates bi-prediction has a priority. Accordingly, an inter prediction candidate of the block 2002 whose reference list information indicates bi-prediction may have a priority in the inter prediction candidate list, relative to an inter prediction candidate of the blocks 2004 and 2006.

The processor 1610 may predict a current block according to an MV planar mode. According to the MV planar mode, the current block is split into a plurality of sub-blocks. A motion vector of each sub-block is determined, by double interpolating motion vectors obtained from adjacent blocks of the current block. The current block is predicted, according to the motion vector of each sub-block. A prediction method of a current block according an MV planar mode will be described with reference to FIG. 21.

The processor 1610 obtains a reference motion vector and a reference picture of a neighboring block adjacent to a current block. The processor 1610 may obtain an upper reference motion vector and an upper reference picture from an upper neighboring block located in a column of a sub-block and adjacent to the top of the current block. The processor 1610 may obtain a left reference motion vector and a left reference picture from a left neighboring block located in a row of the sub-block and adjacent to the left side of the current block. The processor 1610 may obtain a lower left reference motion vector and a lower left reference picture from blocks adjacent to a lower left vertex of the current block. The processor 1610 may obtain an upper right reference motion vector and an upper right reference picture from blocks adjacent to an upper right vertex of the current block.

Figure 21:
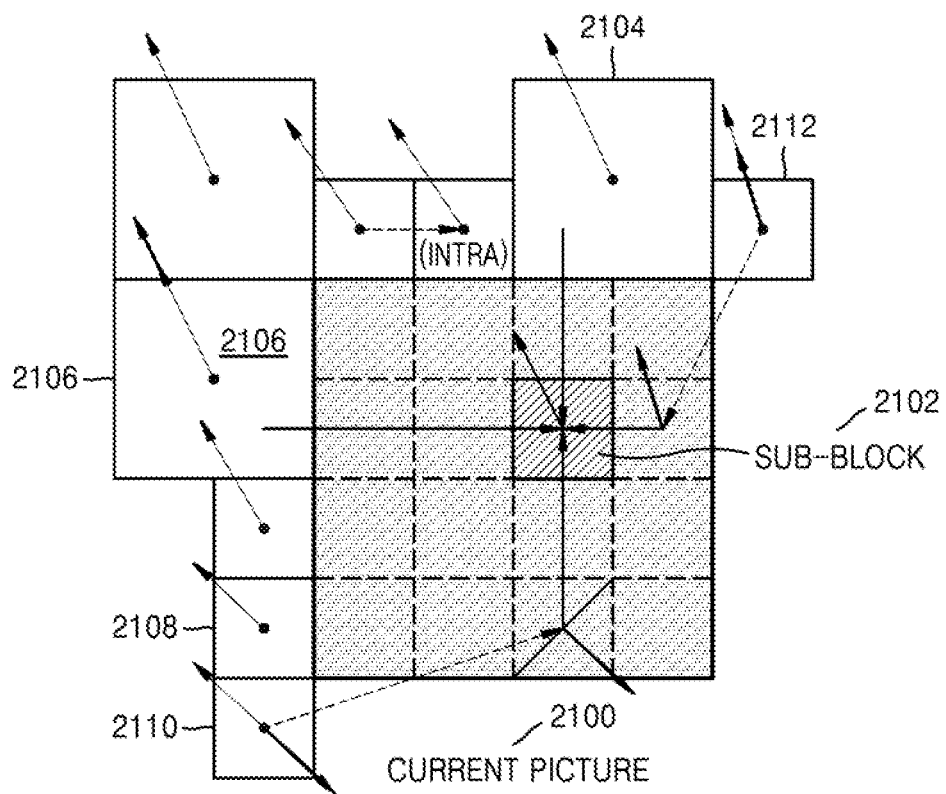
FIG. 21 illustrates a prediction method of a current block according to a motion vector (MV) planar mode.

Referring to FIG. 21, the processor 1610 may obtain an upper reference motion vector and an upper reference picture from a block 2104 located in a column of a sub-block 2102 and adjacent to the top of a current block 2100, in order to determine a motion vector of the sub-block 2102. Also, the processor 1610 may obtain a left reference motion vector and a left reference picture from a block 2106 located in a row of the sub-block 2102 and adjacent to the left side of the current block 2100. The processor 1610 may obtain a lower left reference motion vector and a lower left reference picture from at least one of blocks 2108 and 2110 adjacent to a lower left vertex of the current block 2100. The processor 1610 may obtain an upper right reference motion vector and an upper right reference picture from at least one of blocks 2104 and 2112 adjacent to an upper right vertex of the current block 2100.

The processor 1610 determines a reference picture of the current block. The processor 1610 may obtain reference picture information of blocks of an upper data unit, from a parameter set of the upper data unit of the current block. The processor 1610 may determine the reference picture of the current block, according to the reference picture information.

The processor 1610 adjusts the reference motion vector of the neighboring block, according to a temporal difference between the reference picture of the neighboring block and a current picture and a temporal difference between the reference picture of the current block and the current picture. The processor 1610 may adjust the upper reference motion vector of the upper neighboring block, according to a temporal difference between the upper reference picture of the upper neighboring block and the current picture and a temporal difference between the reference picture of the current block and the current picture. The processor 1610 may adjust the left reference motion vector of the left neighboring block, according to a temporal difference between the left reference picture of the left neighboring block and the current picture and a temporal difference between the reference picture of the current block and the current picture.

For example, a temporal distance between the reference picture of the block 2112 and the current picture is less than a temporal distance between the reference picture of the current block 2100 and the current picture. Accordingly, the processor 1610 may adjust the upper right reference motion vector to be smaller than a motion vector of the block 2112.

A temporal distance between the reference picture of the block 2106 and the current picture is greater than a temporal distance between the reference picture of the current block 2100 and the current picture. Accordingly, the processor 1610 may adjust the left reference motion vector to be larger than the motion vector of the block 2112.

A temporal distance between the reference picture of the block 2104 and the current picture is the same as a temporal distance between the reference picture of the current block 2100 and the current picture. Accordingly, the processor 1610 may adjust the upper reference motion vector to be the same as the motion vector of the block 2112.

In addition, the reference picture of the block 2110 is located in a direction opposite to the reference picture of the current block 2100 temporally from the current picture. Accordingly, the processor 1610 may adjust the lower left reference motion vector to indicate the opposite direction of a motion vector of the block 2110.

The processor 1610 determines a motion vector of the sub-block included in the current block, according to the adjusted reference motion vector and a position of the sub-block of the current block. The processor 1610 may determine the motion vector of the sub-block according to the upper reference motion vector, the left reference motion vector, and the position of the sub-block.

According to an embodiment, the processor 1610 may determine a weighted average of the upper reference motion vector, the left reference motion vector, the lower left reference motion vector, and the upper right reference motion vector as the motion vector of the sub-block. The weighted average may be determined according to the position of the sub-block.

In detail, the processor 1610 may determine a first weighted average of the upper reference motion vector and the lower left reference motion vector. A weight for determining the first weighted average is determined according to a vertical position of the sub-block. The processor 1610 may determine a second weighted average of the left reference motion vector and the upper right reference motion vector. A weight for determining the second weighted average is determined according to a horizontal position of the sub-block. The processor 1610 may determine the motion vector of the sub-block according to an average value of the first weighted average and the second weighted average.

The processor 1610 predicts the sub-block according to the motion vector of the sub-block. The processor 1610 may predict the current block, by predicting all sub-blocks of the current block according to motion vectors of the sub-blocks.

The processor 1610 may determine some of inter prediction elements as a default value in an MVP mode, or may derive some inter prediction elements from other inter prediction elements. Accordingly, inter prediction elements parsed from a bitstream in the MVP mode are reduced. Hence, coding efficiency in the MVP mode may be improved.

The processor 1610 may determine a first inter prediction element determined by parsing a bitstream and a second inter prediction element determined without parsing the bitstream from among inter prediction elements for inter prediction, for a current block. The second inter prediction element may include at least one of a prediction direction, a differential motion vector, and a reference picture of the current block. The first inter prediction element includes an inter prediction element other than the second inter prediction element.

In an embodiment, the processor 1610 may obtain inter prediction element skip information indicating the first inter prediction element and the second inter prediction element for all blocks of an upper data unit, for the upper data unit of the current block, from the bitstream. The processor 1610 may determine the first inter prediction element and the second inter prediction element according to the inter prediction element skip information.

The processor 1610 may determine the first inter prediction element from inter prediction information of the bitstream. The processor 1610 may determine the second inter prediction element, based on a default value of the second inter prediction element or the determined first inter prediction element.

In an embodiment, the processor 1610 may determine the default value of the second inter prediction element such as a prediction direction, a differential motion vector, and a reference picture. The processor 1610 may obtain inter prediction element default information indicating the default value of the second inter prediction element for the upper data unit of the current block, from the bitstream. The processor 1610 may determine the default value of the second inter prediction element, according to the inter prediction element default information.

The processor 1610 may inter predict the current block, based on the first inter prediction element and the second inter prediction element.

When bi-directional prediction is performed, coding efficiency may be improved by determining a differential motion vector of a first prediction direction according to a differential motion vector of a second prediction direction. A method of deriving a differential motion vector will now be described.

In an embodiment, the processor 1610 may determine a prediction motion vector of a first prediction direction according to prediction motion vector information obtained from a bitstream, and may determine a differential motion vector of the first prediction direction according to a differential motion vector of a second prediction direction. Because a prediction motion vector is obtained from a reference block of a current block, the prediction motion vector may be determined according to information indicating a reference block having a small bit size. For example, when the maximum number of reference blocks from which a prediction motion vector candidate is extracted is set to 8 or less, information indicating a reference block is expressed by using 3 bits or less. However, because information indicating a differential motion vector is directly obtained from the bitstream, the information indicating the differential motion vector is larger than the information indicating the reference block required to determine a prediction motion vector. For example, when an x-component and a y-component of the differential motion vector are very large, the information indicating the differential motion vector is set to have a size large enough to express the differential motion vector. Hence, the information indicating the differential motion vector having a large size may be skipped, by determining both the differential motion vector of the first prediction direction and the differential motion vector of the second prediction direction according to information indicating the differential motion vector of the second prediction direction.

In an embodiment, the processor 1610 may determine that the differential motion vector of the second prediction direction is a reciprocal of the differential motion vector of the first prediction direction. Alternatively, the processor 1610 may determine the differential motion vector of the first prediction direction by adjusting the differential motion vector of the second prediction direction, according to a temporal distance between a reference picture of the second prediction direction and a current picture and a temporal distance between a reference picture of the first prediction direction and the current picture. Hence, because information about the differential motion vector of the first prediction direction is not obtained from the bitstream and the prediction motion vector of the first prediction direction is determined according to the differential motion vector of the second prediction direction, video coding efficiency may be improved In an embodiment, when a preset condition is satisfied, the processor 1610 may determine that the differential motion vector of the second prediction direction is a reciprocal of the differential motion vector of the first prediction direction. For example, when the first prediction indicates a temporally preceding reference picture from the current picture and the second prediction direction indicates a temporally following reference picture from the current picture, it may be determined that the differential motion vector of the second prediction direction is a reciprocal of the differential motion vector of the first prediction direction.

In an embodiment, the processor 1610 may obtain differential motion vector derivation information indicating whether the differential motion vector of the first prediction direction is derived from the differential motion vector of the second prediction direction. When the differential motion vector derivation information indicates that the differential motion vector of the first prediction direction is derived from the differential motion vector of the second prediction direction, the processor 1610 may determine the differential motion vector of the first prediction direction according to the differential motion vector of the second prediction direction.

In an embodiment, when the differential motion vector derivation information indicates that the differential motion vector of the first prediction direction is derived from the differential motion vector of the second prediction direction, the processor 1610 may determine that the reference picture of the first prediction direction is a reference picture closest to the current picture in a reference picture list corresponding to the first prediction direction. For example, when the first prediction direction indicates a prediction direction of reference pictures of list 0 temporally following the current picture, it may be determined that the reference picture of the first prediction direction is a reference picture closest to the current picture from among the reference pictures of list 0 temporally following the current picture. Accordingly, the processor 1610 may derive the reference picture of the first prediction direction according to the differential motion vector derivation information, without obtaining reference picture information from the bitstream.

Also, when the differential motion vector derivation information indicates that the differential motion vector of the first prediction direction is derived from the differential motion vector of the second prediction direction, the processor 1610 may determine that the reference picture of the second prediction direction is a reference picture closest to the current picture in a reference picture list corresponding to the second prediction direction. For example, when the second prediction direction indicates a prediction direction of reference pictures of list 1 temporally preceding the current picture, the processor 1610 may determine that the reference picture of the second prediction direction is a reference picture closest to the current picture in the reference pictures of list 1 temporally preceding the current picture. Accordingly, the processor 1610 may derive the reference picture of the second prediction direction according to the differential motion vector derivation information, without obtaining reference picture information from the bitstream.

The processor 1610 may obtain first prediction motion vector information of the prediction motion vector of the first prediction direction, second prediction motion vector information of a prediction motion vector of the second prediction direction, and differential motion vector information of the differential motion vector of the second prediction direction, from the bitstream. When the differential motion vector derivation information indicates that the differential motion vector of the first prediction direction is derived from the differential motion vector of the second prediction direction, the processor 1610 does not obtain information about the differential motion vector of the first prediction direction from the bitstream. Instead, the processor 1610 may determine the differential motion vector of the first prediction direction according to the differential motion vector of the second prediction direction. The processor 1610 determines the prediction motion vector of the first prediction direction, the prediction motion vector of the second prediction direction, and the differential motion vector, according to the first prediction motion vector information, the second prediction motion vector information, and the differential motion vector information.

The processor 1610 determines a motion vector of the first prediction direction according to the prediction motion vector of the first prediction direction and the differential motion vector, and determines a motion vector of the second prediction direction according to the prediction motion vector of the second prediction direction and the differential motion vector. The processor 1610 predicts the current block, based on the motion vectors of the first prediction direction and the second prediction direction.

The first prediction direction and the second prediction direction indicate prediction directions of list 0 and list 1. For example, when the first prediction direction is a list 0 prediction direction, the second prediction direction indicates a list 1 prediction direction. In contrast, when the first prediction direction indicates a list 1 prediction direction, the second prediction direction indicates a list 0 prediction direction.

Figure 22:
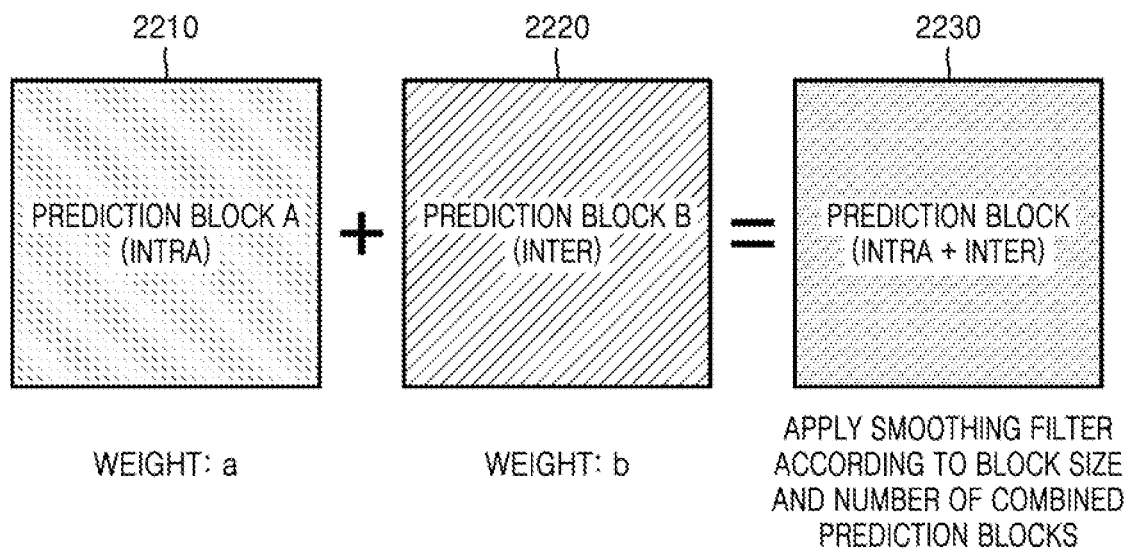
FIG. 22 illustrates a prediction method according to a multi-prediction combination mode.

The processor 1610 may predict the current block according to a multi-prediction combination mode. According to the multi-prediction combination mode, the processor 1610 predicts the current block according to a plurality of prediction methods, obtains a weighted average of prediction blocks according to the plurality of prediction methods, and determines a prediction block of the current block. FIG. 22 illustrates a prediction method according to a multi-prediction combination mode.

In FIG. 22, a prediction block A 2210 is determined according to an intra mode. Also, a prediction block B 2220 is determined according to an inter mode. A prediction block 2230 is determined according to a weighted average of the prediction block A 2210 and the prediction block B 2220. When the weighted average is determined, it is determined that weights of the prediction block A 2210 and the prediction block B 2220 are a and b. The prediction block 2230 may be smoothed by using a smoothing filter. The smoothing filter is determined according to a block size and the number of prediction blocks.

Although a prediction block according to one inter mode and a prediction block according to one intra mode are combined in FIG. 22, according to an embodiment, prediction blocks according to a plurality of inter modes and prediction blocks according to a plurality of intra modes may be combined. Also, according to an embodiment, only prediction blocks of a plurality of inter modes may be combined, or only prediction blocks of a plurality of intra modes may be combined. The plurality of inter modes may include an inter merge mode, an inter advanced motion vector prediction (AMVP) mode, and an inter skip mode.

The processor 1610 may determine whether a multi-prediction combination mode for predicting a current block by combining prediction results obtained according to a plurality of prediction modes is applied to the current block. The processor 1610 may obtain multi-prediction combination mode information indicating whether the multi-prediction combination mode is applied to the current block from a bitstream. The processor 1610 may determine whether the multi-prediction combination mode is applied to the current block, according to the multi-prediction combination mode information.

In an embodiment, the processor 1610 may determine whether the multi-prediction combination mode is applied to the current block, according to an area, a height, and a width of the current block. For example, when the area of the current block is 64 or more, the processor 1610 may determine whether the multi-prediction combination mode is applied to the current block. The processor 1610 may determine whether the multi-prediction combination mode is applied to the current block according to the multi-prediction combination mode obtained from the bitstream. In contrast, when the area of the current block is 64 or less, the processor 1610 may determine that the multi-prediction combination mode is not applied to the current block.

The processor 1610 may obtain prediction monde number information indicating the number of the plurality of prediction modes from the bitstream. The processor 1610 may determine the number of the plurality of prediction modes to be applied to the current block according to the prediction mode number information.

According to an embodiment, the processor 1610 may determine a maximum number of the plurality of prediction modes to be applied to the current block, according to a size of the current block. For example, the processor 1610 may determine that as the size of the current block increases, the maximum number of the plurality of prediction modes increases. In contrast, the processor 1610 may determine that as the size of the current block decreases, the maximum number of the plurality of prediction modes decreases.

When the multi-prediction combination mode is applied to the current block, the processor 1610 may determine the plurality of prediction modes to be applied to the current block. The processor 1610 may obtain prediction mode information indicating the plurality of prediction modes from the bitstream. The processor 1610 may determine the plurality of prediction modes to be applied to the current block according to the prediction mode information.

The processor 1610 may generate a plurality of prediction blocks for the current block, according to the plurality of prediction modes. The processor 1610 may determine a combined prediction block of the current block, by combining the plurality of prediction blocks according to respective weights.

The processor 1610 may smooth the combined prediction block of the current block by using a smoothing filter. The processor 1610 may determine the smoothing filter according to the size of the current block. For example, when the current block has a large size, the processor 1610 may use a smoothing filter with a large number of taps. When the current block has a small size, the processor 1610 may use a smoothing filter with a small number of taps.

The processor 1610 may determine the smoothing filter according to the number of the plurality of prediction modes to be applied to the current block. For example, when the number of the plurality of prediction modes is large, the processor 1610 may use a smoothing filter with a small number of taps. When the number of the plurality of prediction modes is small, the processor 1610 may use a smoothing filter with a large number of taps.

Figure 23:
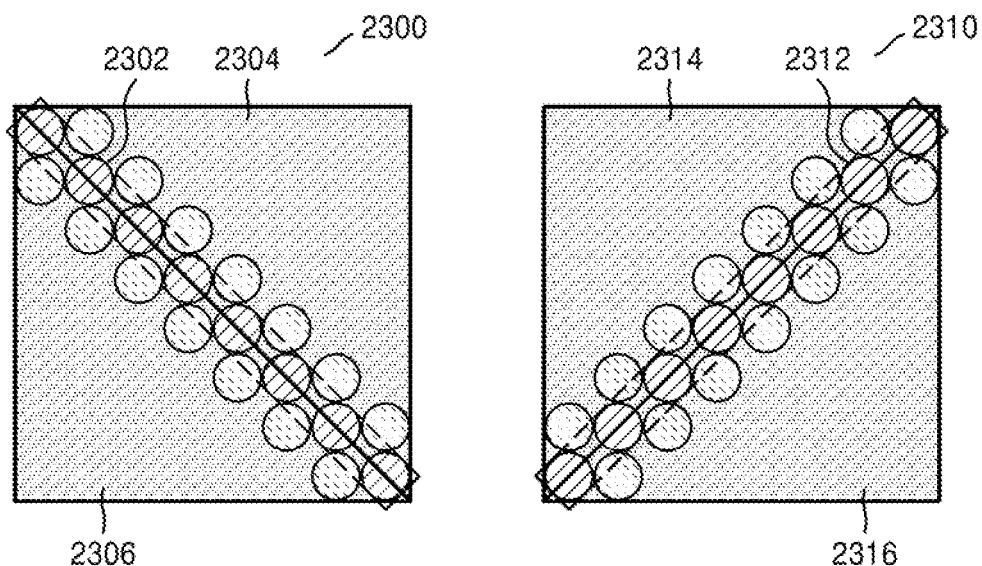
FIG. 23 illustrates a method of splitting a current block according to a triangular split mode.

The processor 1610 may split the current block according to a triangular split mode. The triangular split mode is a coding method of splitting a block into triangular sub-blocks. When the triangular split mode is applied to blocks having different characteristics along a diagonal line, coding efficiency may be improved. FIG. 23 illustrates a method of splitting a current block according to a triangular split mode.

A block 2300 is split in a lower rightward direction. Two sub-blocks 2304 and 2306 are predicted. Pixels 2302 located on a split boundary are smoothed by using a smoothing filter. A block 2310 is split in a lower leftward direction. Two sub-blocks 2314 and 2316 are predicted. Pixels 2312 located on a split boundary are smoothed by using the smoothing filter. The pixels 2302 and 2312 located on the split boundaries are smoothed by applying the smoothing filters to neighboring pixels. As the pixels 2302 and 2312 located on the split boundaries are smoothed, prediction accuracy according to a triangular split mode is improved.

The processor 1610 determines a split mode of the current block, from among a rectangular split mode and a triangular split mode. The processor 1610 may obtain split type information indicating one of the rectangular split mode and the triangular split mode from a bitstream. The processor 1610 may determine the split mode of the current block according to the split type information.

According to an embodiment, when the current block is in a merge mode or a skip mode, the processor 1610 may determine the split mode of the current block from among the rectangular split mode and the triangular split mode. In contrast, when the current block is not in a merge mode or a skip mode, the processor 1610 may determine only the rectangular split mode as the split mode of the current block.

When the current block is split according to the triangular split mode, the processor 1610 may determine one of a lower rightward direction and a lower leftward direction as a split direction of the current block. The processor 1610 may obtain split direction information indicating one of the lower rightward direction and the lower leftward direction from the bitstream. The processor 1610 may determine the split direction of the current block according to the split direction information.

The processor 1610 may split the current block into a plurality of sub-blocks, according to the split mode of the current block. The processor 1610 may predict the plurality of sub-blocks.

The processor 1610 may smooth prediction pixels located on a boundary line of a prediction block of the plurality of sub-blocks by using a smoothing filter. The processor 1610 may determine the number of filter coefficients and values of the filter coefficients of the smoothing filter according to the split mode of the current block. For example, the number of taps of a smoothing filter applied to sub-blocks split according to the triangular split mode may be set to be greater than the number of taps of a smoothing filter applied to sub-blocks split according to the rectangular split mode.

Figure 24:
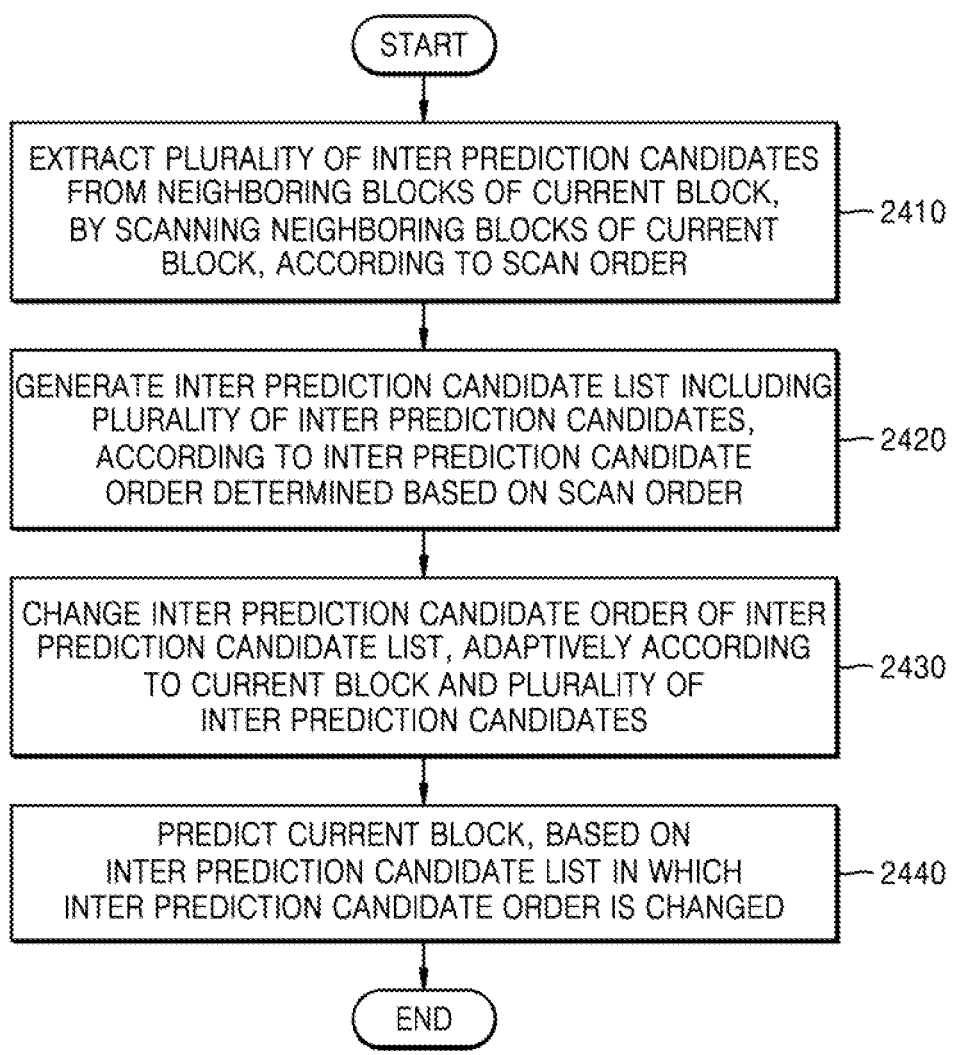
FIG. 24 is a flowchart of a video decoding method of changing an inter prediction order of an inter prediction candidate list.

FIG. 24 is a flowchart of a video decoding method 2400 of changing an inter prediction order of an inter prediction candidate list.

In operation 2410, a plurality of inter prediction candidates are extracted from neighboring blocks of a current block, by scanning the neighboring blocks of the current block, according to a scan order.

In operation 2420, an inter prediction candidate list including the plurality of inter prediction candidates is generated, according to an inter prediction candidate order determined based on the scan order.

According to an embodiment, when an affine mode is applied to the current block, a plurality of inter prediction candidates including an affine parameter may be extracted from neighboring blocks predicted according to the affine mode from among the neighboring blocks of the current block, by scanning the neighboring blocks of the current block, according to the scan order.

According to an embodiment, an inter prediction candidate list of a first prediction direction including the plurality of inter prediction candidates may be generated, according to the inter prediction candidate order determined based on the scan order. An inter prediction candidate list of a second prediction direction may be generated, based on a motion vector generated by adjusting a motion vector candidate of the inter prediction candidate list of the first prediction direction, according to a temporal distance between a first reference picture of the first prediction direction and a current picture and a temporal distance between a second reference picture of the second prediction direction and the current picture.

In operation 2430, the inter prediction candidate order of the inter prediction candidate list is changed, adaptively according to the current block or the plurality of inter prediction candidates.

According to an embodiment, the inter prediction candidate order may be changed, so that an inter prediction candidate included in the plurality of neighboring blocks of the current block from among the plurality of inter prediction candidates has a priority.

According to an embodiment, the inter prediction candidate order may be changed, according to sizes of the neighboring blocks of the current block.

According to an embodiment, the inter prediction candidate order may be changed, according to at least one of reference list information and an inter prediction mode of the plurality of inter prediction candidates.

According to an embodiment, the inter prediction candidate order may be changed, according to a selection ratio of inter prediction candidates referenced by blocks at the same position as the current block included in pictures reconstructed earlier than the current picture.

According to an embodiment, when an affine merge mode is applied to the current block, the inter prediction candidate order may be changed, according to whether the neighboring blocks of the current block are predicted according to the affine merge mode.

In operation 2440, the current block is predicted, based on the inter prediction candidate list in which the inter prediction candidate order is changed.

A function of the video decoding device 1600 of FIG. 16 may be included in the video decoding method 2400.

Figure 25:
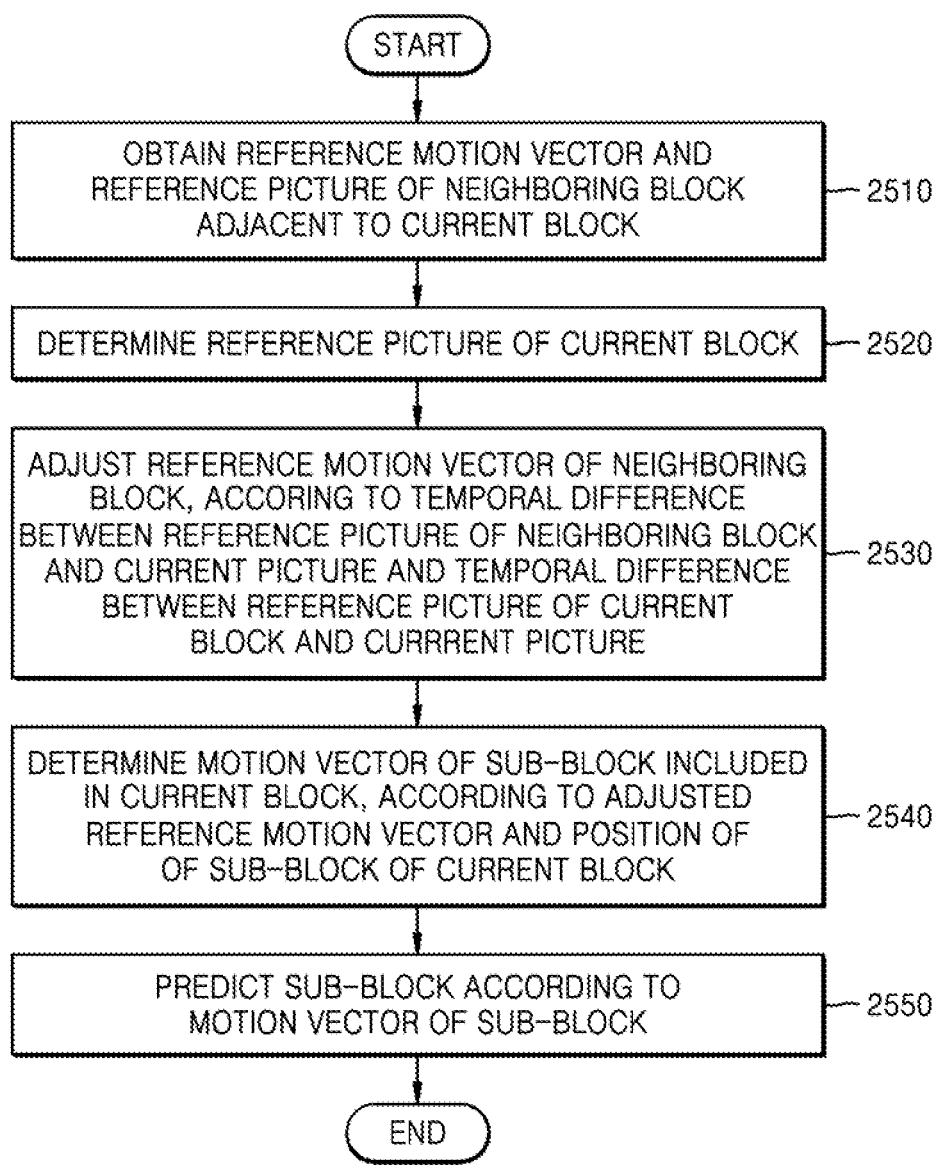
FIG. 25 is a flowchart of a video decoding method of predicting a current block according to an MV planar mode.

FIG. 25 is a flowchart of a video decoding method 2500 of predicting a current block according to an MV planar mode.

In operation 2510, a reference motion vector and a reference picture of a neighboring block adjacent to a current block are obtained.

According to an embodiment, an upper reference motion vector and an upper reference picture may be obtained from an upper neighboring block located in a column of a sub-block and adjacent to the top of a current block. A left reference motion vector and a left reference picture may be obtained from a left neighboring block located in a row of the sub-block and adjacent to the left side of the current block.

In operation 2520, a reference picture of the current block is determined.

According to an embodiment, reference picture information of an upper data unit may be obtained, from a parameter set of the upper data unit of the current block. The reference picture of the current block may be determined, according to the reference picture information.

In operation 2530, the reference motion vector of the neighboring block is adjusted, according to a temporal difference between the reference picture of the neighboring block and a current picture and a temporal difference between the reference picture of the current block and the current picture.

According to an embodiment, the upper reference motion vector of the upper neighboring block may be adjusted, according to a temporal difference between the upper reference picture of the upper neighboring block and the current picture and a temporal difference between the reference picture of the current block and the current picture. The left reference motion vector of the left neighboring block may be adjusted, according to a temporal difference between the left reference picture of the left neighboring block and the current picture and a temporal difference between the reference picture of the current picture and the current picture.

In operation 2540, a motion vector of the sub-block included in the current block is determined, according to the adjusted reference motion vector and a position of the sub-block of the current block.

According to an embodiment, the motion vector of the sub-block may be determined according to the upper reference motion vector, the left reference motion vector, and the position of the sub-block.

In operation 2550, the sub-block is predicted according to the motion vector of the sub-block.

A function of the video decoding device 1600 of FIG. 16 may be included in the video decoding method 2500.

Figure 26:
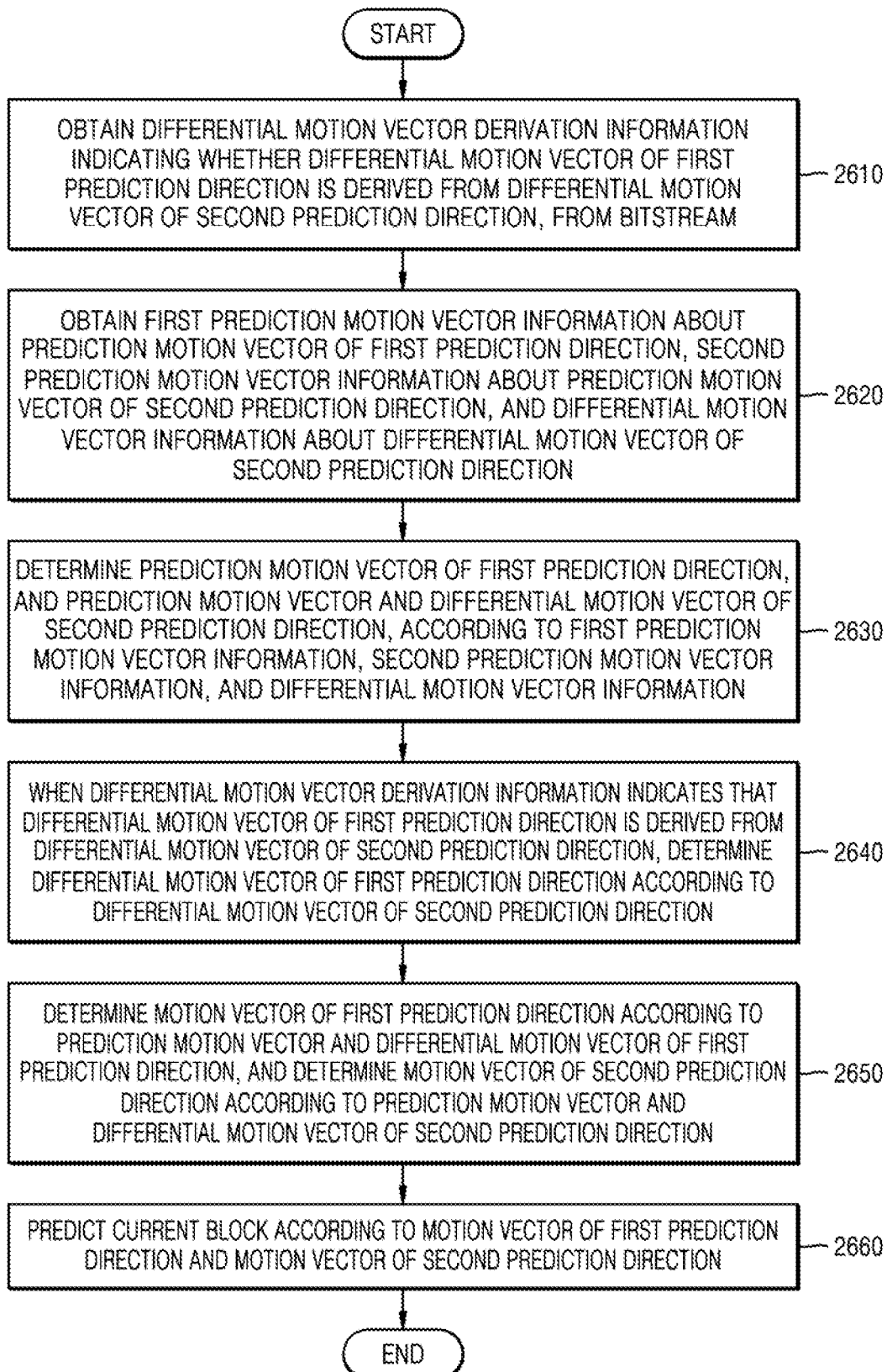
FIG. 26 is a flowchart of a video decoding method of improving coding efficiency by determining a specific inter prediction element without parsing a bitstream.

FIG. 26 is a flowchart of a video decoding method 2600 of improving coding efficiency by deriving a differential motion vector of a first prediction direction from a differential motion vector of a second prediction direction.

In operation 2610, differential motion vector derivation information indicating whether a differential motion vector of a first prediction direction is derived from a differential motion vector of a second prediction direction is obtained, from a bitstream.

In operation 2620, first prediction motion vector information about a prediction motion vector of the first prediction direction, second prediction motion vector information about a prediction motion vector of the second prediction direction, and differential motion vector information about a differential motion vector of the second prediction direction are obtained, from the bitstream.

In operation 2630, the prediction motion vector of the first prediction direction, and the prediction motion vector and the differential motion vector of the second prediction direction are determined, according to the first prediction motion vector information, the second prediction motion vector information, and the differential motion vector information.

In operation 2640, when the differential motion vector derivation information indicates that the differential motion vector of the first prediction direction is derived from the differential motion vector of the second prediction direction, the differential motion vector of the first prediction direction is determined according to the differential motion vector of the second prediction direction.

In operation 2650, a motion vector of the first prediction direction is determined according to the prediction motion vector and the differential motion vector of the first prediction direction, and a motion vector of the second prediction direction is determined according to the prediction motion vector and the differential motion vector of the second prediction direction.

In operation 2660, a current block is predicted according to the motion vector of the first prediction direction and the motion vector of the second prediction direction.

According to an embodiment, when the differential motion vector derivation information indicates that the differential motion vector of the first prediction direction is derived from the differential motion vector of the second prediction direction, it may be determined that a reference picture of the first prediction direction is a reference picture temporally closest to a current picture from among reference pictures included in a reference picture list of the first prediction direction. Also, it may be determined that a reference picture of the second prediction direction is a reference picture temporally closest to the current picture from among reference pictures included in a reference picture list of the second prediction direction.

A function of the video decoding device 1600 of FIG. 16 may be included in the video decoding method 2600.

Figure 27:
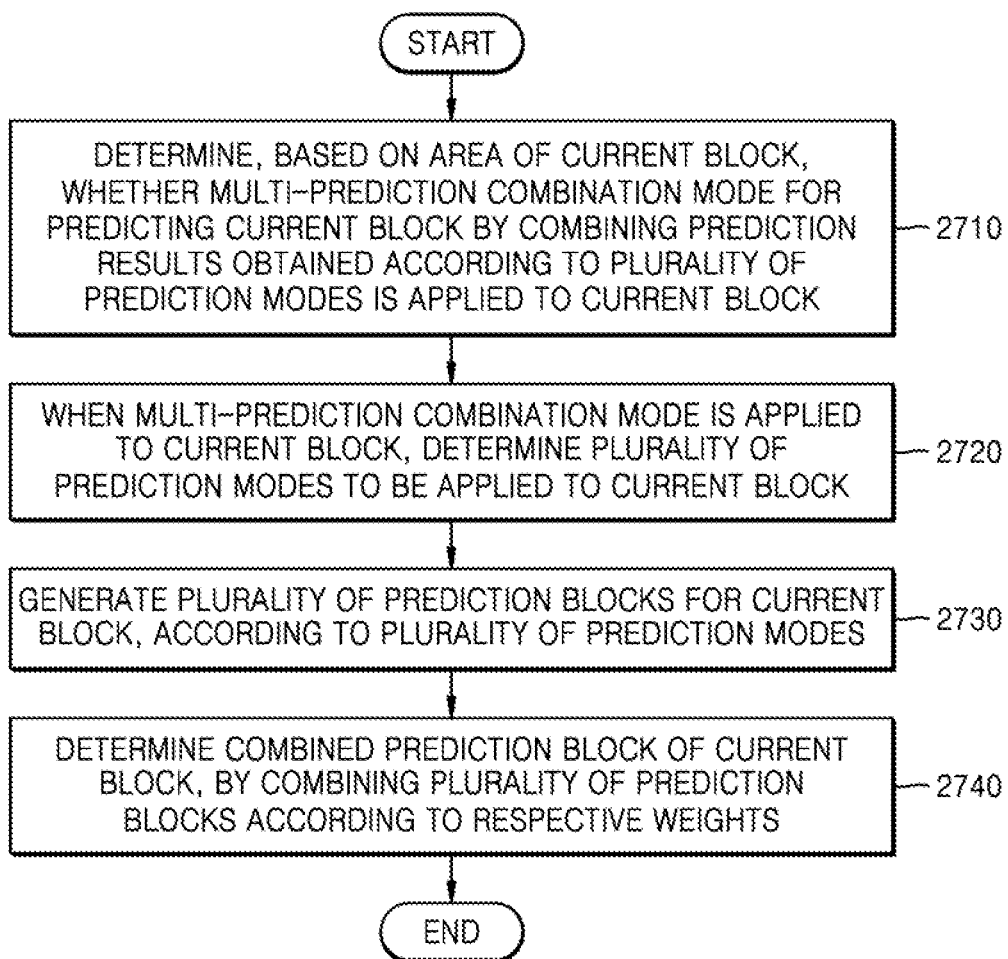
FIG. 27 is a flowchart of a video decoding method of predicting a current block according to a multi-prediction combination mode.

FIG. 27 is a flowchart of a video decoding method 2700 of predicting a current block according to a multi-prediction combination mode.

In operation 2710, whether a multi-prediction combination mode for predicting a current block is applied to the current block by combining prediction results obtained according to a plurality of prediction modes, according to a size of the current block.

In operation 2720, when the multi-prediction combination mode is applied to the current block, the plurality of prediction modes to be applied to the current block are determined. The plurality of prediction modes may include at least one of an intra mode, an inter merge mode, an inter AMVP mode, and an inter skip mode.

In operation 2730, a plurality of prediction blocks of the current block are generated, according to the plurality of prediction modes.

According to an embodiment, a maximum number of the plurality of prediction modes to be applied to the current block may be determined, according to the size of the current block.

In operation 2740, a combined prediction block of the current block is determined, by combining the plurality of prediction blocks according to respective weights.

According to an embodiment, the combined prediction block of the current block may be smoothed by using a smoothing filter. The smoothing filter may be determined according to the number of the plurality of prediction modes to be applied to the current block and the size of the current block.

A function of the video decoding device 1600 of FIG. 16 may be included in the video decoding method 2700.

Figure 28:
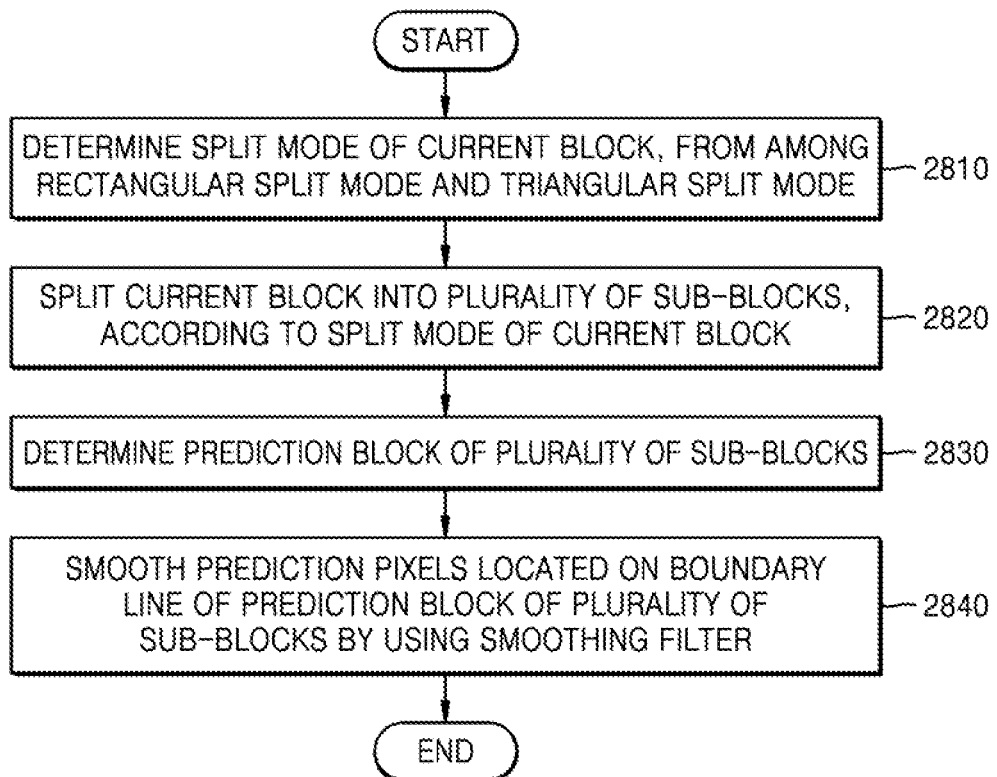
FIG. 28 is a flowchart of a video decoding method of reconstructing a current block according to a triangular split mode.

FIG. 28 is a flowchart of a video decoding method 2800 of reconstructing a current block according to a triangular split mode.

In operation 2810, a split mode of a current block is determined, from among a rectangular split mode and a triangular split mode.

According to an embodiment, when the current block is split according to the triangular split mode, it may be determined that a split direction of the current block is one of a lower rightward direction and a lower leftward direction.

According to an embodiment, when the current block is in a merge mode or a skip mode, the split mode of the current block may be determined from among the rectangular split mode and the triangular split mode. In contrast, when the current block is not in a merge mode or a skip mode, only the rectangular split mode may be determined as the split mode of the current block.

In operation 2820, the current block is split into a plurality of sub-blocks, according to the split mode of the current block.

In operation 2830, a prediction block of the plurality of sub-blocks is determined.

In operation 2840, prediction pixels located on a boundary line of the prediction block of the plurality of sub-blocks are smoothed by using a smoothing filter. The number of filter coefficients and the values of filter coefficients of the smoothing filter may be determined according to the split mode of the current block.

A function of the video decoding device 1600 of FIG. 16 may be included in the video decoding method 2800.

Figure 29:
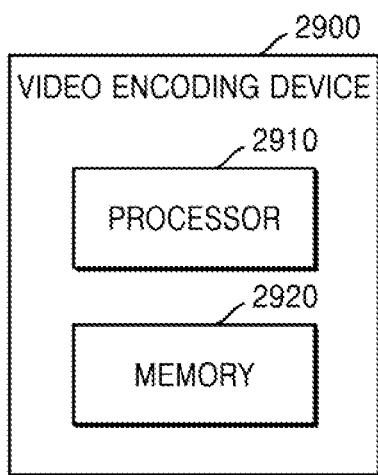
FIG. 29 is a block diagram of a video encoding device for encoding a current block according to an inter mode.

FIG. 29 is a block diagram of a video encoding device 2900 for encoding a current block according to an inter mode.

Referring to FIG. 29, the video encoding device 2900 according to an embodiment may include a processor 2910 and a memory 2920.

The processor 2910 according to an embodiment may generally control the video encoding device 2900. The processor 2910 according to an embodiment may execute one or more programs stored in the memory 2920.

The memory 2920 according to an embodiment may store various data, program, or application for driving and controlling the video encoding device 2900. The program stored in the memory 2920 may include one or more instructions. The program (the one or more instructions) or the application stored in the memory 2920 may be executed by the processor 2910.

The video encoding device 2900 may improve coding efficiency by changing an inter prediction candidate order of an inter prediction candidate list. The inter prediction candidate order may be changed as follows.

The processor 2910 may extract a plurality of inter prediction candidates from neighboring blocks of a current block, by scanning the neighboring blocks of the current block, according to a scan order.

The processor 2910 may generate an inter prediction candidate list including the plurality of inter prediction candidates, according to an inter prediction candidate order determined based on the scan order.

The processor 2910 may change the inter prediction candidate order of the inter prediction candidate list, adaptively according to the current block or the plurality of inter prediction candidates.

The processor 2910 may determine an inter prediction candidate having highest prediction accuracy from among the plurality of inter prediction candidates of the inter prediction candidate list. The processor 2910 may generate an inter prediction candidate index indicating the inter prediction candidate having highest prediction accuracy.

The video encoding device 2900 may predict the current block according to an MV planar mode. The current block is predicted according to the MV planar mode as follows.

The processor 2910 may determine a reference picture of the current block.

The processor 2910 may adjust a reference motion vector of a neighboring block, according to a temporal difference between a reference picture of the neighboring block and a current picture and a temporal difference between the reference picture of the current block and the current picture.

The processor 2910 may determine a motion vector of a sub-block included in the current block, according to the adjusted reference motion vector and a position of the sub-block of the current block.

The processor 2910 may predict the sub-block according to the motion vector of the sub-block.

The video encoding device 2900 may improve coding efficiency by determining a specific inter prediction element without parsing a bitstream. An encoding method of skipping encoding information about the specific inter prediction element is performed as follows.

The processor 2910 may determine a first inter prediction element whose encoding information is generated and a second inter prediction element whose encoding information is not generated from among inter prediction elements for inter prediction, for the current block.

The processor 2910 may determine candidates of the first inter prediction element. The processor 2910 may determine the second inter prediction element, based on a default value of the second inter prediction element or the determined candidates of the first inter prediction element.

The processor 2910 may predict the current block, based on the first inter prediction element and the second inter prediction element. The processor 2910 may generate inter prediction information for distinguishing the first inter prediction element and the second inter prediction element.

The video encoding device 2900 may predict the current block according to a multi-prediction combination mode. A prediction method according to the multi-prediction combination mode is performed as follows.

The processor 2910 may determine whether the multi-prediction combination mode is applied to the current block. When the multi-prediction combination mode is applied to the current block, the processor 2910 may determine a plurality of prediction modes to be applied to the current block.

The processor 2910 may generate a plurality of prediction blocks for the current block, according to the plurality of prediction modes.

The processor 2910 may determine a combined prediction block of the current block, by combining the plurality of prediction blocks according to respective weights.

The processor 2910 may generate multi-prediction combination mode information indicating whether the multi-prediction combination mode is applied to the current block and prediction mode information indicating the plurality of prediction modes.

The video encoding device 2900 may split the current block according to a triangular split mode. A splitting method according to the triangular split mode is performed as follows.

The processor 2910 may determine a split mode of the current block, from among a rectangular split mode and a triangular split mode according to a prediction result of the current block. The processor 2910 may split the current block into a plurality of sub-blocks, according to the split mode of the current block.

The processor 2910 may determine a prediction block of the plurality of sub-blocks. The processor 2910 may smooth prediction pixels located on a boundary line of the prediction block of the plurality of sub-blocks by using a smoothing filter. The processor 2910 may determine the number of filter coefficients and the values of filter coefficients of the smoothing filter according to the split mode of the current block.

Figure 30:
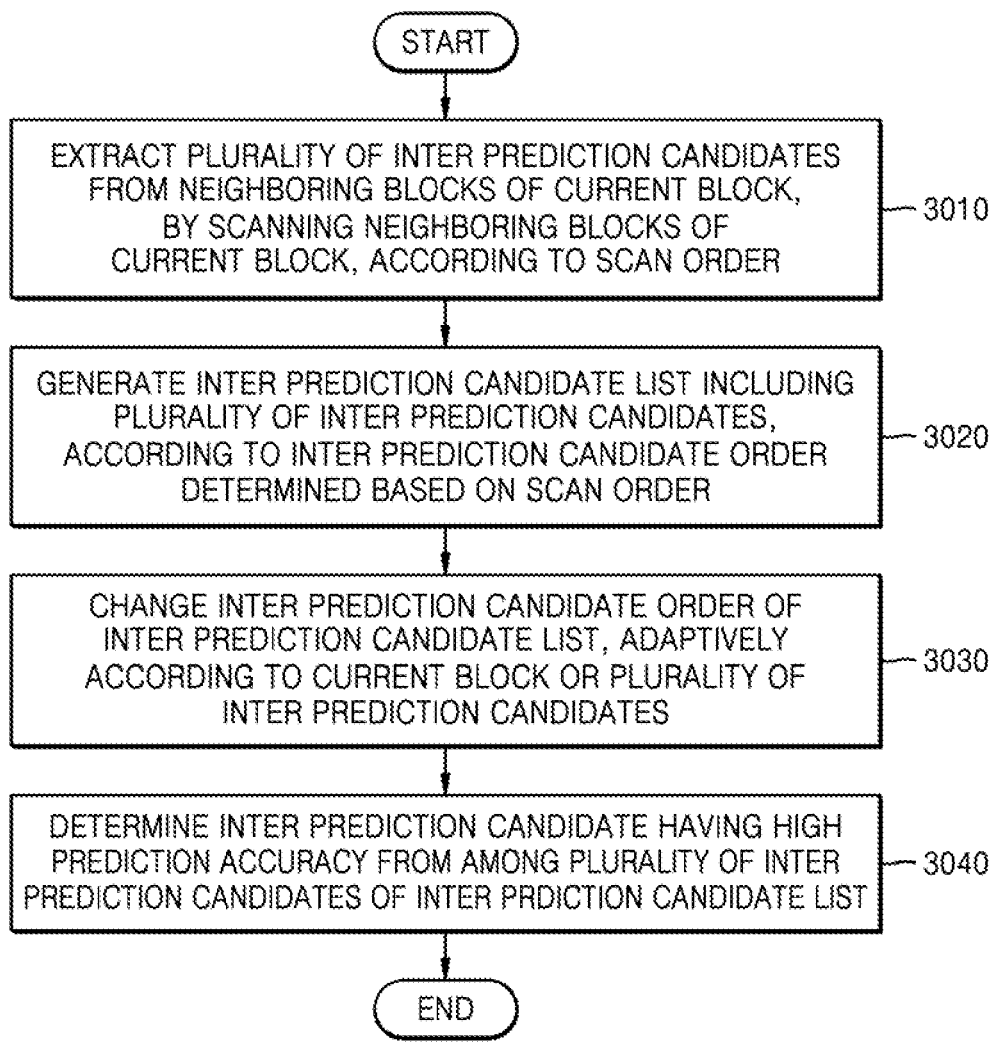
FIG. 30 is a flowchart of a video encoding method of changing an inter prediction order of an inter prediction candidate list.

FIG. 30 is a flowchart of a video encoding method 2400 of changing an inter prediction order of an inter prediction candidate list.

In operation 3010, a plurality of inter prediction candidates are extracted from neighboring blocks of a current block, by scanning the neighboring blocks of the current block, according to a scan order.

In operation 3020, an inter prediction candidate list including the plurality of inter prediction candidates is generated, according to an inter prediction candidate order determined based on the scan order.

In operation 3030, the inter prediction candidate order of the inter prediction candidate list is changed, adaptively according to the current block or the plurality of inter prediction candidates.

In operation 3040, an inter prediction candidate having highest prediction accuracy is determined from among the plurality of inter prediction candidates of the inter prediction candidate list. An inter prediction candidate index indicating the inter prediction candidate having highest prediction accuracy may be generated.

A function of the video encoding device 2900 of FIG. 29 may be included in the video encoding method 3000.

Figure 31:
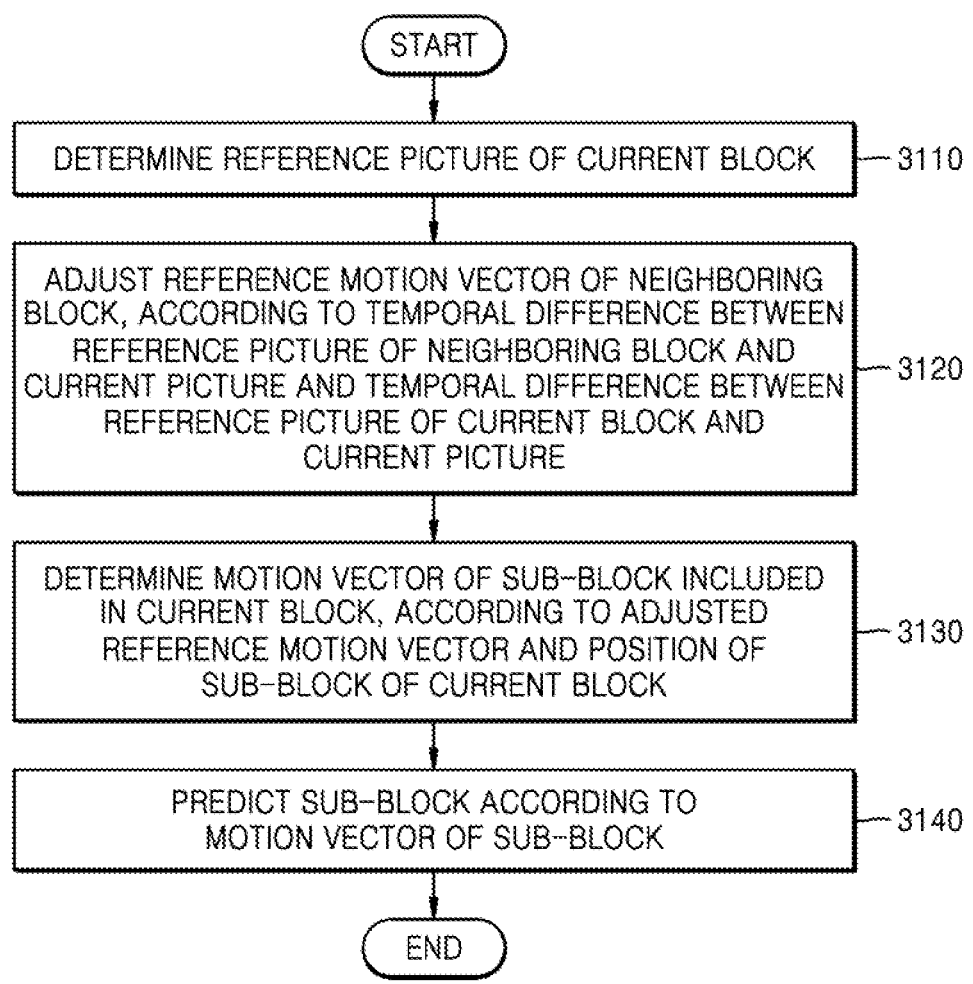
FIG. 31 is a flowchart of a video encoding method of predicting a current block according to an MV planar mode.

FIG. 31 is a flowchart of a video encoding method 3100 of predicting a current block according to an MV planar mode.

In operation 3110, a reference picture of a current block is determined.

In operation 3120, a reference motion vector of a neighboring block is adjusted, according to a temporal difference between a reference picture of the neighboring block and a current picture and a temporal difference between the reference picture of the current block and the current picture.

In operation 3130, a motion vector of a sub-block included in the current block is determined, according to the adjusted reference motion vector and a position of the sub-block of the current block.

In operation 3140, the sub-block is predicted according to the motion vector of the sub-block.

A function of the video encoding device 2900 may be included in the video encoding method 3100.

Figure 32:
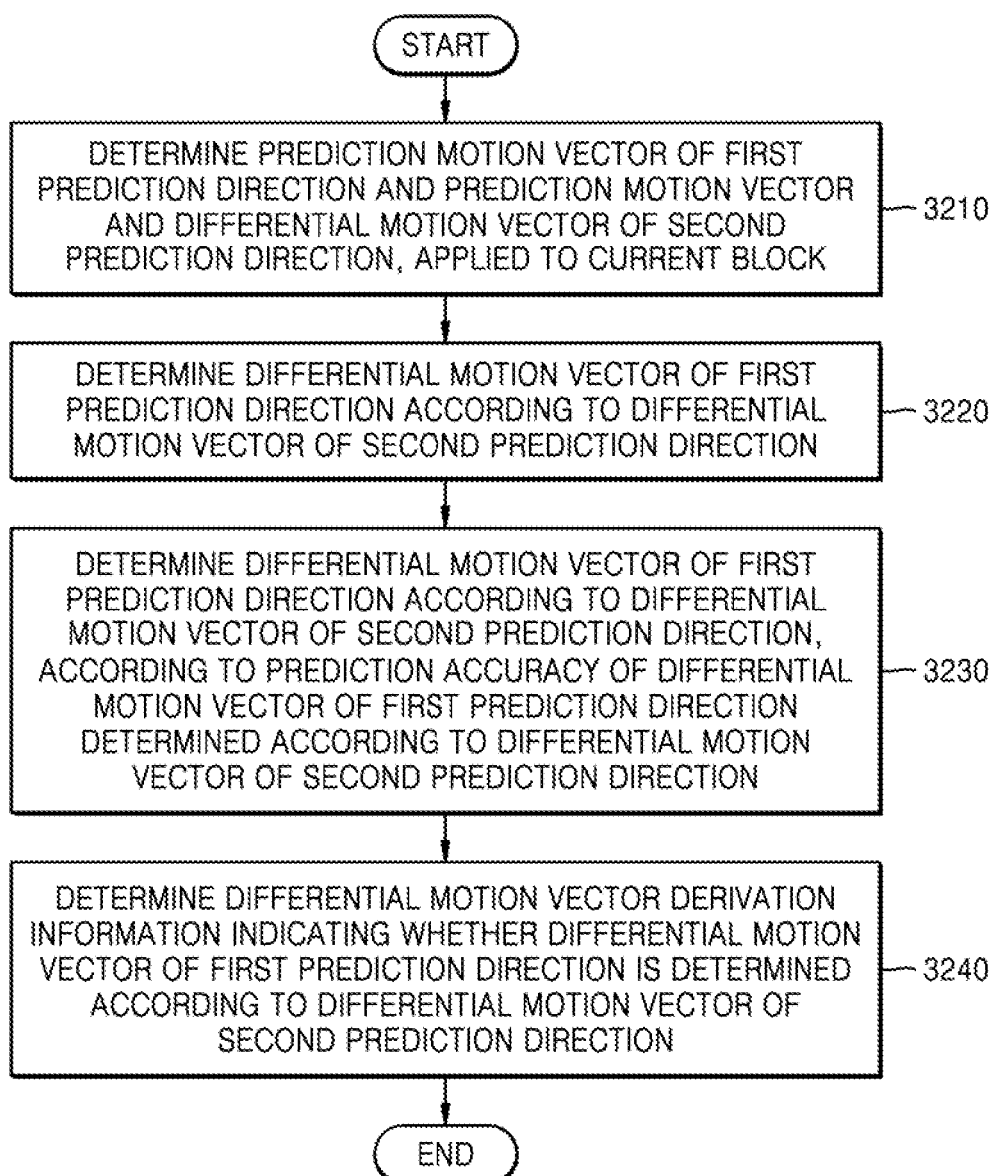
FIG. 32 is a flowchart of a video encoding method of improving coding efficiency by not generating information about a specific inter prediction element.

FIG. 32 is a flowchart of a video encoding method 3200 of improving coding efficiency by not generating information about a specific inter prediction element.

In operation 3210, a prediction motion vector of a first prediction direction and a prediction motion vector and a differential motion vector of a second prediction direction, applied to a current block, are determined.

In operation 3220, a differential motion vector of the first prediction direction is determined according to the differential motion vector of the second prediction direction.

In operation 3230, whether the differential motion vector of the first prediction direction is determined according to the differential motion vector of the second prediction direction is determined, according to prediction accuracy of the differential motion vector of the first prediction direction determined according to the differential motion vector of the second prediction direction.

In operation 3240, differential motion vector derivation information indicating whether the differential motion vector of the first prediction direction is determined according to the differential motion vector of the second prediction direction is determined.

A function of the video encoding device 2900 of FIG. 29 may be included in the video encoding method 3200.

Figure 33:
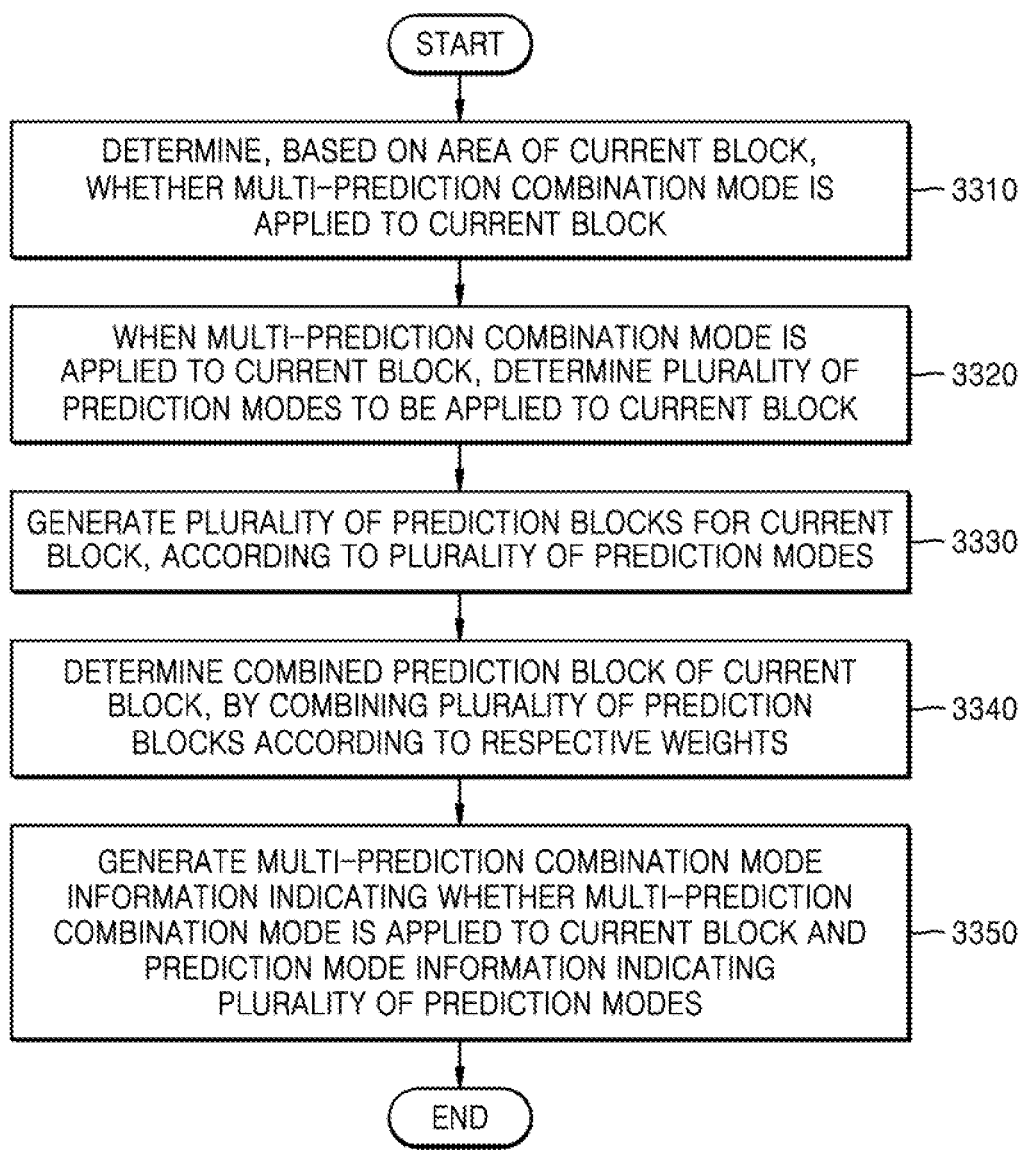
FIG. 33 is a flowchart of a video encoding method of predicting a current block according to a multi-prediction combination mode.

FIG. 33 is a flowchart of a video encoding method 3300 of predicting a current block according to a multi-prediction combination mode.

In operation 3310, whether a multi-prediction combination mode is applied to a current block is determined, based on the area of the current block.

In operation 3320, when the multi-prediction combination mode is applied to the current block, a plurality of prediction modes to be applied to the current block are determined.

In operation 3330, a plurality of prediction blocks for the current block are generated, according to the plurality of prediction modes.

In operation 3340, a combined prediction block of the current block is determined, by combining the plurality of prediction blocks according to respective weights.

In operation 3350, multi-prediction combination mode information indicating whether the multi-prediction combination mode is applied to the current block and prediction mode information indicating the plurality of prediction modes are generated.

A function of the video encoding device 2900 of FIG. 29 may be included in the video encoding method 3300.

Figure 34:
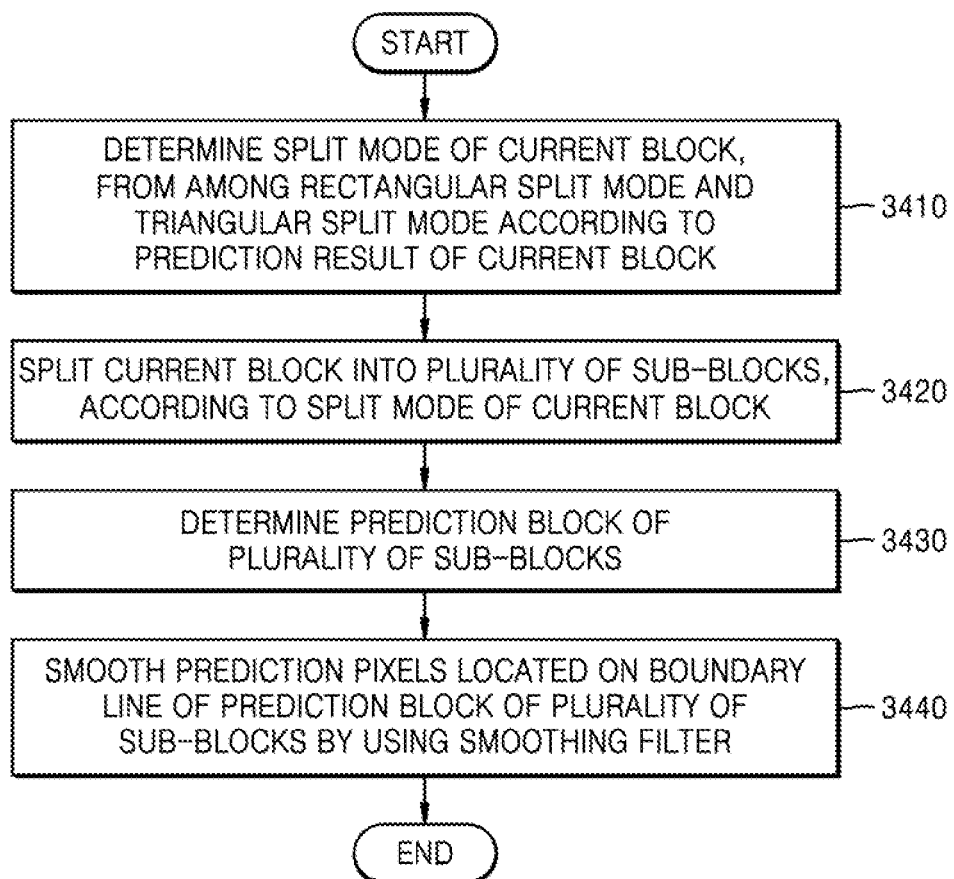
FIG. 34 is a flowchart of a video decoding method of reconstructing a current block according to a triangular split mode.

FIG. 34 is a flowchart of a video decoding method 3400 of reconstructing a current block according to a triangular split mode.

In operation 3410, a split mode of a current block is determined, from among a rectangular split mode and a triangular split mode according to a prediction result of the current block.

In operation 3420, the current block is split into a plurality of sub-blocks, according to the split mode of the current block.

In operation 3430, a prediction block of the plurality of sub-blocks is determined.

In operation 3440, prediction pixels located on a boundary line of the prediction block of the plurality of sub-blocks are smoothed by using a smoothing filter.

A function of the video decoding method 2800 of FIG. 28 may be included in a video encoding method 3400 (the video decoding method 3400?).

According to a video encoding method based on coding units having a tree structure described with reference to FIGS. 1A through 34, image data in a spatial domain is encoded according to the coding units having the tree structure, and according to a video decoding method based on the coding units having the tree structure, decoding is performed according to largest coding units and the image data in the spatial domain is reconstructed, and thus a video such as a picture and a picture sequence may be reconstructed. The reconstructed video may be played by a playback device, may be stored in a storage medium, and may be transmitted through a network.

Meanwhile, the embodiments of the present disclosure may be implemented as a computer-executable program, and may be implemented in a general-purpose digital computer that operates the program using a computer-readable recording medium.

It will be understood by one of ordinary skill in the art that, while optimal embodiments of the present disclosure have been described, various substitutes, modifications, and amendments, may be made to the one or more embodiments. That is, the substitutes, modifications, and amendments do not depart from the scope of the present disclosure and are encompassed in the present disclosure. Hence, the embodiments should be considered in a descriptive sense only and not for purposes of limitation.

The invention claimed is:

1. A video decoding method performed by a device and comprising:

when at least one of a width and a height of a current coding unit is equal to or greater than a predetermined value, obtaining, from a bitstream, information indicating whether a combined prediction is applied for the current coding unit, wherein, when the width and the height of the current coding unit are less than the predetermined value, the combined prediction is determined not to be applied for the current coding unit;

when the information indicates that the combined prediction is applied for the current coding unit, obtaining an inter prediction block by performing inter prediction on the current coding unit using a merge candidate list;

when the information indicates that the combined prediction is applied for the current coding unit, obtaining an intra prediction block by performing intra prediction on the current coding unit in a planar mode; and obtaining a combined prediction block of the current coding unit by combining the intra prediction block and the inter prediction block according to a weight value.

2. A video encoding method performed by a device and comprising:

when at least one of a width and a height of a current coding unit is equal to or greater than a predetermined value, obtaining information indicating whether a combined prediction is applied for the current coding unit, wherein, when the width and the height of the current coding unit are less than the predetermined value, the combined prediction is determined not to be applied for the current coding unit;

when the information indicates that the combined prediction is applied for the current coding unit, obtaining an inter prediction block by performing inter prediction on the current coding unit using a merge candidate list;

when the information indicates that the combined prediction is applied for the current coding unit, obtaining an intra prediction block by performing intra prediction on the current coding unit in a planar mode; and obtaining a combined prediction block of the current coding unit by combining the intra prediction block and the inter prediction block according to a weight value.

3. A non-transitory storage medium storing data generated by a video encoding method comprising:

when at least one of a width and a height of a current coding unit is equal to or greater than a predetermined value, obtaining information indicating whether a combined prediction is applied for the current coding unit, wherein, when the width and the height of the current coding unit are less than the predetermined value, the combined prediction is determined not to be applied for the current coding unit;

when the information indicates that the combined prediction is applied for the current coding unit, obtaining an inter prediction block by performing inter prediction on the current coding unit using a merge candidate list;

when the information indicates that the combined prediction is applied for the current coding unit, obtaining an intra prediction block by performing intra prediction on the current coding unit in a planar mode; and obtaining a combined prediction block of the current coding unit by combining the intra prediction block and the inter prediction block according to a weight value.

\* \* \* \* \*